US010543786B2

(12) United States Patent
Schofield et al.

(10) Patent No.: US 10,543,786 B2
(45) Date of Patent: *Jan. 28, 2020

(54) VEHICLE CAMERA SYSTEM

(71) Applicant: MAGNA ELECTRONICS INC., Auburn Hills, MI (US)

(72) Inventors: Kenneth Schofield, Holland, MI (US); Joshua L. DeWard, Holland, MI (US); Peter J. Whitehead, Grand Rapids, MI (US); Niall R. Lynam, Holland, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/864,128

(22) Filed: Jan. 8, 2018

(65) Prior Publication Data
US 2018/0118116 A1 May 3, 2018

Related U.S. Application Data

(60) Continuation of application No. 14/299,409, filed on Jun. 9, 2014, now Pat. No. 9,862,323, which is a
(Continued)

(51) Int. Cl.
*B60R 1/10* (2006.01)
*B60R 1/04* (2006.01)
(Continued)

(52) U.S. Cl.
CPC ............... *B60R 1/10* (2013.01); *B60R 1/04* (2013.01); *B60R 1/12* (2013.01); *B60R 11/04* (2013.01);
(Continued)

(58) Field of Classification Search
CPC ... G06F 19/326; G06F 19/3456; G16B 20/00; G16B 25/00; G16H 20/10; G16H 50/20;
(Continued)

(56) References Cited

U.S. PATENT DOCUMENTS 1,472,509 A 6/1922 Bitter
2,414,223 A 1/1947 De Virgilis
(Continued)

FOREIGN PATENT DOCUMENTS

DE 3525672 1/1987
DE 3937576 11/1989
(Continued)

OTHER PUBLICATIONS

IPR Proceeding No. IPR2014-00869, filed May 30, 2014, re U.S. Pat. No. 8,405,726.
(Continued)

*Primary Examiner* — Mohammed S Rahaman
(74) *Attorney, Agent, or Firm* — Honigman LLP

(57) ABSTRACT

A vehicular camera system includes a black-out layer disposed at an upper central region of a windshield as installed in a vehicle, an attachment member configured for attachment at the upper central region of the windshield where the black-out layer is disposed, and an accessory module including a camera. The accessory module is configured to detachably mount at the attachment member at the windshield such that the lens of the camera is spaced from the windshield, and such that the camera views forward of the vehicle through an aperture in the black-out layer via a tapered structure that is widest at the windshield and that tapers from the windshield towards where the lens of the camera is located. The tapered structure is at an acute angle relative to the vehicle windshield. The camera captures image data for a driver assistance system of the equipped vehicle.

37 Claims, 63 Drawing Sheets

Related U.S. Application Data continuation of application No. 13/964,137, filed on Aug. 12, 2013, now Pat. No. 8,749,633, which is a continuation of application No. 13/800,681, filed on Mar. 13, 2013, now Pat. No. 8,508,593, which is a continuation of application No. 13/470,860, filed on May 14, 2012, now Pat. No. 8,405,726, which is a continuation of application No. 12/132,373, filed on Jun. 3, 2008, now Pat. No. 8,179,437, which is a division of application No. 11/716,834, filed on Mar. 12, 2007, now Pat. No. 7,533,998, which is a continuation of application No. 10/958,087, filed on Oct. 4, 2004, now Pat. No. 7,188,963, which is a division of application No. 10/355,454, filed on Jan. 31, 2003, now Pat. No. 6,824,281.

(60) Provisional application No. 60/420,560, filed on Oct. 23, 2002, provisional application No. 60/398,346, filed on Jul. 24, 2002, provisional application No. 60/381,314, filed on May 17, 2002, provisional application No. 60/374,724, filed on Apr. 23, 2002, provisional application No. 60/364,008, filed on Mar. 14, 2002, provisional application No. 60/350,965, filed on Jan. 31, 2002.

(51) Int. Cl.
*B60R 1/12* (2006.01)
*B60R 11/04* (2006.01)
*H04N 7/18* (2006.01)
*H04N 5/232* (2006.01)
*H04N 5/374* (2011.01)

(52) U.S. Cl.
CPC ......... *H04N 5/23238* (2013.01); *H04N 5/374* (2013.01); *H04N 7/18* (2013.01); *H04N 7/183* (2013.01); *B60R 1/1207* (2013.01); *B60R 2001/123* (2013.01); *B60R 2001/1215* (2013.01); *B60R 2001/1223* (2013.01); *B60R 2001/1246* (2013.01); *B60R 2001/1253* (2013.01); *B60R 2001/1261* (2013.01); *B60R 2001/1276* (2013.01); *B60R 2001/1284* (2013.01); *B60R 2300/106* (2013.01); *B60R 2300/108* (2013.01); *B60R 2300/8033* (2013.01)

(58) Field of Classification Search
CPC ........ G16H 70/00; Y02A 90/26; B60R 11/04; B60R 1/04; B60R 1/10; B60R 1/12; B60R 1/207; B60R 2001/1215; B60R 2001/1223; B60R 2001/123; B60R 2001/1246; B60R 2001/1253; B60R 2001/1261; B60R 2001/1276; B60R 2001/1284; B60R 2300/106; B60R 2300/108; B60R 2300/8033; H04N 5/23238; H04N 5/374; H04N 7/18; H04N 7/183
USPC ........................................................ 348/148
See application file for complete search history.

(56) References Cited

U.S. PATENT DOCUMENTS

| | | |
|---|---|---|
| 3,208,070 A | 9/1965 | Boicey |
| 3,367,616 A | 2/1968 | Bausch |
| 3,870,404 A | 3/1975 | Wilson et al. |
| 4,065,750 A | 12/1977 | Duncan et al. |
| 4,254,931 A | 3/1981 | Aikens et al. |
| 4,274,078 A | 6/1981 | Isobe et al. |
| 4,286,305 A | 8/1981 | Pilat et al. |
| 4,390,742 A | 6/1983 | Wideman |
| 4,443,057 A | 4/1984 | Bauer et al. |
| 4,645,975 A | 2/1987 | Meitzler et al. |
| 4,646,210 A | 2/1987 | Skogler et al. |
| 4,646,673 A | 3/1987 | Fordyce |
| 4,733,336 A | 3/1988 | Skogler et al. |
| 4,760,497 A | 7/1988 | Roston |
| 4,768,135 A | 8/1988 | Kretschmer et al. |
| 4,781,436 A | 11/1988 | Armbruster |
| 4,793,690 A | 12/1988 | Gahan et al. |
| 4,807,096 A | 2/1989 | Skogler et al. |
| 4,859,867 A | 8/1989 | Larson et al. |
| 4,863,130 A | 9/1989 | Marks, Jr. |
| 4,871,917 A | 10/1989 | O'Farrell et al. |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,895,097 A | 1/1990 | Lechnir |
| 4,916,374 A | 4/1990 | Schierbeek et al. |
| 4,930,742 A * | 6/1990 | Schofield ................ B60R 1/04 248/225.11 |
| 4,936,533 A | 6/1990 | Adams et al. |
| 4,948,242 A | 8/1990 | Desmond et al. |
| 4,956,591 A | 9/1990 | Schierbeek et al. |
| 4,967,319 A | 10/1990 | Seko |
| 4,973,844 A | 11/1990 | O'Farrell et al. |
| 5,058,851 A | 10/1991 | Lawlor et al. |
| 5,080,309 A | 1/1992 | Ivins |
| 5,096,287 A * | 3/1992 | Kakinami ................ B60R 1/12 352/131 |
| 5,100,095 A | 3/1992 | Haan et al. |
| 5,111,289 A | 5/1992 | Lucas et al. |
| 5,140,455 A | 8/1992 | Varaprasad et al. |
| 5,151,816 A | 9/1992 | Varaprasad et al. |
| 5,160,780 A | 11/1992 | Ono et al. |
| 5,178,448 A | 1/1993 | Adams et al. |
| 5,193,029 A | 3/1993 | Schofield et al. |
| 5,255,442 A | 10/1993 | Schierbeek et al. |
| 5,264,997 A | 11/1993 | Hutchisson et al. |
| 5,266,873 A | 11/1993 | Arditi et al. |
| 5,327,288 A | 7/1994 | Wellington et al. |
| 5,330,149 A | 7/1994 | Haan et al. |
| D351,370 S | 10/1994 | Lawlor et al. |
| 5,361,190 A | 11/1994 | Roberts |
| 5,371,659 A | 12/1994 | Pastrick et al. |
| 5,377,948 A | 1/1995 | Suman et al. |
| 5,377,949 A | 1/1995 | Haan et al. |
| 5,406,414 A | 4/1995 | O'Farrell et al. |
| 5,426,294 A | 6/1995 | Kobayashi et al. |
| 5,439,305 A | 8/1995 | Santo |
| 5,448,180 A | 9/1995 | Kienzler et al. |
| 5,455,716 A * | 10/1995 | Suman ...................... B60R 1/04 248/479 |
| 5,469,298 A | 11/1995 | Suman et al. |
| 5,475,366 A | 12/1995 | Van Lente et al. |
| 5,487,522 A | 1/1996 | Hook |
| 5,488,352 A | 1/1996 | Jasper |
| 5,497,306 A | 3/1996 | Pastrick |
| 5,521,760 A | 5/1996 | De Young et al. |
| 5,530,240 A | 6/1996 | Larson et al. |
| 5,537,003 A | 7/1996 | Bechtel et al. |
| 5,550,677 A | 8/1996 | Schofield et al. |
| 5,558,123 A | 9/1996 | Castel et al. |
| 5,566,224 A | 10/1996 | Azam et al. |
| 5,567,896 A | 10/1996 | Gottschall |
| 5,568,211 A * | 10/1996 | Bamford ................ G03B 17/38 396/429 |
| 5,570,127 A | 10/1996 | Schmidt |
| 5,572,354 A | 11/1996 | Desmond et al. |
| 5,576,687 A | 11/1996 | Blank et al. |
| 5,582,383 A | 12/1996 | Mertens et al. |
| 5,587,236 A * | 12/1996 | Agrawal ................ B32B 7/12 428/334 |
| 5,588,123 A | 12/1996 | Loibl |
| 5,602,457 A | 2/1997 | Anderson et al. |
| 5,609,652 A | 3/1997 | Yamada et al. |
| 5,614,885 A | 3/1997 | Van Lente et al. |

(56) References Cited

U.S. PATENT DOCUMENTS

| | | |
|---|---|---|
| 5,615,857 A | 4/1997 | Hook |
| 5,631,638 A | 5/1997 | Kaspar et al. |
| 5,632,551 A | 5/1997 | Roney et al. |
| 5,649,756 A | 7/1997 | Adams et al. |
| 5,654,686 A | 8/1997 | Geschke et al. |
| 5,659,423 A | 8/1997 | Schierbeek et al. |
| 5,660,454 A | 8/1997 | Mori et al. |
| 5,661,455 A | 8/1997 | Van Lente et al. |
| 5,666,157 A | 9/1997 | Aviv |
| 5,667,896 A | 9/1997 | Carter et al. |
| 5,669,698 A | 9/1997 | Veldman et al. |
| 5,669,705 A | 9/1997 | Pastrick et al. |
| 5,670,935 A | 9/1997 | Schofield et al. |
| 5,671,996 A | 9/1997 | Bos et al. |
| 5,689,241 A | 11/1997 | Clark, Sr. et al. |
| 5,691,848 A | 11/1997 | Van Lente et al. |
| D388,107 S | 12/1997 | Huckins |
| 5,703,568 A | 12/1997 | Hegyi |
| 5,708,410 A | 1/1998 | Blank et al. |
| 5,708,743 A | 1/1998 | DeAndrea et al. |
| 5,710,633 A | 1/1998 | Klappenbach et al. |
| 5,719,551 A | 2/1998 | Flick |
| 5,760,962 A | 6/1998 | Schofield et al. |
| 5,774,283 A | 6/1998 | Nagel et al. |
| 5,786,772 A | 7/1998 | Schofield et al. |
| 5,793,308 A | 8/1998 | Rosinski et al. |
| 5,796,094 A * | 8/1998 | Schofield ............... B60N 2/002 250/208.1 |
| 5,796,176 A | 8/1998 | Kramer et al. |
| 5,798,575 A | 8/1998 | O'Farrell et al. |
| 5,804,719 A | 9/1998 | Didelot et al. |
| 5,820,097 A | 10/1998 | Spooner |
| 5,820,245 A | 10/1998 | Desmond et al. |
| 5,825,283 A | 10/1998 | Camhi |
| 5,837,891 A | 11/1998 | Bridge |
| 5,837,994 A | 11/1998 | Stam et al. |
| 5,845,000 A | 12/1998 | Breed et al. |
| 5,863,116 A | 1/1999 | Pastrick et al. |
| 5,877,897 A | 3/1999 | Schofield et al. |
| 5,878,353 A | 3/1999 | ul Azam et al. |
| 5,883,193 A | 3/1999 | Karim |
| 5,910,854 A | 6/1999 | Varaprasad et al. |
| 5,920,061 A | 7/1999 | Feng |
| 5,923,027 A | 7/1999 | Stam et al. |
| 5,926,087 A | 7/1999 | Busch et al. |
| 5,938,810 A | 8/1999 | DeLine et al. |
| 5,940,503 A | 8/1999 | Palett et al. |
| 5,947,586 A | 9/1999 | Weber |
| 5,959,366 A | 9/1999 | Menke |
| 5,959,367 A | 9/1999 | O'Farrell et al. |
| 5,971,552 A | 10/1999 | O'Farrell et al. |
| 5,982,288 A | 11/1999 | Sawatari et al. |
| 5,990,469 A | 11/1999 | Bechtel et al. |
| 6,000,823 A | 12/1999 | Desmond et al. |
| 6,006,159 A | 12/1999 | Schmier et al. |
| 6,020,704 A | 2/2000 | Buschur |
| 6,028,537 A | 2/2000 | Suman et al. |
| 6,049,171 A | 4/2000 | Stam et al. |
| 6,056,410 A | 5/2000 | Hoekstra et al. |
| 6,066,933 A * | 5/2000 | Ponziana ............... B60R 1/04 318/443 |
| 6,087,942 A | 7/2000 | Sleichter, III et al. |
| 6,087,953 A | 7/2000 | DeLine et al. |
| 6,089,721 A | 7/2000 | Schierbeek |
| 6,097,023 A | 8/2000 | Schofield |
| 6,097,024 A | 8/2000 | Stam et al. |
| 6,100,798 A | 8/2000 | Liang |
| 6,108,084 A | 8/2000 | Winner |
| 6,124,647 A | 9/2000 | Marcus et al. |
| 6,124,886 A | 9/2000 | DeLine et al. |
| 6,151,065 A | 11/2000 | Steed et al. |
| 6,158,655 A | 12/2000 | DeVries, Jr. et al. |
| 6,166,625 A | 12/2000 | Teowee et al. |
| 6,166,698 A | 12/2000 | Turnbull et al. |
| 6,170,955 B1 * | 1/2001 | Campbell ............... B60R 11/04 248/208 |
| 6,172,613 B1 | 1/2001 | DeLine et al. |
| 6,176,602 B1 | 1/2001 | Pastrick et al. |
| 6,198,087 B1 | 3/2001 | Boon |
| 6,198,409 B1 | 3/2001 | Schofield et al. |
| 6,201,642 B1 | 3/2001 | Bos |
| 6,207,967 B1 | 3/2001 | Hochstein |
| 6,210,008 B1 | 4/2001 | Hoekstra et al. |
| 6,218,934 B1 | 4/2001 | Regan |
| 6,222,460 B1 | 4/2001 | DeLine et al. |
| 6,229,226 B1 | 5/2001 | Kramer et al. |
| 6,229,434 B1 | 5/2001 | Knapp et al. |
| 6,243,003 B1 | 6/2001 | DeLine et al. |
| 6,250,148 B1 * | 6/2001 | Lynam ................... B60R 1/04 73/170.17 |
| 6,259,359 B1 | 7/2001 | Fujinami et al. |
| 6,276,821 B1 | 8/2001 | Pastrick et al. |
| 6,278,377 B1 | 8/2001 | DeLine et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,316 B1 | 10/2001 | Fletcher et al. |
| 6,299,319 B1 | 10/2001 | Mertens et al. |
| 6,302,545 B1 | 10/2001 | Schofield et al. |
| 6,305,807 B1 | 10/2001 | Schierbeek |
| 6,313,454 B1 | 11/2001 | Bos et al. |
| 6,318,697 B1 | 11/2001 | Corrado et al. |
| 6,320,176 B1 | 11/2001 | Schofield et al. |
| 6,323,477 B1 | 11/2001 | Blasing et al. |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,013 B1 | 1/2002 | Battiti et al. |
| 6,341,523 B2 | 1/2002 | Lynam |
| 6,353,392 B1 | 3/2002 | Schofield et al. |
| 6,366,213 B2 | 4/2002 | DeLine et al. |
| 6,386,742 B1 | 5/2002 | DeLine et al. |
| 6,389,340 B1 | 5/2002 | Rayner |
| 6,392,218 B1 * | 5/2002 | Kuehnle ............... B60S 1/0822 250/208.1 |
| 6,396,397 B1 | 5/2002 | Bos et al. |
| 6,406,152 B1 | 6/2002 | Hoekstra et al. |
| 6,412,973 B1 | 7/2002 | Bos et al. |
| 6,420,975 B1 | 7/2002 | DeLine et al. |
| 6,428,172 B1 | 8/2002 | Hutzel et al. |
| 6,433,676 B2 | 8/2002 | DeLine et al. |
| 6,445,287 B1 | 9/2002 | Schofield et al. |
| 6,452,148 B1 | 9/2002 | Bendicks et al. |
| 6,466,136 B2 | 10/2002 | DeLine et al. |
| 6,477,464 B2 | 11/2002 | McCarthy et al. |
| 6,483,438 B2 | 11/2002 | DeLine et al. |
| 6,496,117 B2 | 12/2002 | Gutta et al. |
| 6,498,620 B2 | 12/2002 | Schofield et al. |
| 6,498,967 B1 | 12/2002 | Hopkins et al. |
| 6,501,387 B2 | 12/2002 | Skiver et al. |
| 6,509,832 B1 * | 1/2003 | Bauer ................... B60Q 1/0023 340/425.5 |
| 6,513,252 B1 | 2/2003 | Schierbeek et al. |
| 6,515,378 B2 | 2/2003 | Drummond et al. |
| 6,516,664 B2 | 2/2003 | Lynam |
| 6,523,964 B2 | 2/2003 | Larson et al. |
| 6,535,242 B1 | 3/2003 | Strumolo et al. |
| 6,545,598 B1 | 4/2003 | De Villeroche |
| 6,555,804 B1 | 4/2003 | Biasing |
| 6,564,122 B1 | 5/2003 | Huertgen et al. |
| 6,587,573 B1 | 7/2003 | Stam et al. |
| 6,587,968 B1 | 7/2003 | Leyva |
| 6,593,565 B2 | 7/2003 | Heslin et al. |
| 6,593,960 B1 | 7/2003 | Sugimoto et al. |
| 6,596,978 B2 | 7/2003 | Hochstein |
| 6,603,137 B2 | 8/2003 | Hochstein |
| 6,614,043 B2 | 9/2003 | Hochstein |
| 6,614,579 B2 | 9/2003 | Roberts et al. |
| 6,615,650 B2 | 9/2003 | Mahner et al. |
| 6,617,564 B2 * | 9/2003 | Ockerse ................ B60S 1/0818 250/208.1 |
| 6,646,359 B2 | 11/2003 | Schaefer et al. |
| 6,648,477 B2 | 11/2003 | Hutzel et al. |

(56) References Cited

U.S. PATENT DOCUMENTS

| | | |
|---|---|---|
| 6,653,615 B2 | 11/2003 | Bechtel et al. |
| 6,660,360 B2 | 12/2003 | Mertzel et al. |
| 6,672,744 B2 | 1/2004 | DeLine et al. |
| 6,672,745 B1 | 1/2004 | Bauer et al. |
| 6,681,163 B2 | 1/2004 | Stam et al. |
| 6,690,268 B2 | 2/2004 | Schofield et al. |
| 6,731,071 B2 | 5/2004 | Baarman |
| 6,734,904 B1 | 5/2004 | Boon et al. |
| 6,737,963 B2 | 5/2004 | Gutta et al. |
| 6,738,088 B1 | 5/2004 | Uskolovsky et al. |
| 6,742,904 B2 | 6/2004 | Bechtel et al. |
| 6,742,905 B2 | 6/2004 | Suyama et al. |
| 6,765,480 B2 | 7/2004 | Tseng |
| 6,768,092 B2 * | 7/2004 | Sakata .............. B60R 1/12 250/208.1 |
| 6,774,356 B2 | 8/2004 | Heslin et al. |
| 6,774,810 B2 | 8/2004 | DeLine et al. |
| 6,784,129 B2 | 8/2004 | Seto et al. |
| 6,799,904 B2 | 10/2004 | Schaefer et al. |
| 6,803,574 B2 | 10/2004 | Abel et al. |
| 6,806,485 B2 | 10/2004 | Jackson, Jr. |
| 6,811,330 B1 | 11/2004 | Tozawa |
| 6,812,645 B2 | 11/2004 | Baarman |
| 6,824,281 B2 | 11/2004 | Schofield et al. |
| 6,825,620 B2 | 11/2004 | Kuennen et al. |
| 6,831,268 B2 | 12/2004 | Bechtel et al. |
| 6,831,288 B1 | 12/2004 | Schmitt et al. |
| 6,832,719 B2 | 12/2004 | DeVries, Jr. et al. |
| 6,841,767 B2 | 1/2005 | Mindl et al. |
| 6,867,510 B2 | 3/2005 | Kramer et al. |
| 6,877,870 B2 | 4/2005 | Krug |
| 6,877,888 B2 | 4/2005 | DeLine et al. |
| 6,889,064 B2 | 5/2005 | Baratono et al. |
| 6,894,619 B1 | 5/2005 | Schmitt et al. |
| 6,917,163 B2 | 7/2005 | Baarman |
| 6,924,470 B2 | 8/2005 | Bechtel et al. |
| 6,930,593 B2 | 8/2005 | Crawshaw |
| 6,968,736 B2 | 11/2005 | Lynam |
| 6,975,215 B2 | 12/2005 | Schofield et al. |
| 6,975,390 B2 | 12/2005 | Mindl et al. |
| 6,980,092 B2 | 12/2005 | Turnbull et al. |
| 6,995,354 B2 | 2/2006 | Hagan et al. |
| 7,004,593 B2 | 2/2006 | Weller et al. |
| 7,016,783 B2 | 3/2006 | Hac et al. |
| 7,027,387 B2 | 4/2006 | Reinold et al. |
| 7,041,965 B2 | 5/2006 | Heslin et al. |
| 7,053,761 B2 | 5/2006 | Schofield et al. |
| 7,075,511 B1 | 7/2006 | Mousseau et al. |
| 7,108,409 B2 | 9/2006 | DeLine et al. |
| 7,111,996 B2 | 9/2006 | Seger et al. |
| 7,188,963 B2 | 3/2007 | Schofield et al. |
| 7,195,381 B2 | 3/2007 | Lynam et al. |
| 7,199,767 B2 | 4/2007 | Spero |
| 7,205,524 B2 | 4/2007 | Drummond et al. |
| 7,242,320 B2 | 7/2007 | Lawlor et al. |
| 7,249,860 B2 | 7/2007 | Kulas et al. |
| 7,255,451 B2 | 8/2007 | McCabe et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,289,037 B2 | 10/2007 | Uken et al. |
| 7,297,932 B2 | 11/2007 | Georgiadis et al. |
| 7,304,680 B2 | 12/2007 | Köhler et al. |
| 7,311,428 B2 | 12/2007 | DeLine et al. |
| 7,322,755 B2 | 1/2008 | Neumann et al. |
| 7,370,983 B2 | 5/2008 | DeWind et al. |
| 7,420,159 B2 | 9/2008 | Heslin et al. |
| 7,438,774 B2 | 10/2008 | Kurfiss et al. |
| 7,446,427 B2 | 11/2008 | Parker et al. |
| 7,460,007 B2 | 12/2008 | Schofield et al. |
| 7,467,883 B2 | 12/2008 | DeLine et al. |
| 7,480,149 B2 | 1/2009 | DeWard et al. |
| 7,490,944 B2 | 2/2009 | Blank et al. |
| 7,497,632 B2 | 3/2009 | Kajino et al. |
| 7,533,998 B2 | 5/2009 | Schofield et al. |
| 7,538,316 B2 | 5/2009 | Heslin et al. |
| 7,570,793 B2 | 8/2009 | Lages et al. |
| 7,609,961 B2 | 10/2009 | Park |
| 7,646,889 B2 | 1/2010 | Tsukamoto |
| 7,651,228 B2 | 1/2010 | Skiver et al. |
| 7,657,052 B2 | 2/2010 | Larson et al. |
| 7,658,521 B2 | 2/2010 | DeLine et al. |
| 7,697,028 B1 | 4/2010 | Johnson |
| 7,719,408 B2 | 5/2010 | DeWard et al. |
| 7,728,721 B2 | 6/2010 | Schofield et al. |
| 7,780,137 B2 | 8/2010 | Hansel et al. |
| 7,780,454 B2 | 8/2010 | Baranski |
| 7,811,011 B2 | 10/2010 | Blaesing et al. |
| 7,817,205 B2 | 10/2010 | Schulte et al. |
| 7,837,173 B2 | 11/2010 | Zinzer et al. |
| 7,855,353 B2 | 12/2010 | Blaesing et al. |
| 7,855,755 B2 | 12/2010 | Weller et al. |
| 7,860,275 B2 | 12/2010 | Leleve et al. |
| 7,864,981 B2 | 1/2011 | Leleve et al. |
| 7,888,629 B2 | 2/2011 | Heslin et al. |
| 7,889,086 B2 | 2/2011 | Schafer et al. |
| 7,911,356 B2 | 3/2011 | Wohlfahrt et al. |
| 7,914,188 B2 | 3/2011 | DeLine et al. |
| 7,916,009 B2 | 3/2011 | Schofield et al. |
| 7,940,305 B2 | 5/2011 | Adameck |
| 7,965,336 B2 | 6/2011 | Bingle et al. |
| 7,994,471 B2 | 8/2011 | Heslin et al. |
| 8,051,707 B2 | 11/2011 | Roehr et al. |
| 8,094,002 B2 | 1/2012 | Schofield et al. |
| 8,100,568 B2 | 1/2012 | DeLine et al. |
| 8,134,117 B2 | 3/2012 | Heslin et al. |
| 8,179,437 B2 | 5/2012 | Schofield et al. |
| 8,192,095 B2 | 6/2012 | Kortan et al. |
| 8,256,821 B2 | 9/2012 | Lawlor et al. |
| 8,288,711 B2 | 10/2012 | Heslin et al. |
| 8,309,907 B2 | 11/2012 | Heslin et al. |
| 8,325,028 B2 | 12/2012 | Schofield et al. |
| 8,339,453 B2 | 12/2012 | Blake, III et al. |
| 8,405,726 B2 | 5/2013 | Schofield et al. |
| 8,481,916 B2 | 7/2013 | Heslin et al. |
| 8,508,593 B1 | 8/2013 | Schofield et al. |
| 8,513,590 B2 | 8/2013 | Heslin et al. |
| 8,531,278 B2 | 9/2013 | DeWard et al. |
| 8,531,279 B2 | 9/2013 | DeLine et al. |
| 8,534,887 B2 | 9/2013 | DeLine et al. |
| 8,686,840 B2 | 4/2014 | Drummond et al. |
| 8,692,659 B2 | 4/2014 | Schofield et al. |
| 8,710,969 B2 | 4/2014 | DeWard et al. |
| 8,749,367 B2 | 6/2014 | Schofield et al. |
| 8,749,633 B2 | 6/2014 | Schofield et al. |
| 9,862,323 B2 | 1/2018 | Schofield et al. |
| 2002/0003571 A1 | 1/2002 | Schofield et al. |
| 2002/0075387 A1 | 6/2002 | Janssen |
| 2002/0126457 A1 | 9/2002 | Kameyama |
| 2002/0156559 A1 * | 10/2002 | Stam .............. B60Q 1/1423 701/36 |
| 2003/0070741 A1 | 4/2003 | Rosenberg et al. |
| 2003/0112132 A1 * | 6/2003 | Trajkovic .............. B60K 35/00 340/435 |
| 2004/0200948 A1 | 10/2004 | Bos et al. |
| 2005/0237385 A1 | 10/2005 | Kosaka et al. |
| 2006/0050018 A1 | 3/2006 | Hutzel et al. |
| 2006/0061008 A1 | 3/2006 | Karner et al. |
| 2007/0132610 A1 | 6/2007 | Guernalec et al. |
| 2007/0235638 A1 | 10/2007 | Backes et al. |
| 2008/0092673 A1 | 4/2008 | Hansel et al. |
| 2010/0208077 A1 | 8/2010 | DeWard et al. |
| 2011/0025850 A1 | 2/2011 | Maekawa et al. |
| 2011/0155874 A1 | 6/2011 | Roehr et al. |
| 2012/0224065 A1 | 9/2012 | Schofield et al. |
| 2012/0310519 A1 | 12/2012 | Lawlor et al. |
| 2014/0015976 A1 | 1/2014 | DeLine et al. |

FOREIGN PATENT DOCUMENTS

| | | |
|---|---|---|
| DE | 4329983 | 3/1995 |
| DE | 29513369 | 12/1995 |
| DE | 29703084 | 4/1997 |
| DE | 19647200 | 1/1998 |

(56) References Cited

FOREIGN PATENT DOCUMENTS

| | | |
|---|---|---|
| DE | 29805142 | 6/1998 |
| DE | 19755008 | 7/1999 |
| DE | 10132982 | 1/2003 |
| DE | 10211444 | 10/2003 |
| DE | 10237554 | 3/2004 |
| DE | 10237607 | 3/2004 |
| DE | 10342837 | 4/2005 |
| DE | 102005002686 | 8/2006 |
| DE | 102005015973 | 10/2006 |
| DE | 102006039065 | 3/2007 |
| EP | 0169734 | 10/1989 |
| EP | 0461424 | 12/1991 |
| EP | 0667254 | 8/1995 |
| EP | 0874331 A2 | 3/1998 |
| EP | 0928723 | 7/1999 |
| EP | 1058220 | 12/2000 |
| EP | 1389565 | 2/2004 |
| GB | 2210835 | 6/1989 |
| GB | 2316379 | 2/1998 |
| JP | 59029539 | 2/1984 |
| JP | 11069211 | 3/1999 |
| WO | WO1995023082 | 8/1995 |
| WO | WO1996018275 | 6/1996 |
| WO | WO1997001246 | 1/1997 |
| WO | WO1997048134 | 12/1997 |
| WO | WO1998014974 | 4/1998 |
| WO | WO1999014088 | 3/1999 |
| WO | WO1999023828 | 5/1999 |
| WO | WO 9943242 A1 * | 9/1999 ............ B60R 11/04 |
| WO | WO1999043242 | 9/1999 |
| WO | WO2000015462 | 3/2000 |
| WO | WO2001064481 | 9/2001 |
| WO | WO0177763 | 10/2001 |
| WO | WO2001026332 | 12/2001 |
| WO | WO2002071487 | 9/2002 |
| WO | WO2003065084 | 8/2003 |

OTHER PUBLICATIONS

IPR Proceeding No. IPR2014-01010, filed Jun. 20, 2014, re U.S. Pat. No. 7,533,998.
IPR Proceeding No. IPR2014-01346, filed Aug. 20, 2014, re U.S. Pat. No. 8,179,437.
IPR Proceeding No. IPR2014-01347, filed Aug. 20, 2014, re U.S. Pat. No. 8,508,593.
IPR Proceeding No. IPR2014-01348, filed Aug. 20, 2014, re U.S. Pat. No. 8,508,593.

* cited by examiner

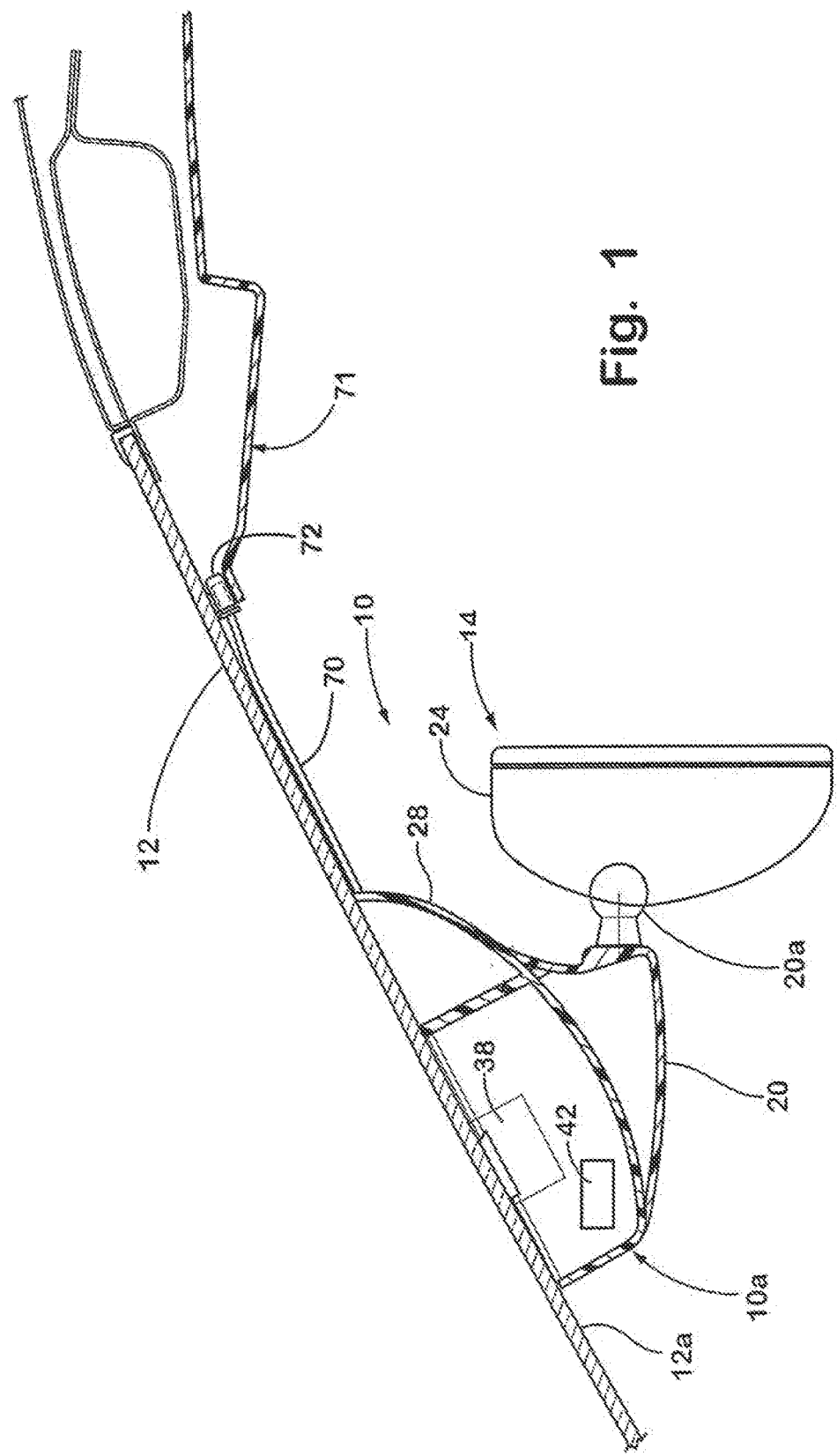

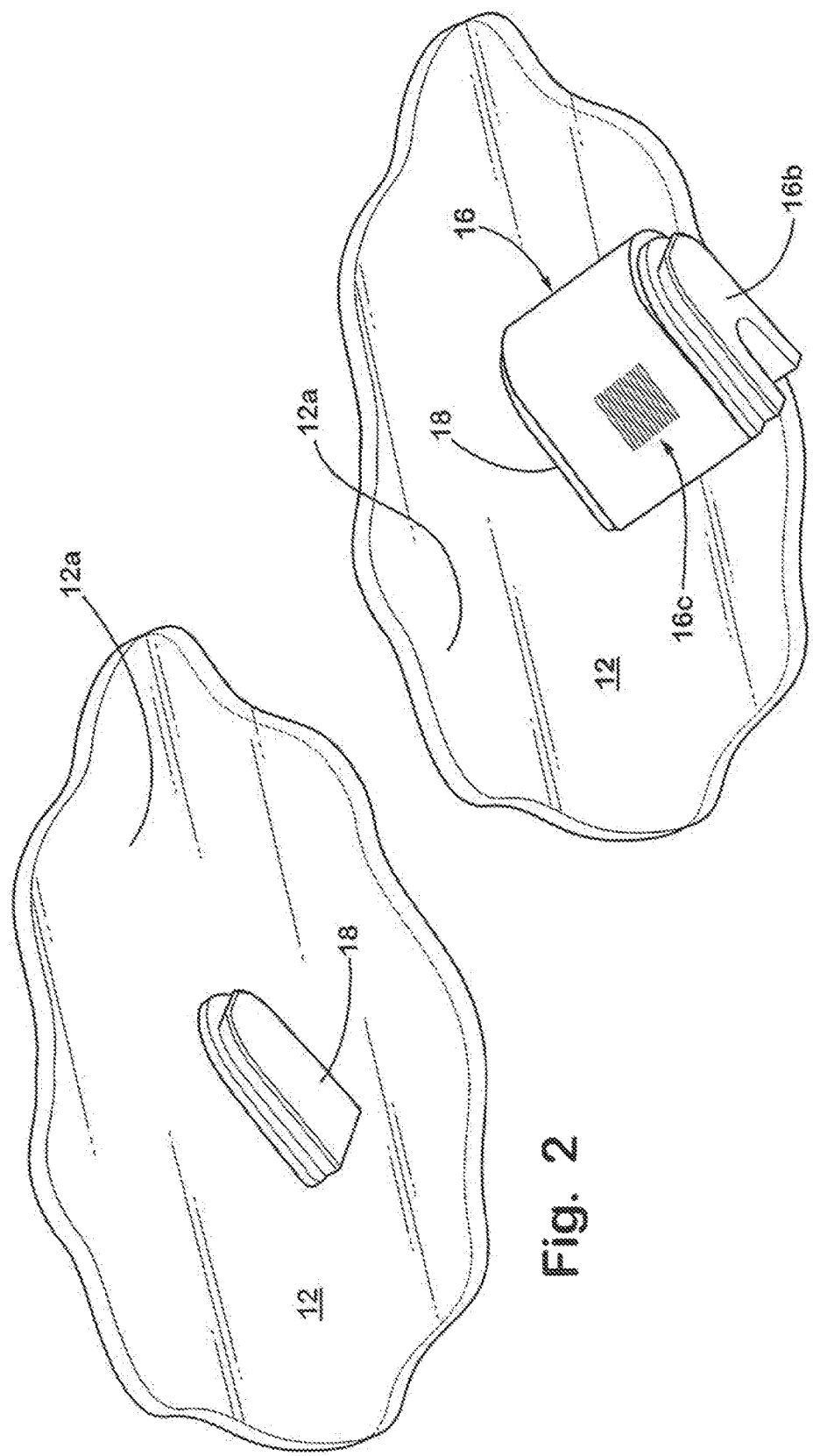

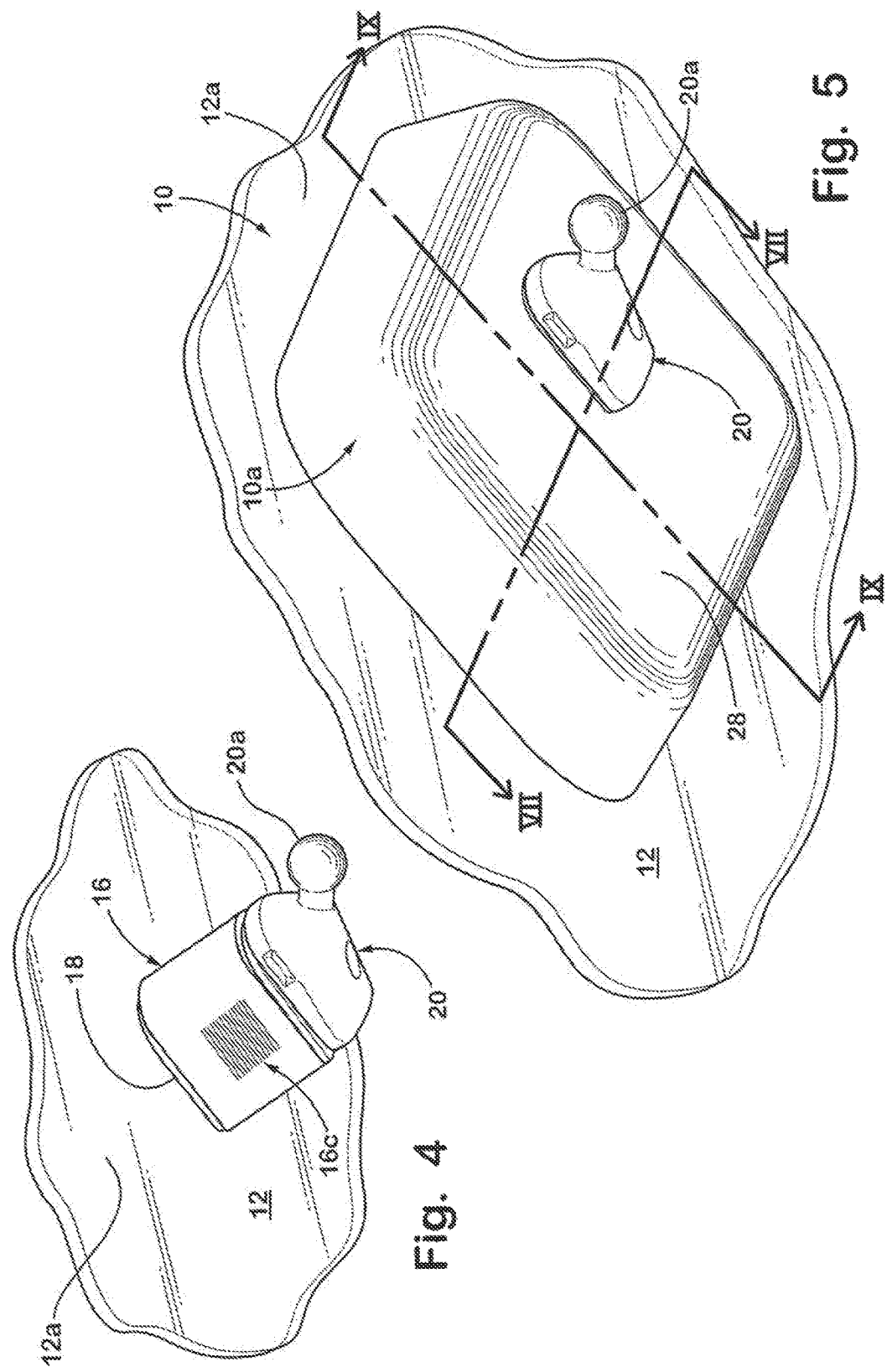

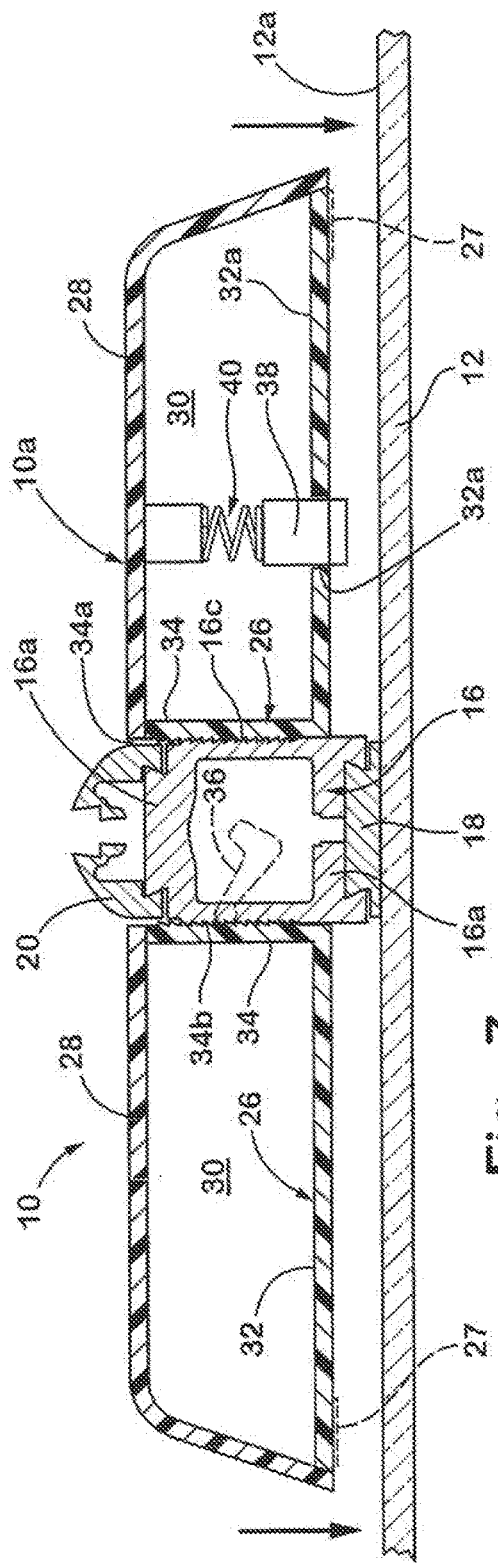
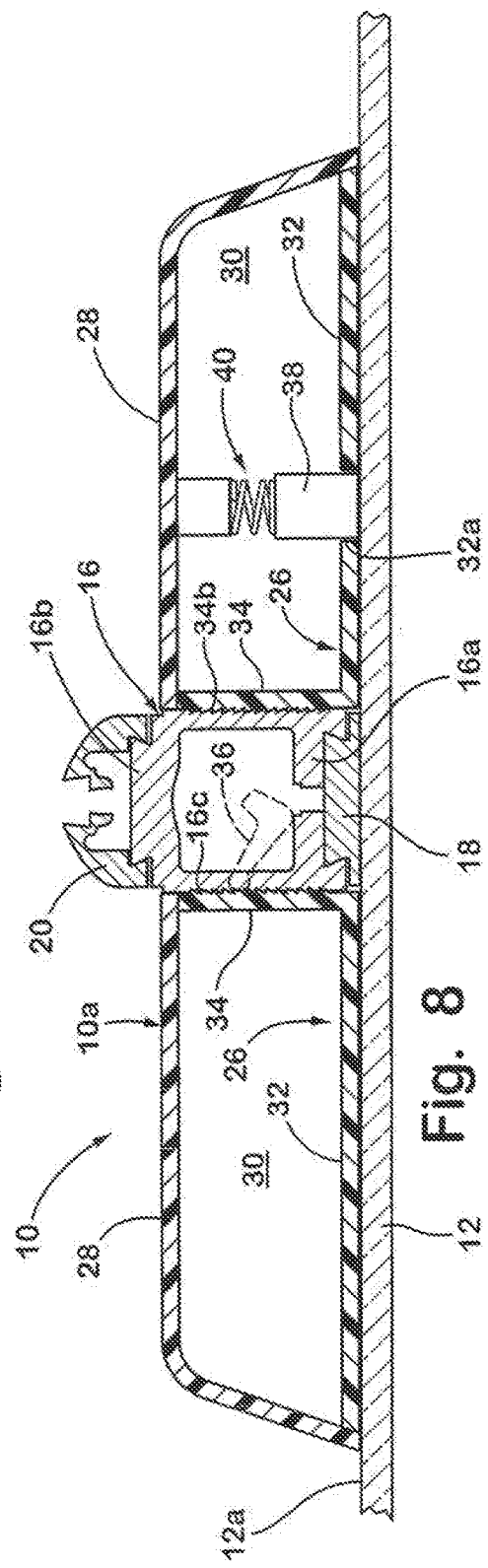

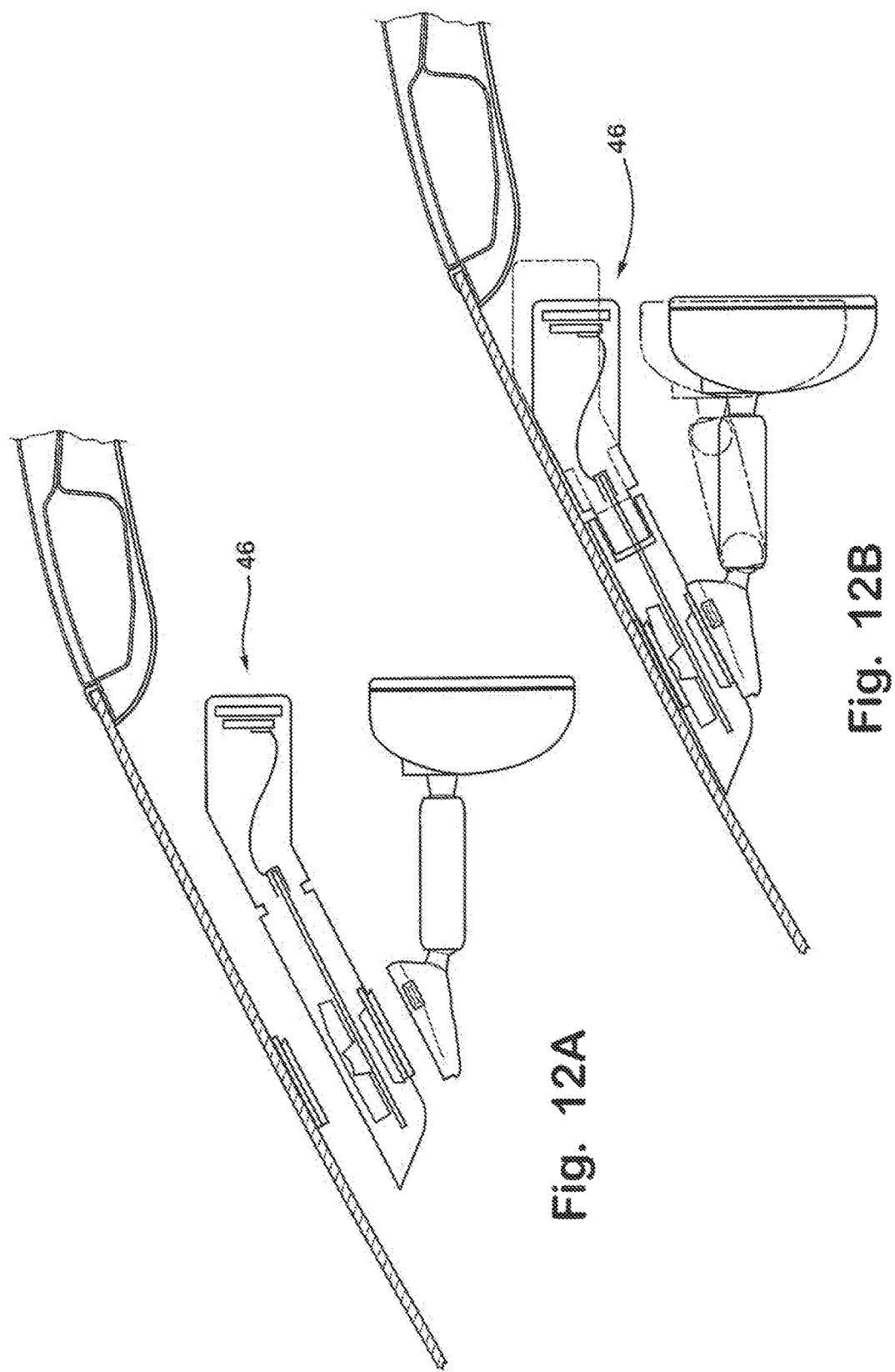

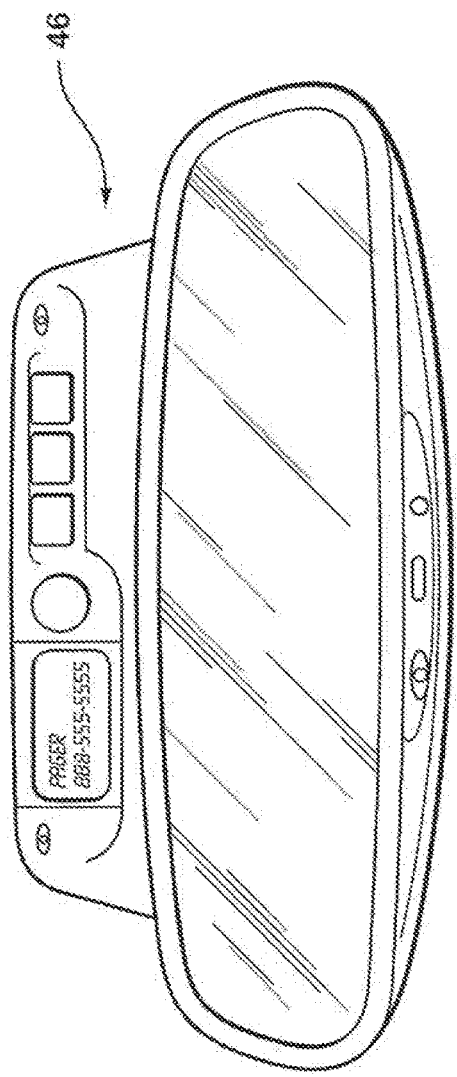
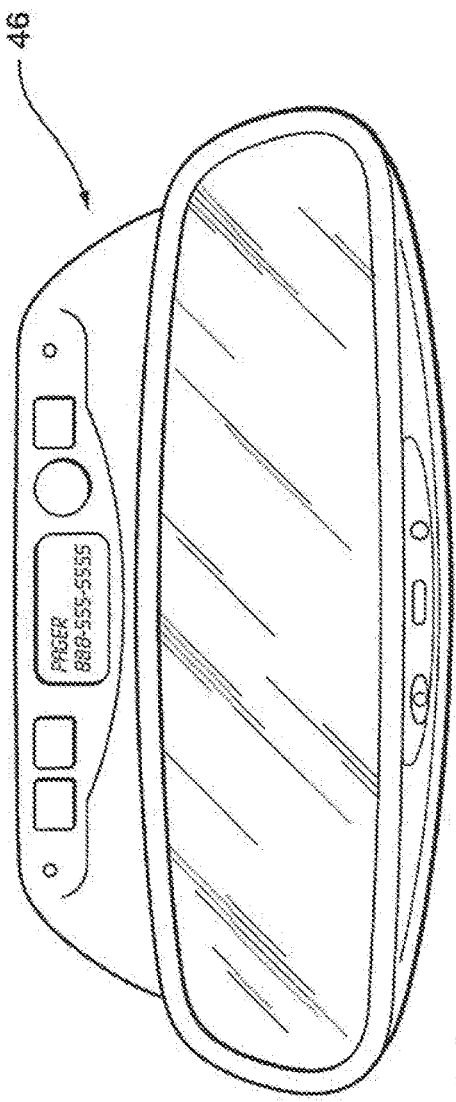
Fig. 12D
Fig. 12C

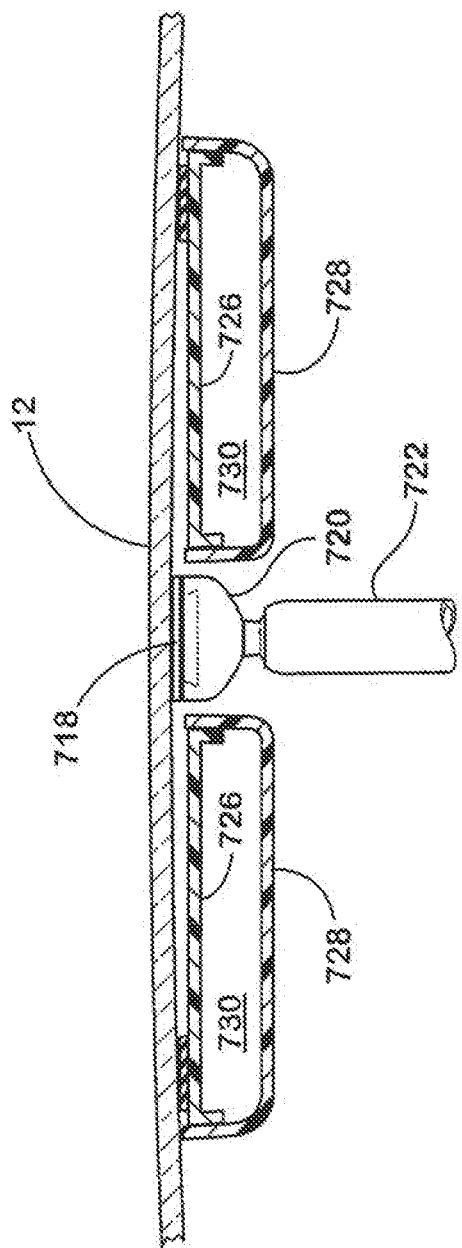

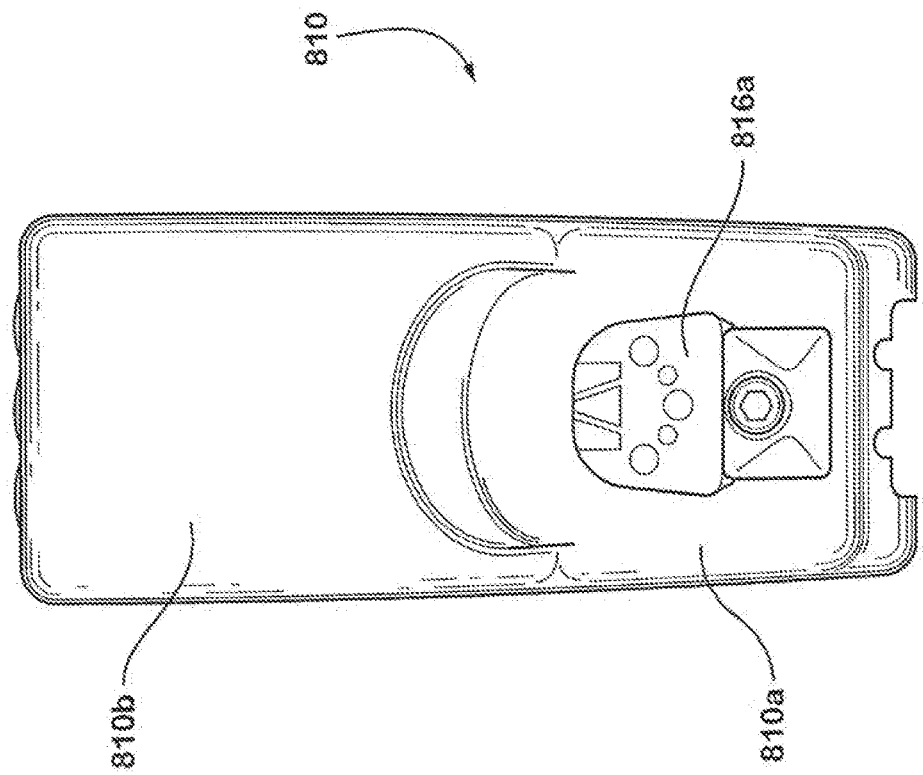
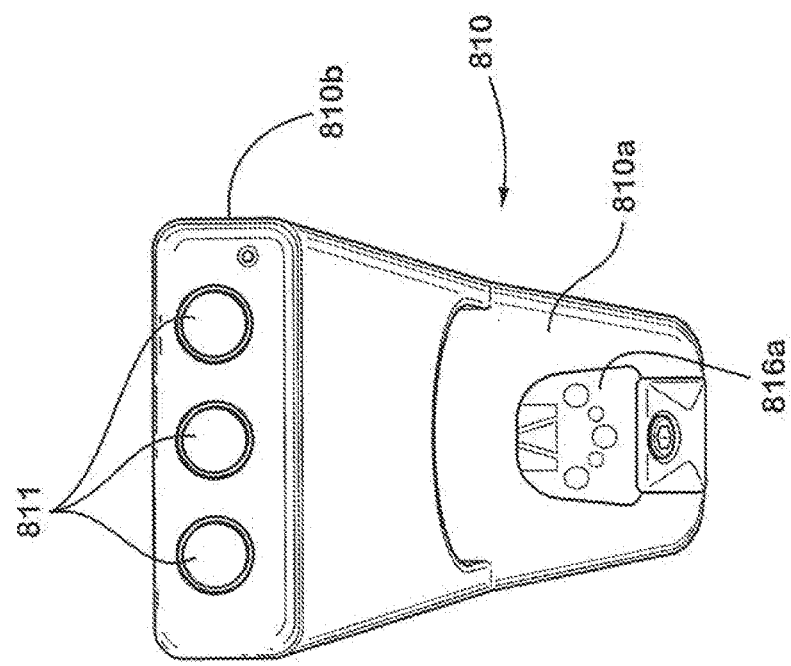
Fig. 24B
Fig. 24A

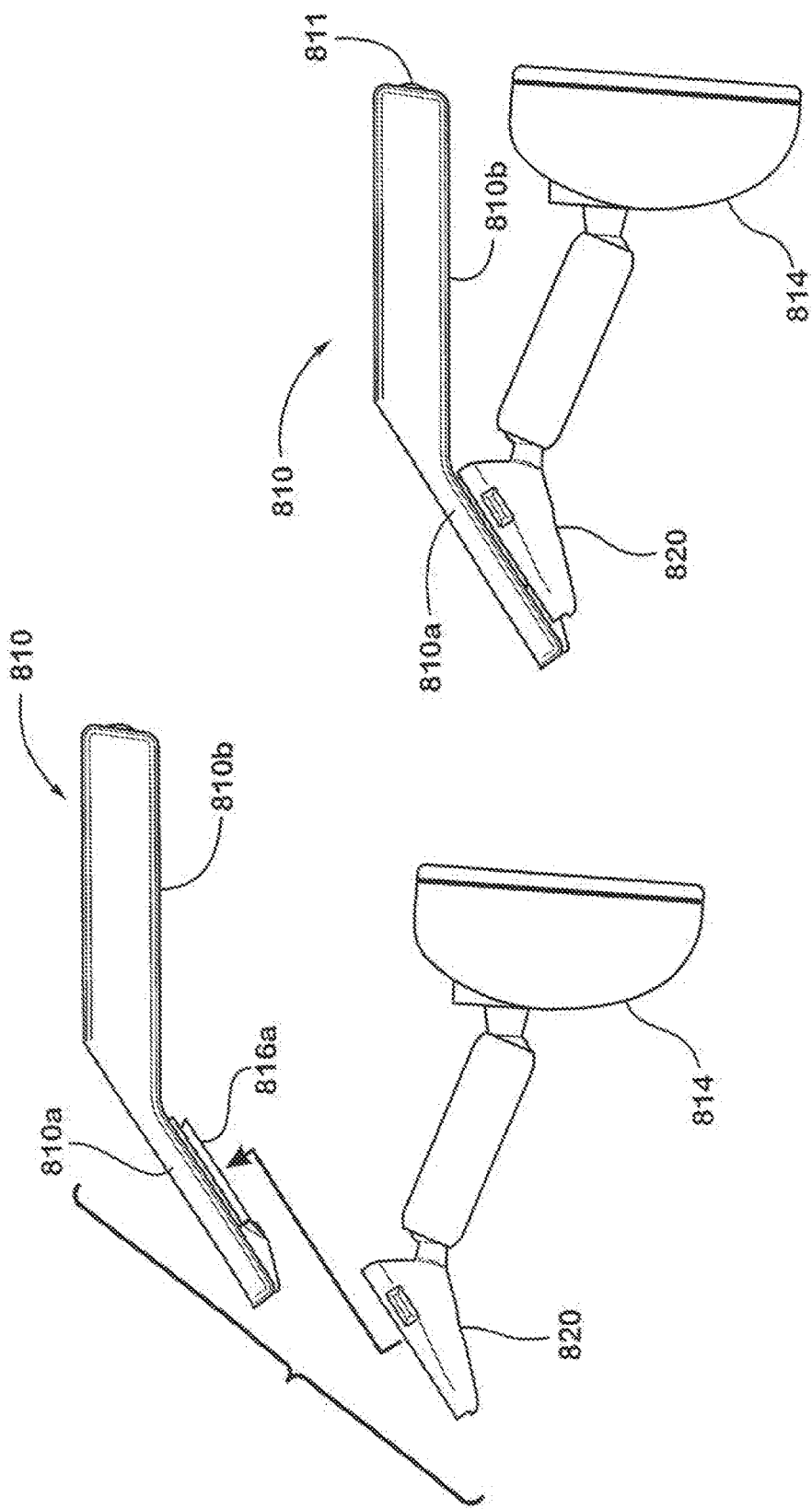

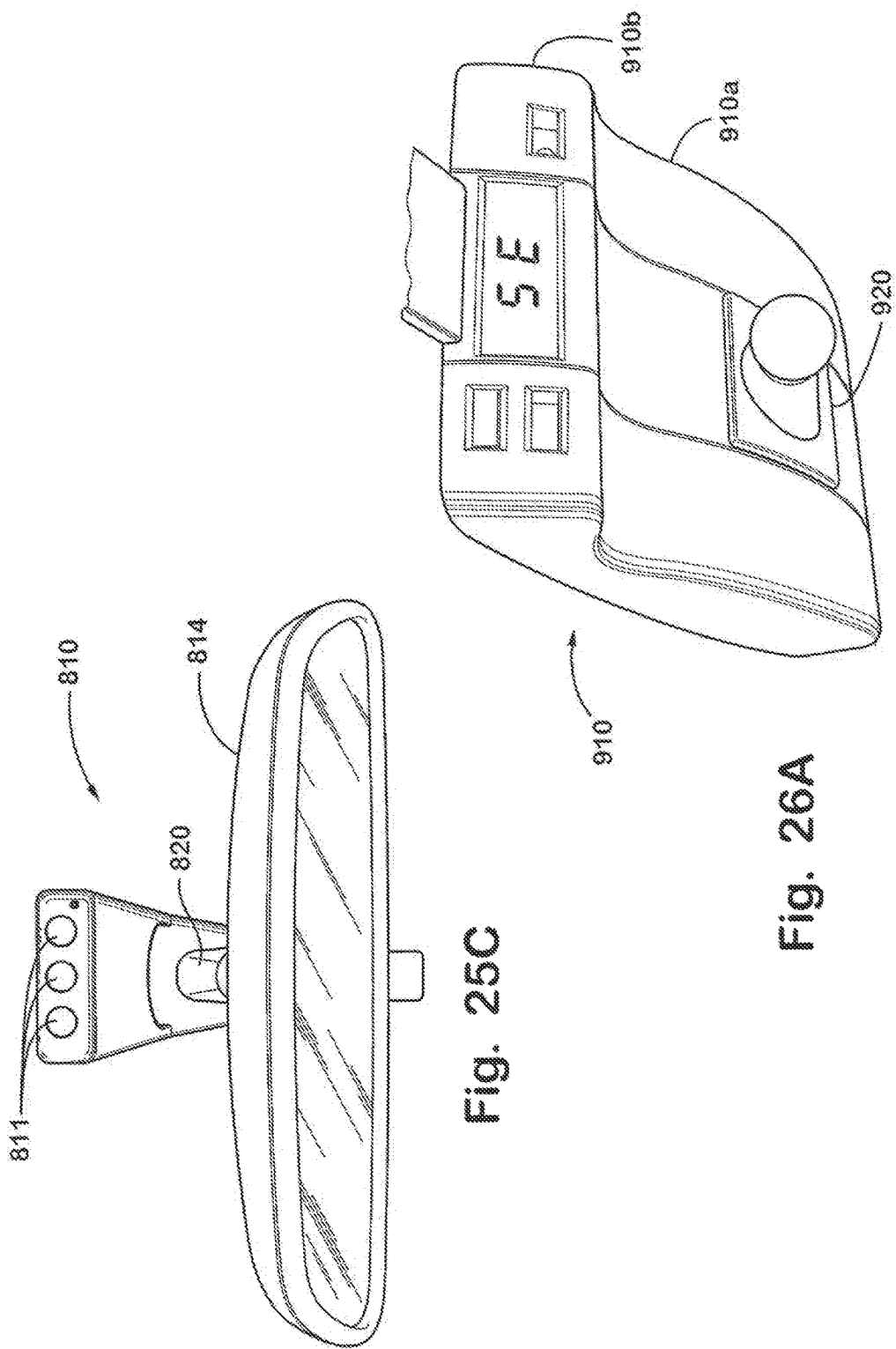

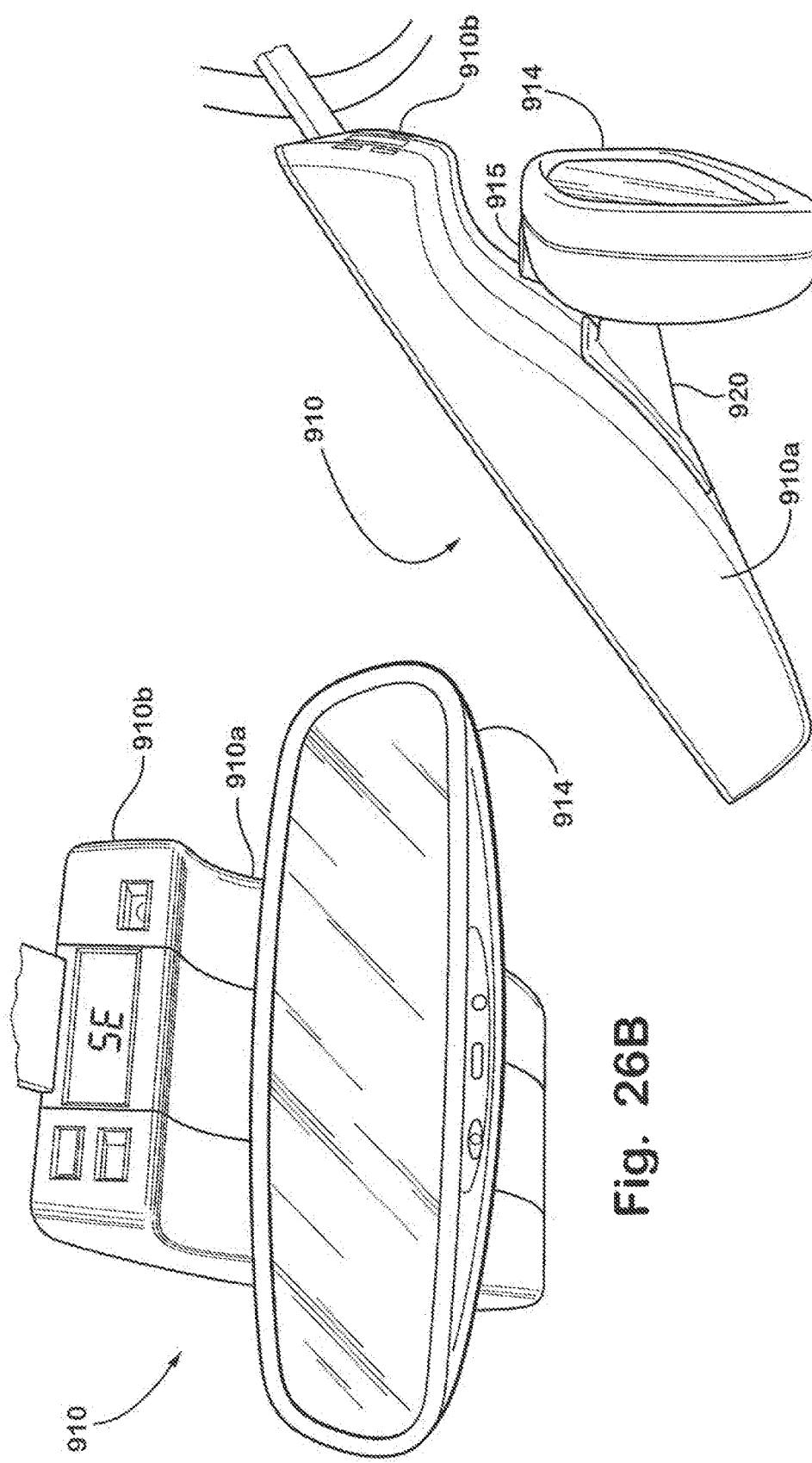

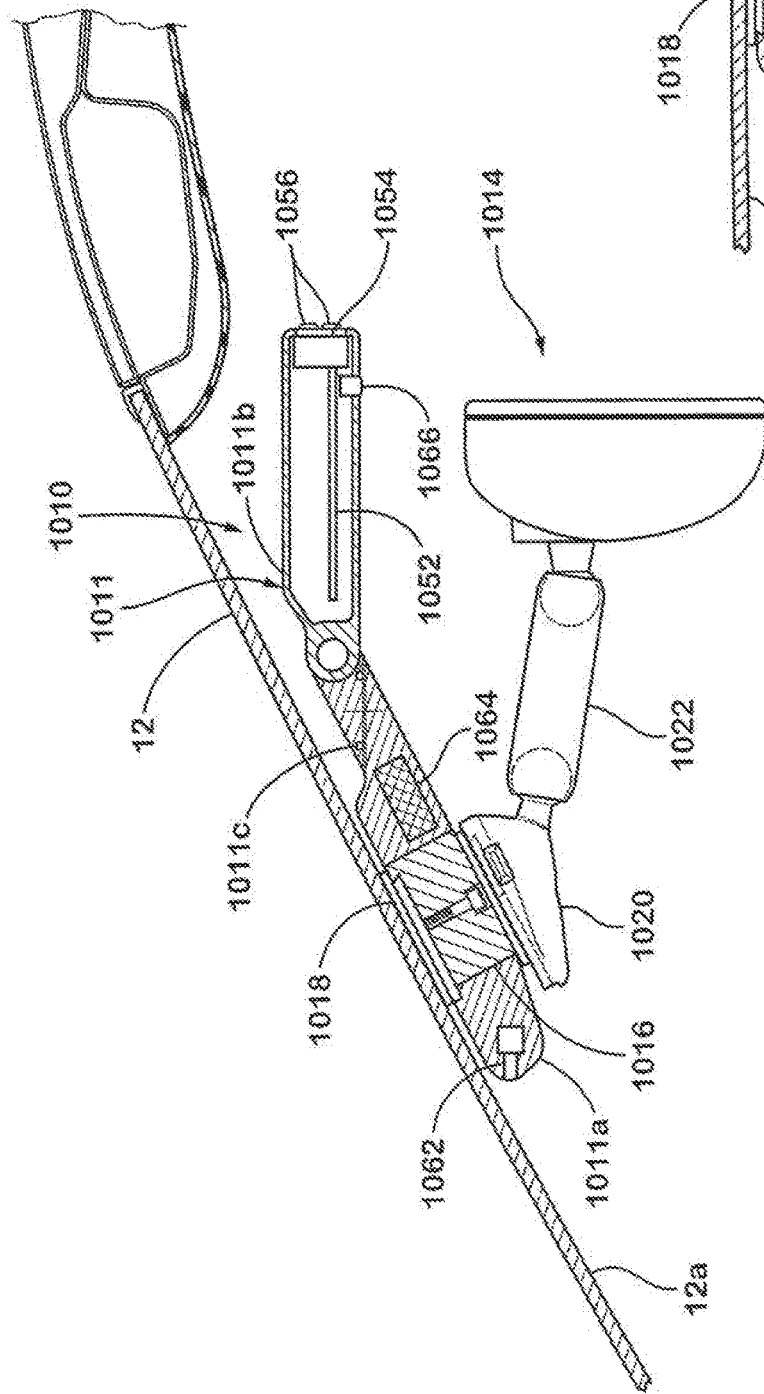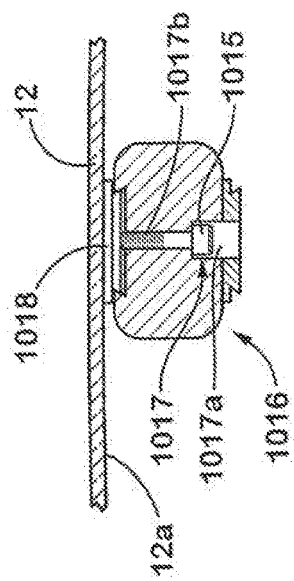
Fig. 27
Fig. 28

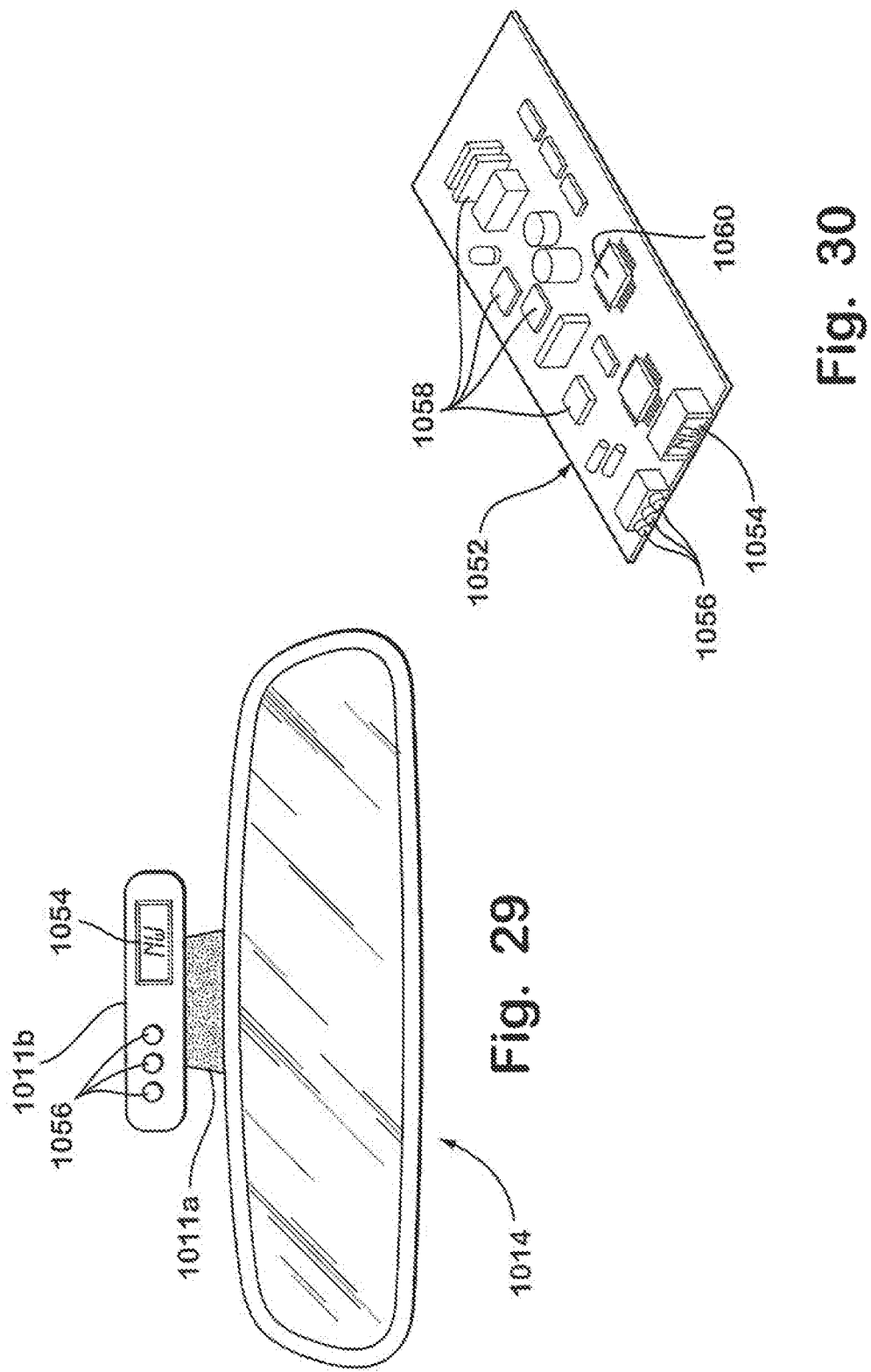

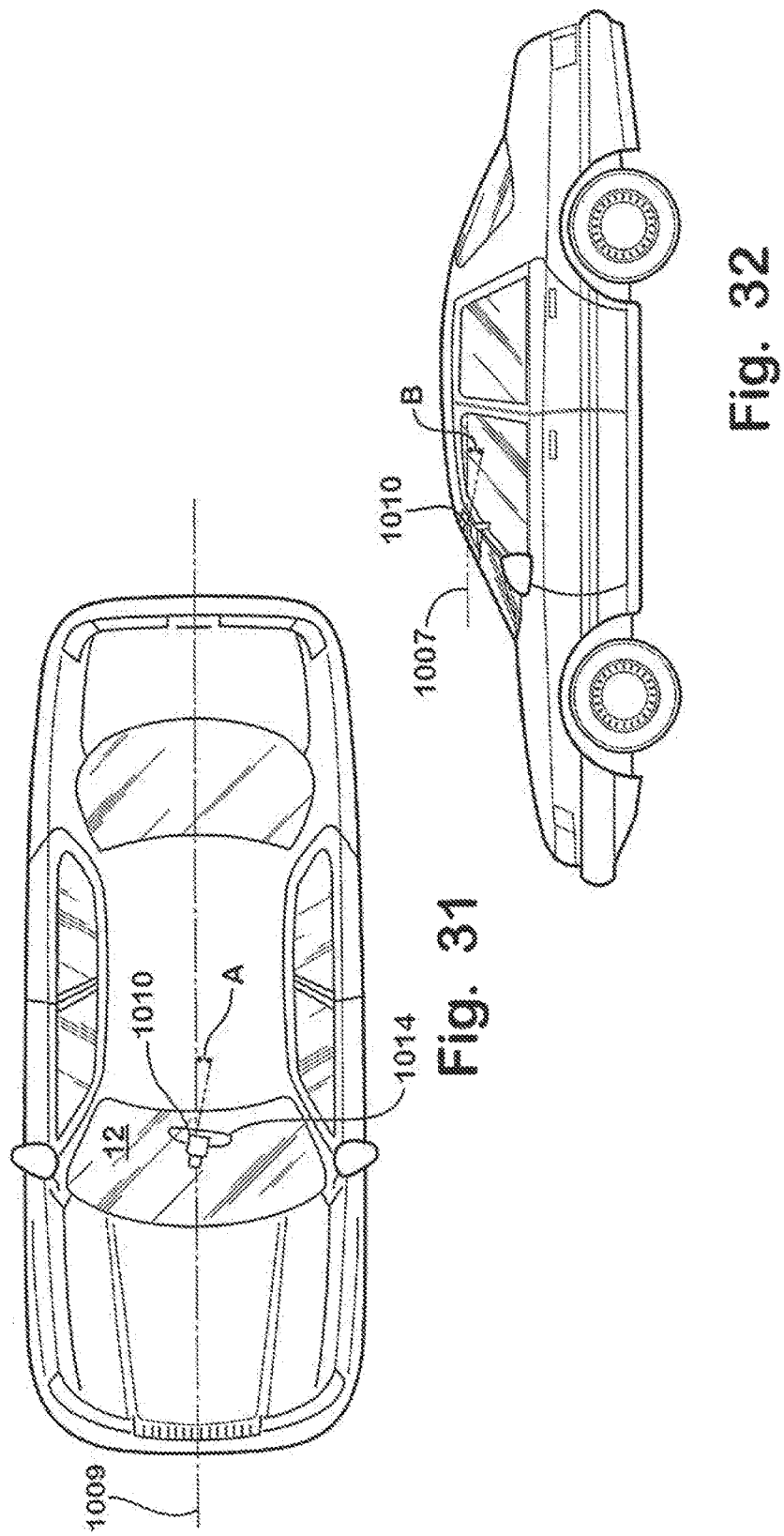

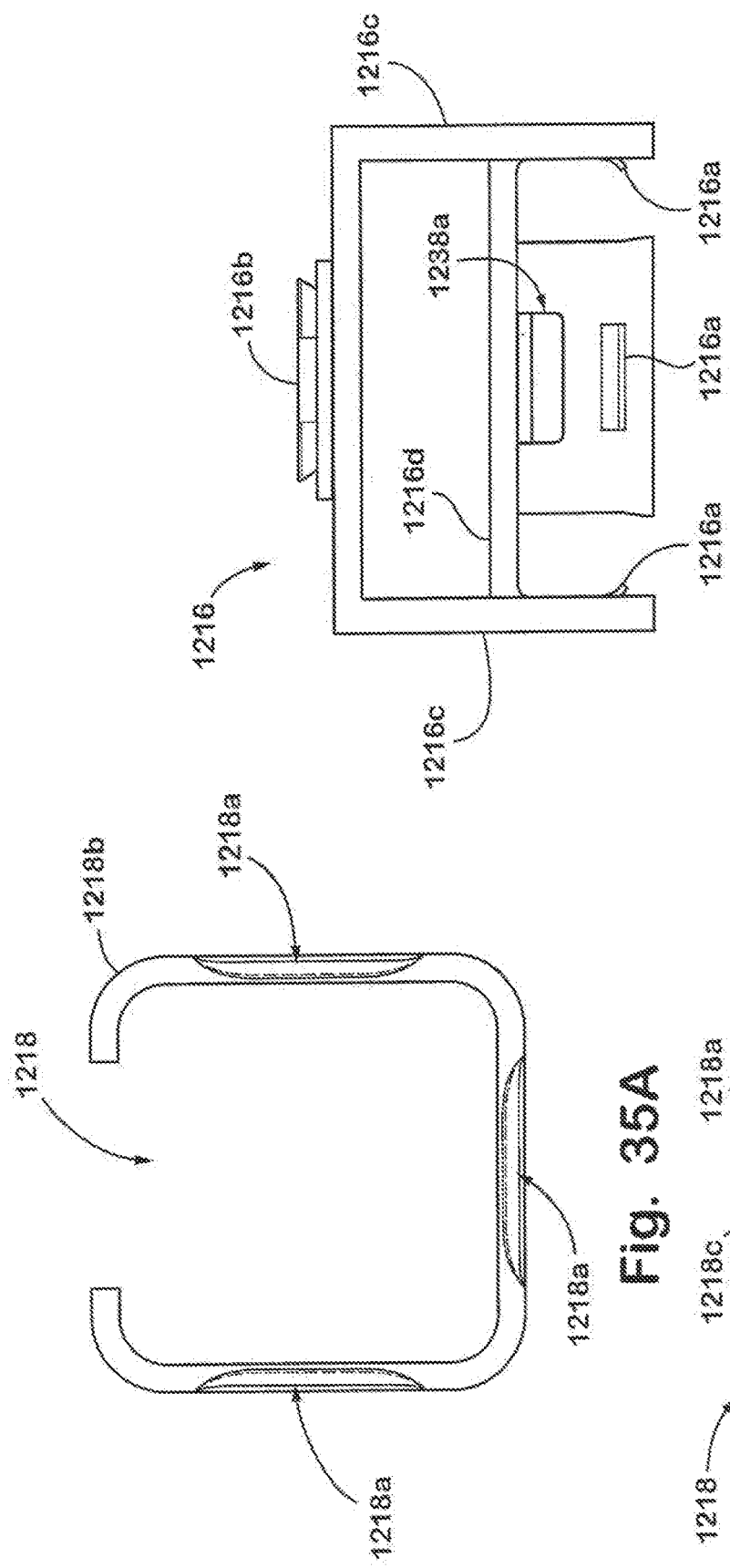

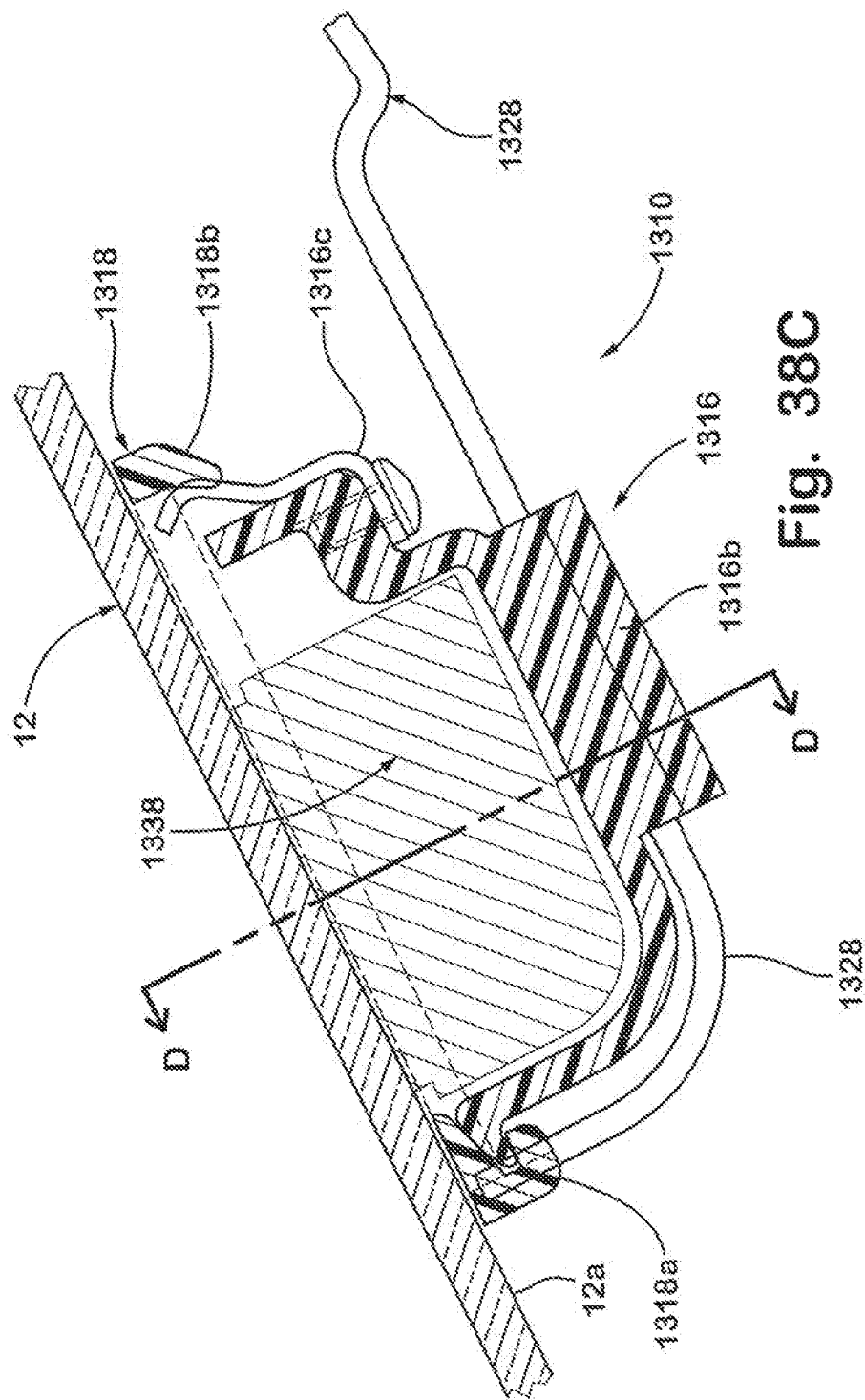

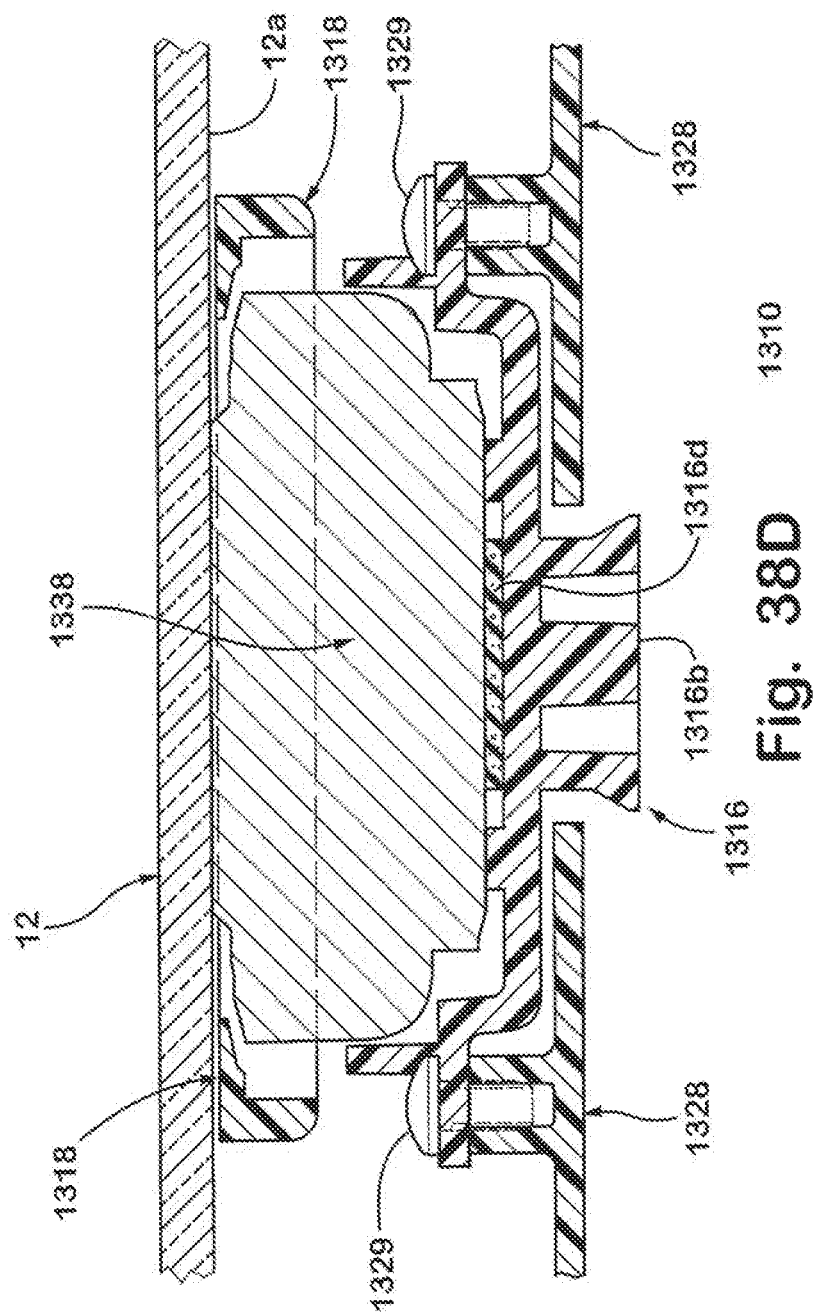

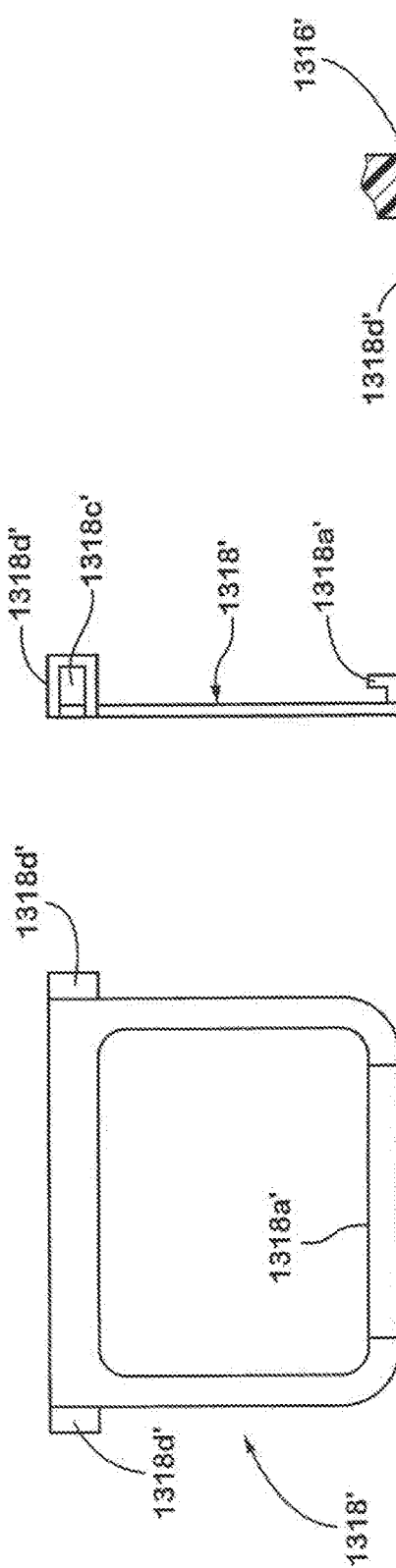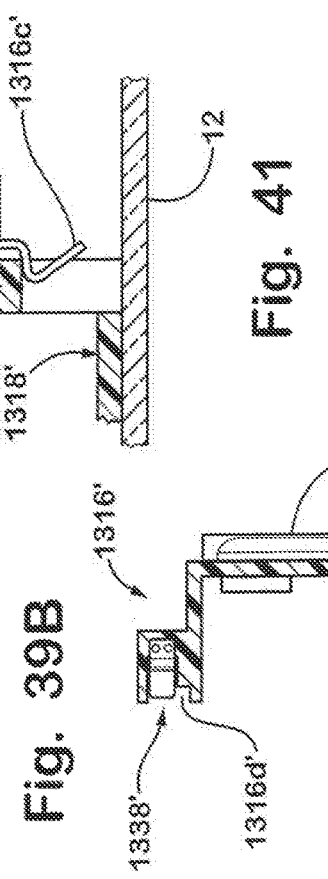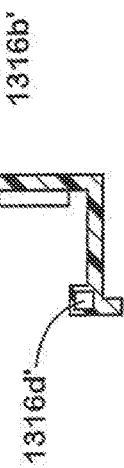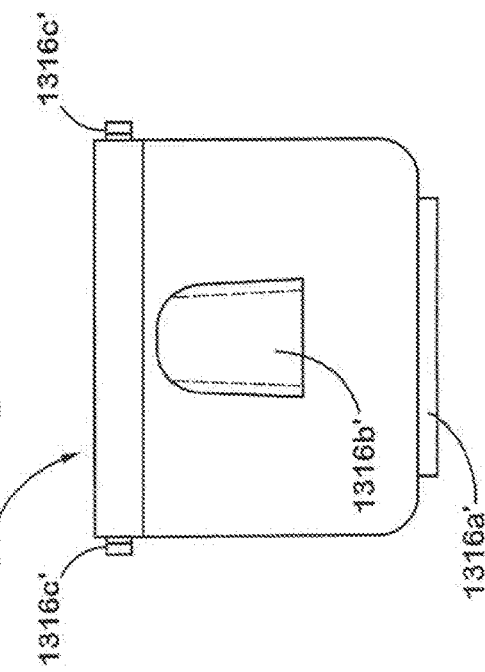

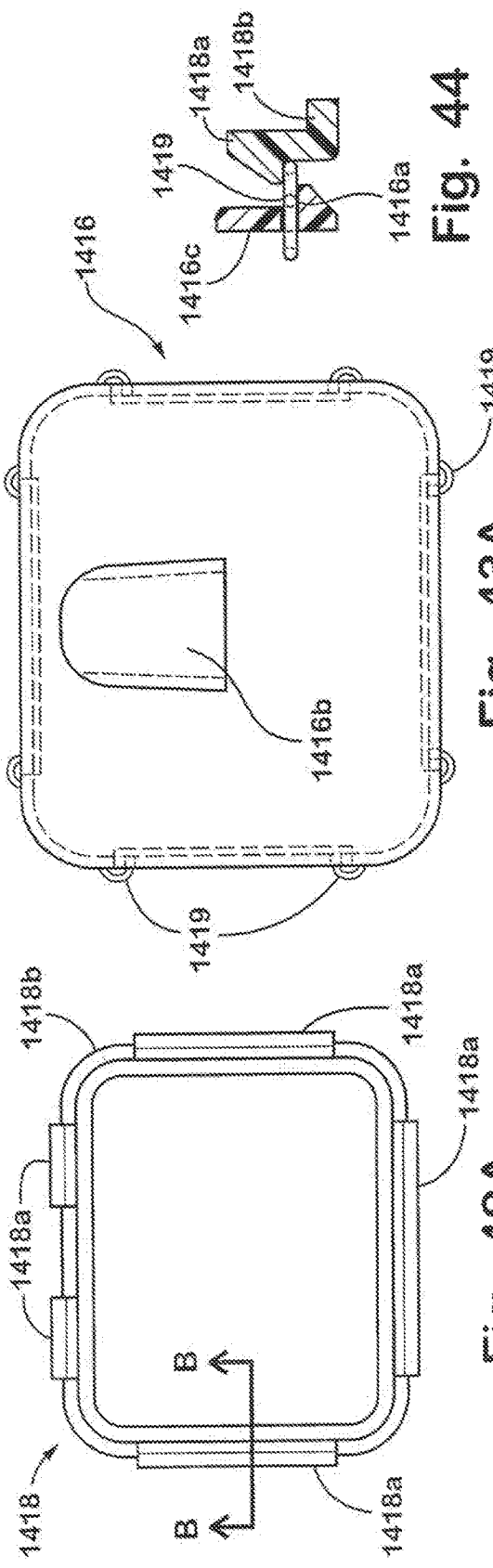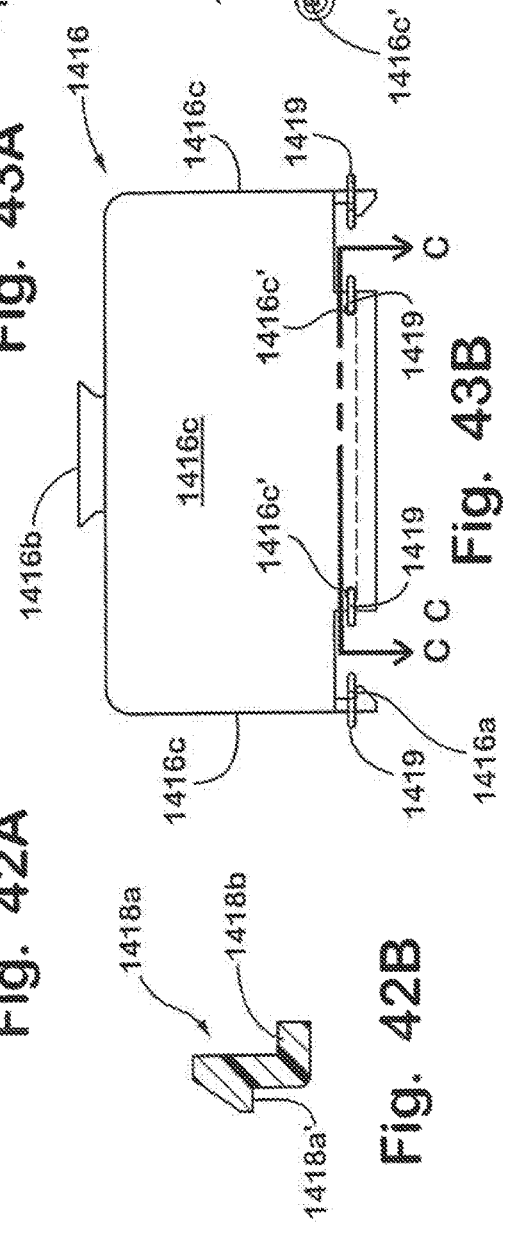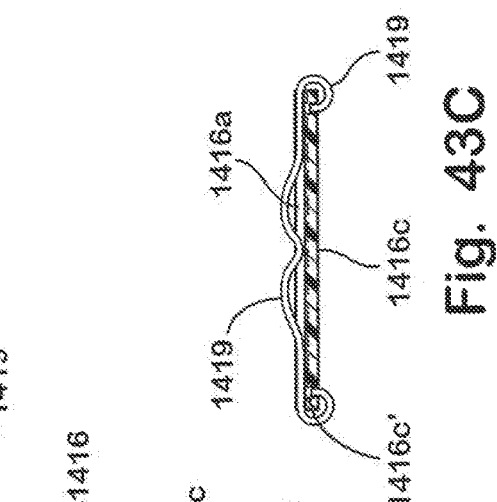

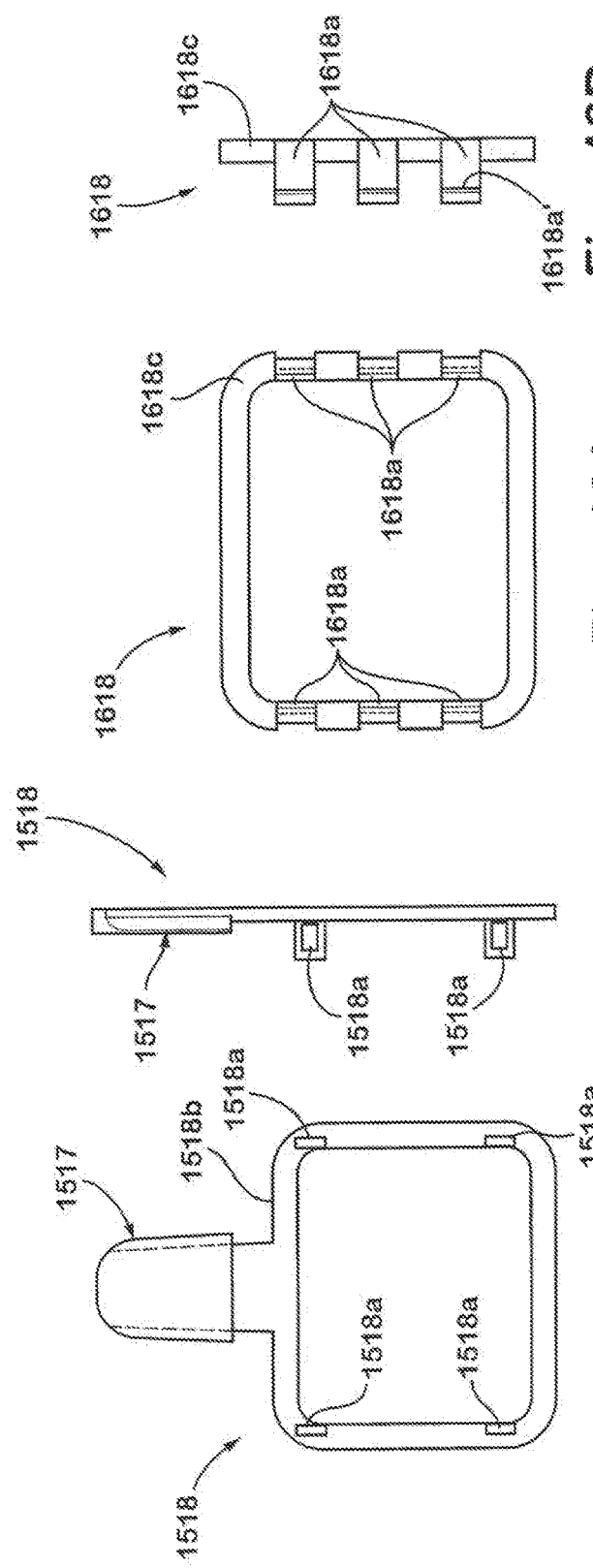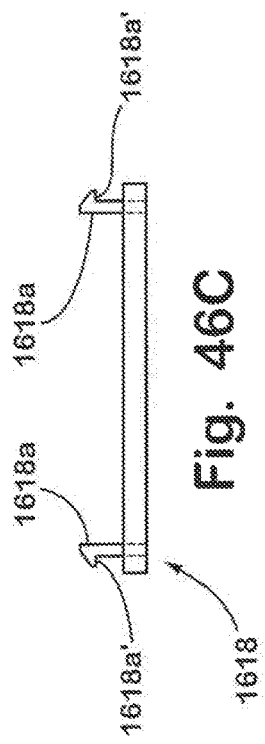

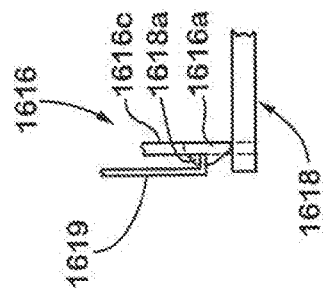
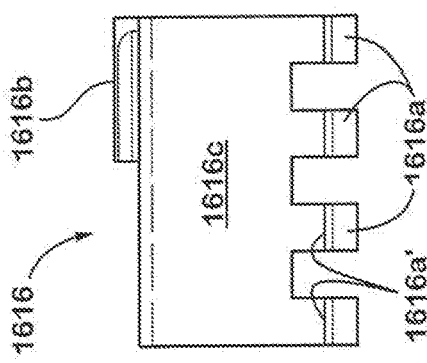
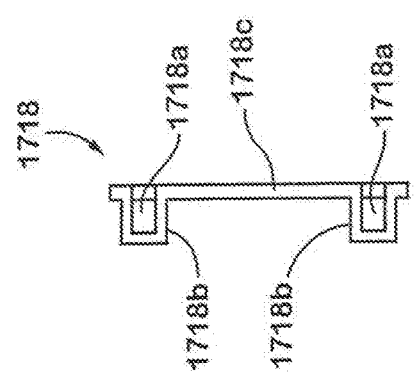
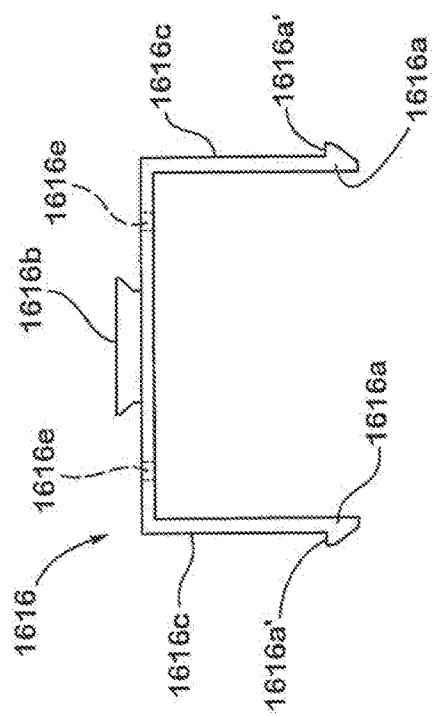
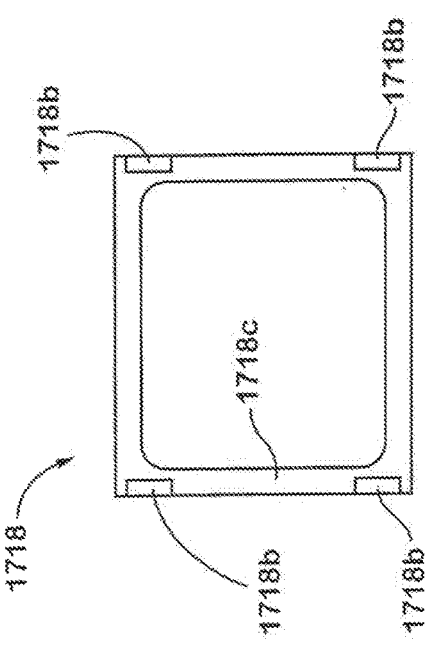

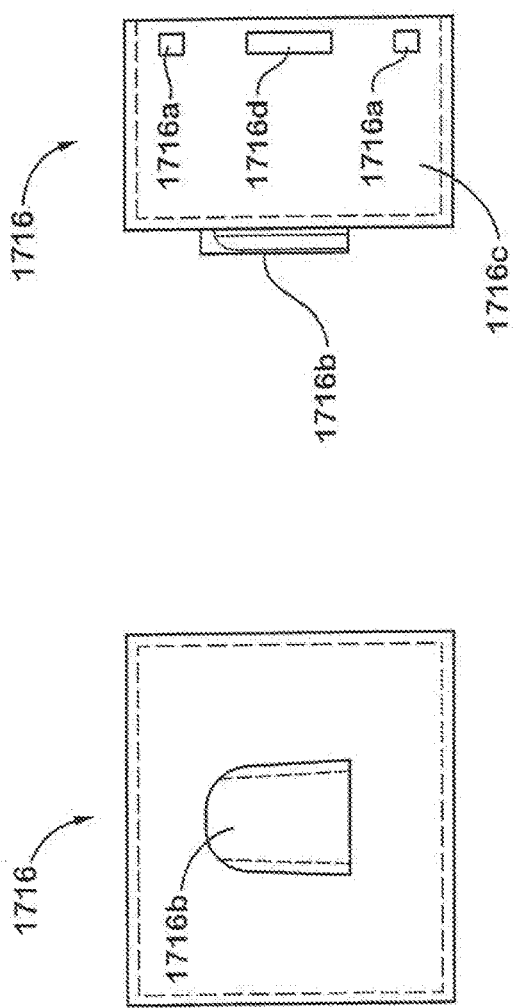
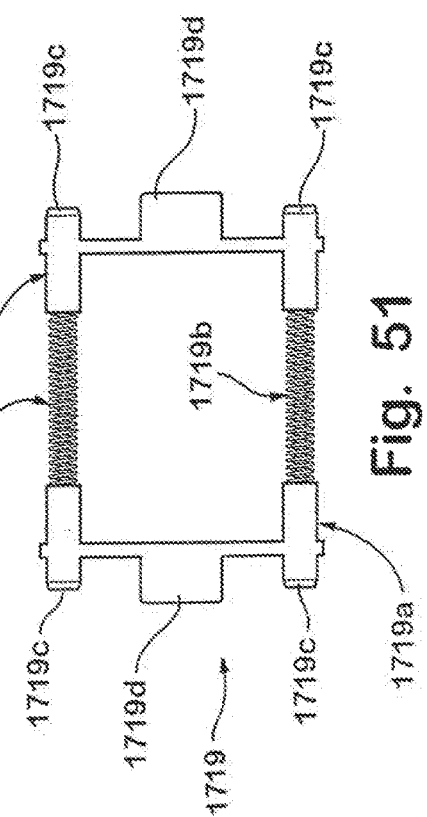

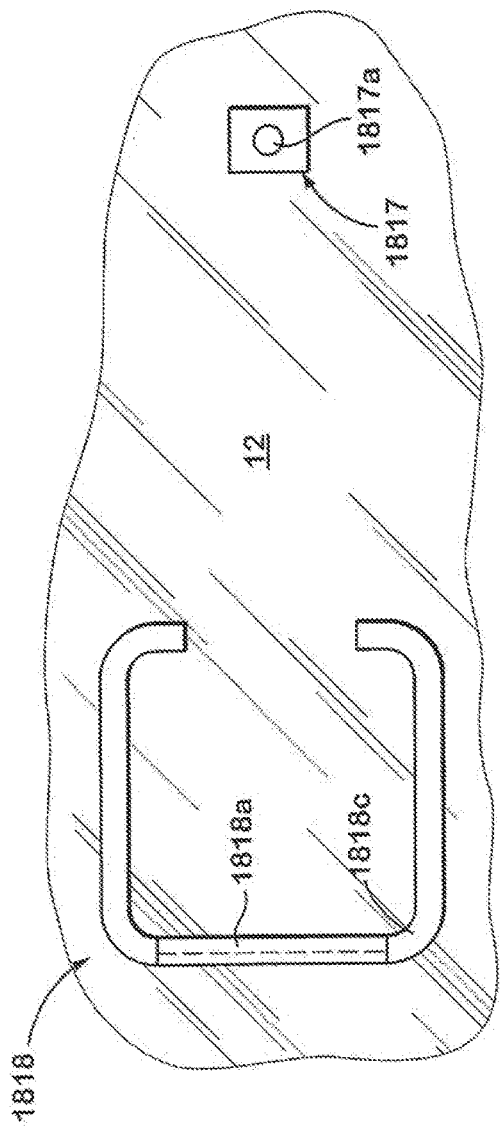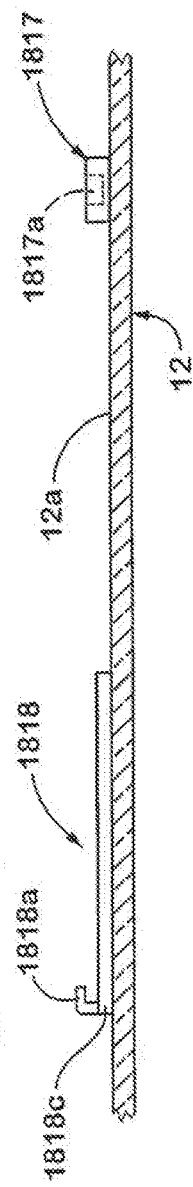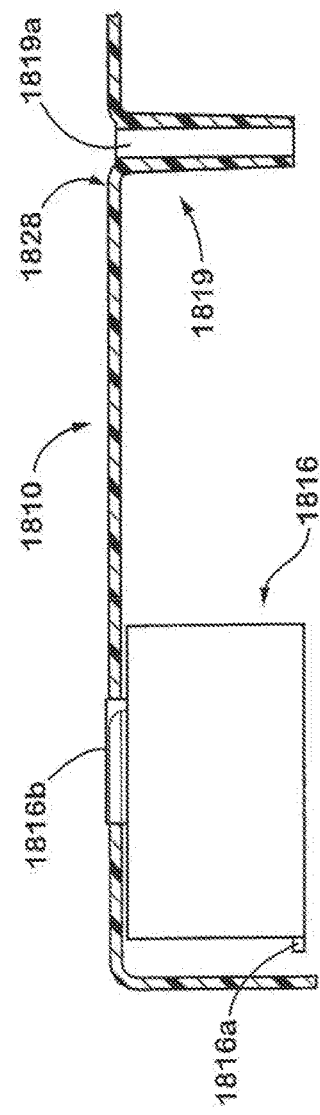

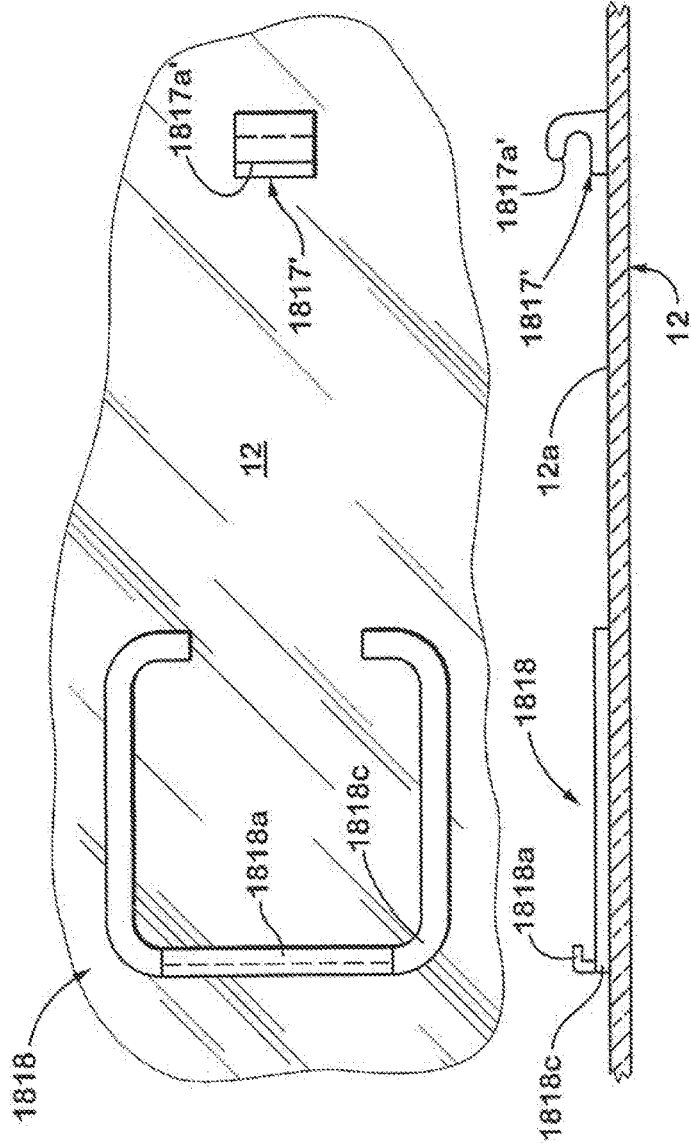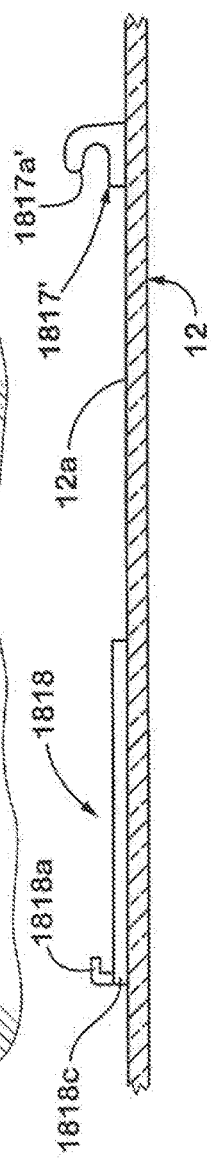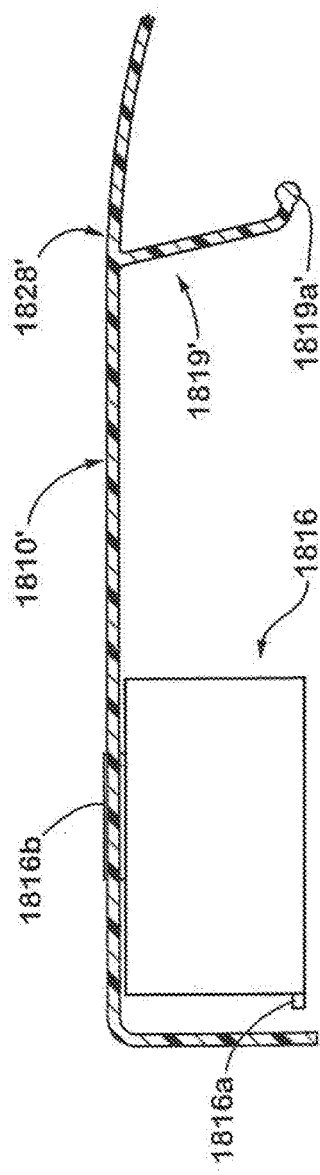
Fig. 54A
Fig. 54B
Fig. 55

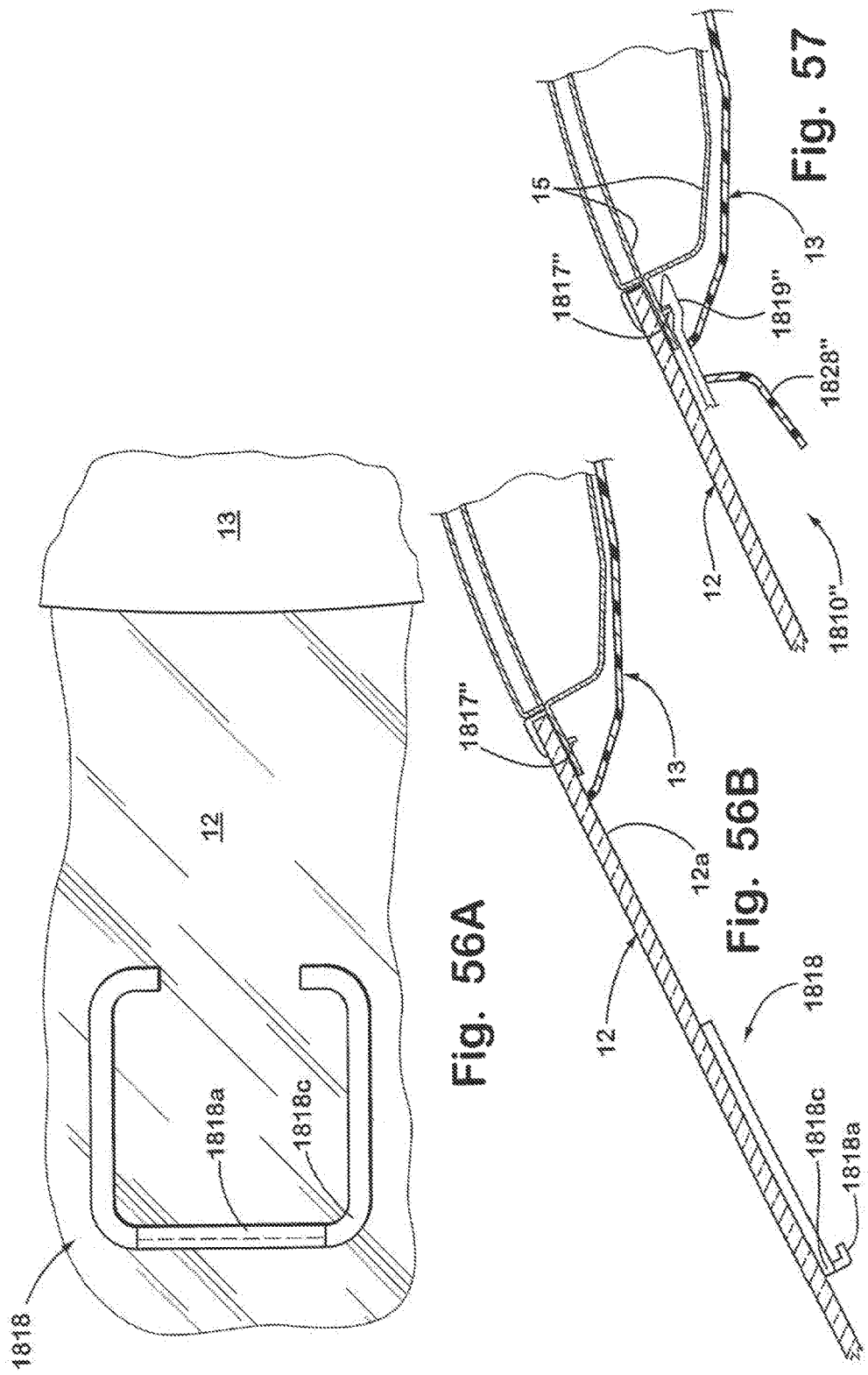

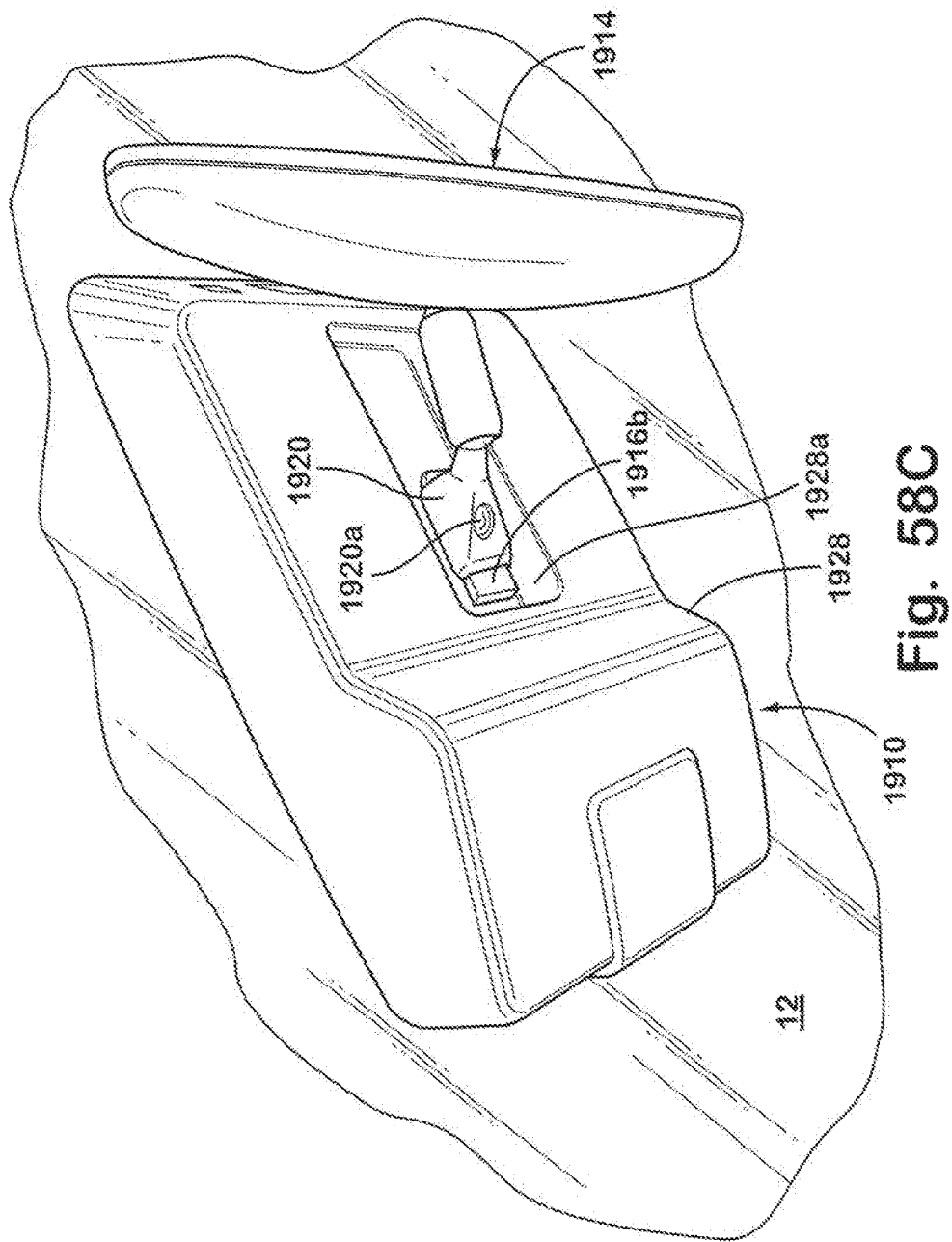

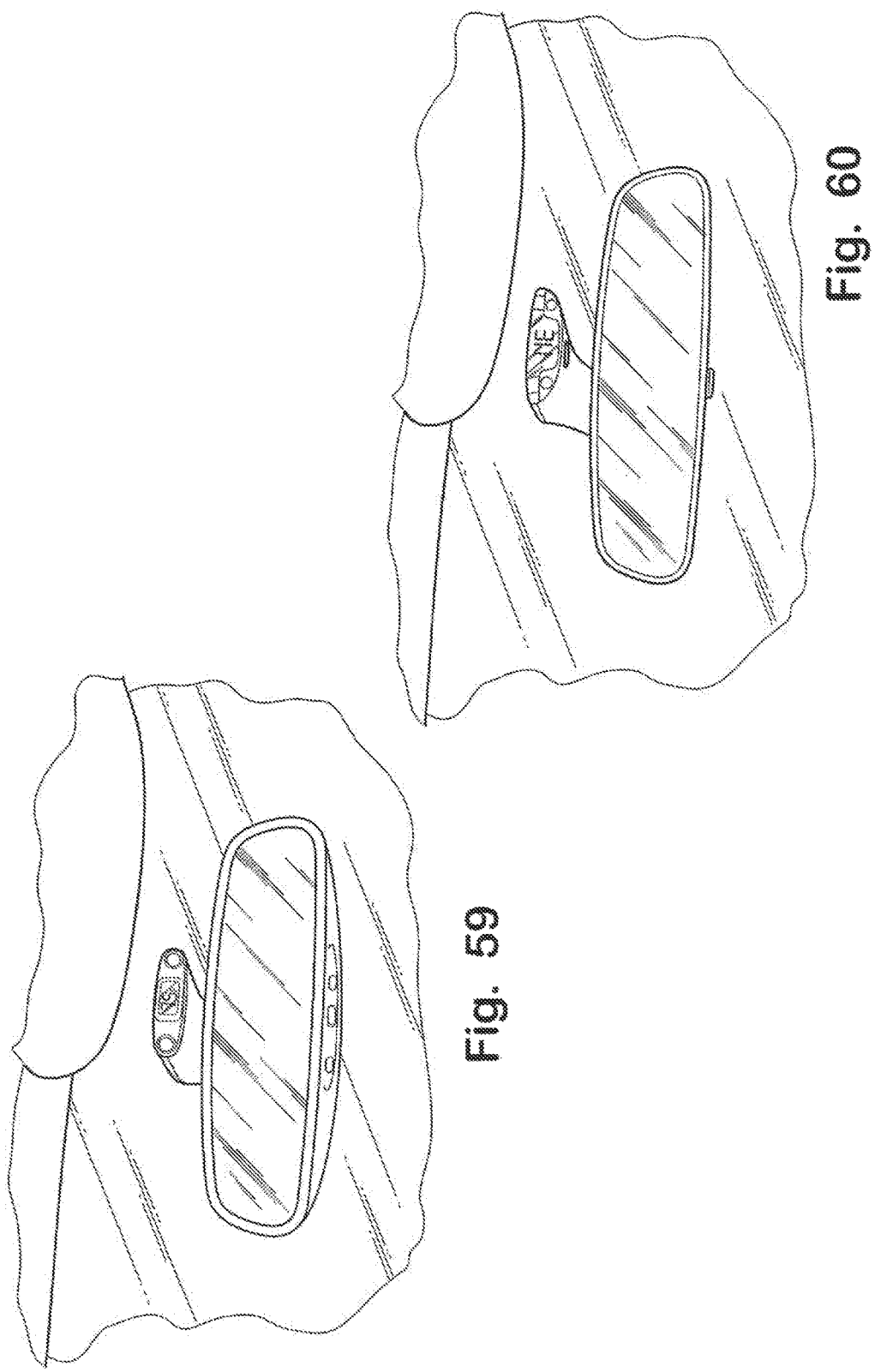

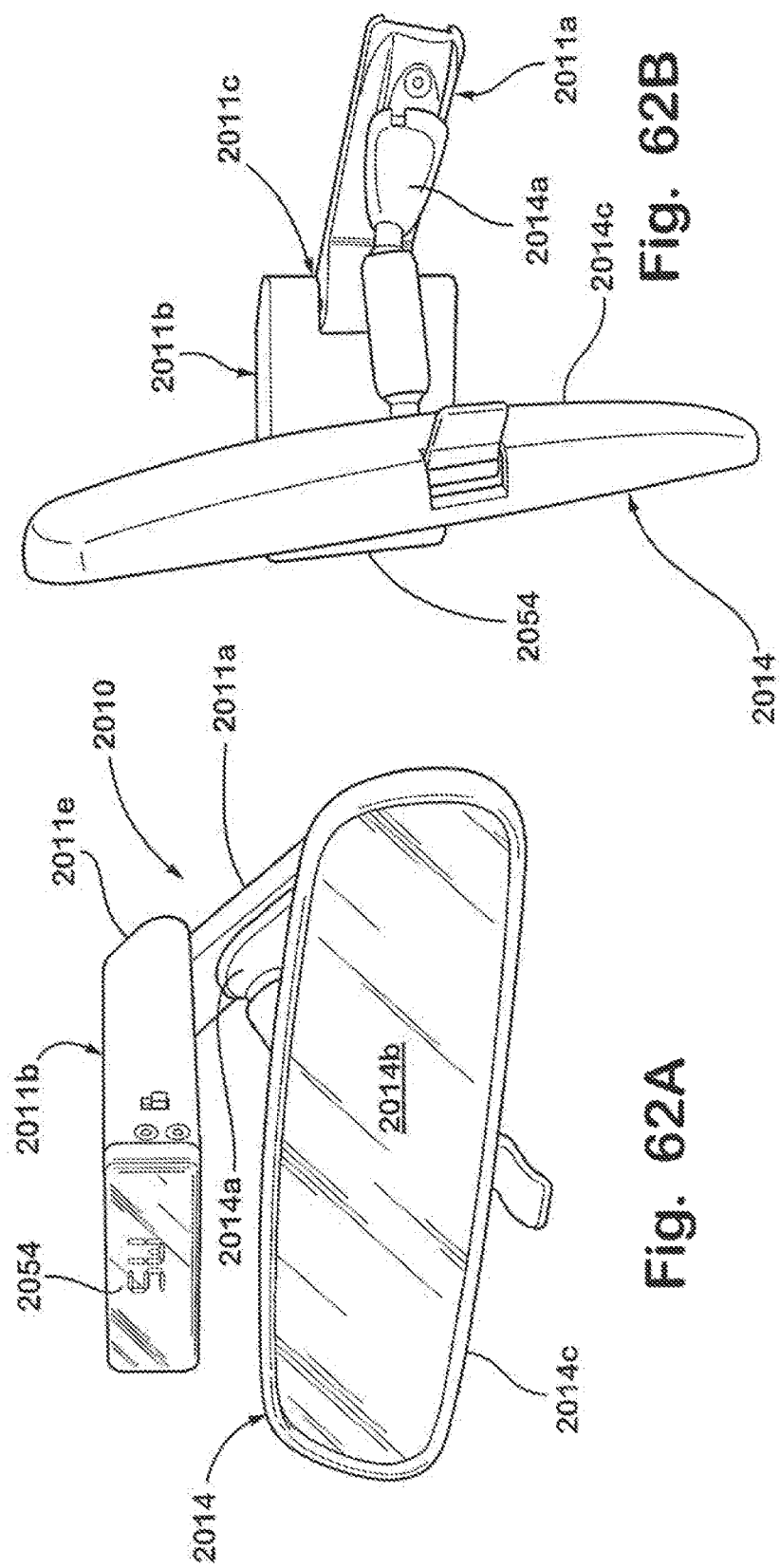

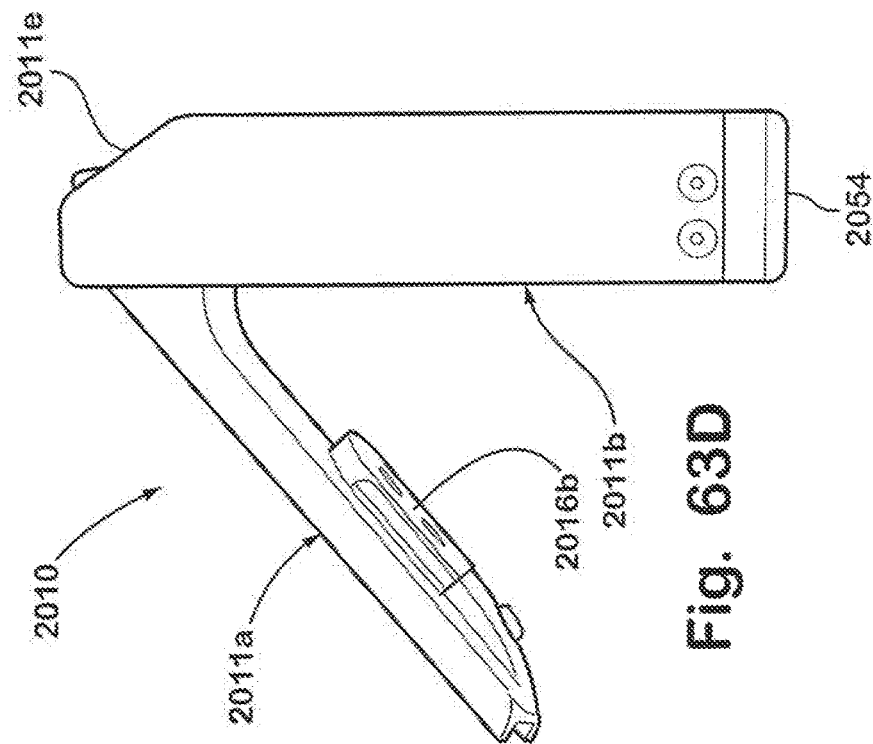
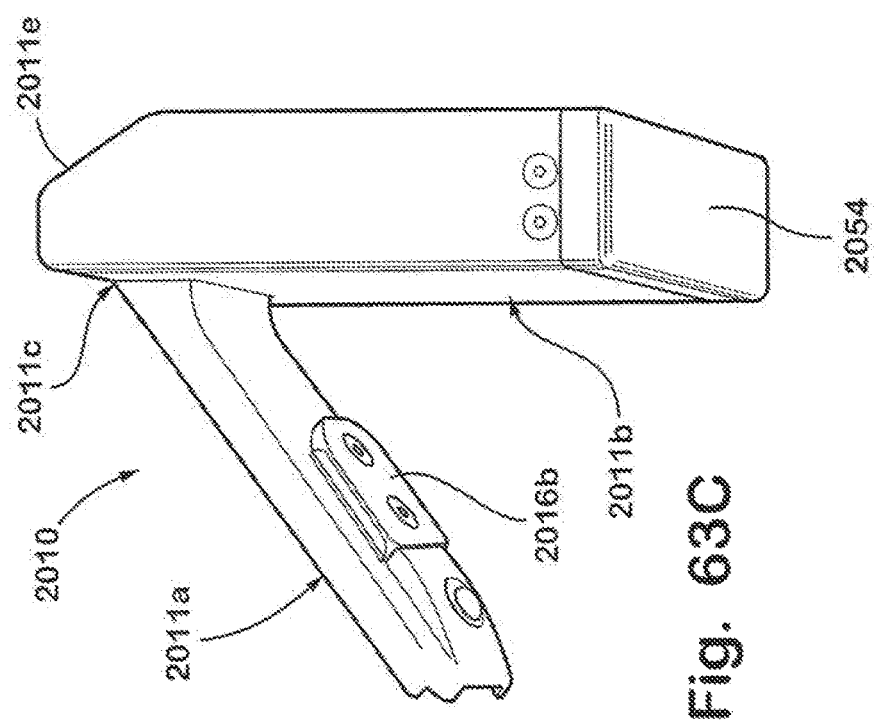

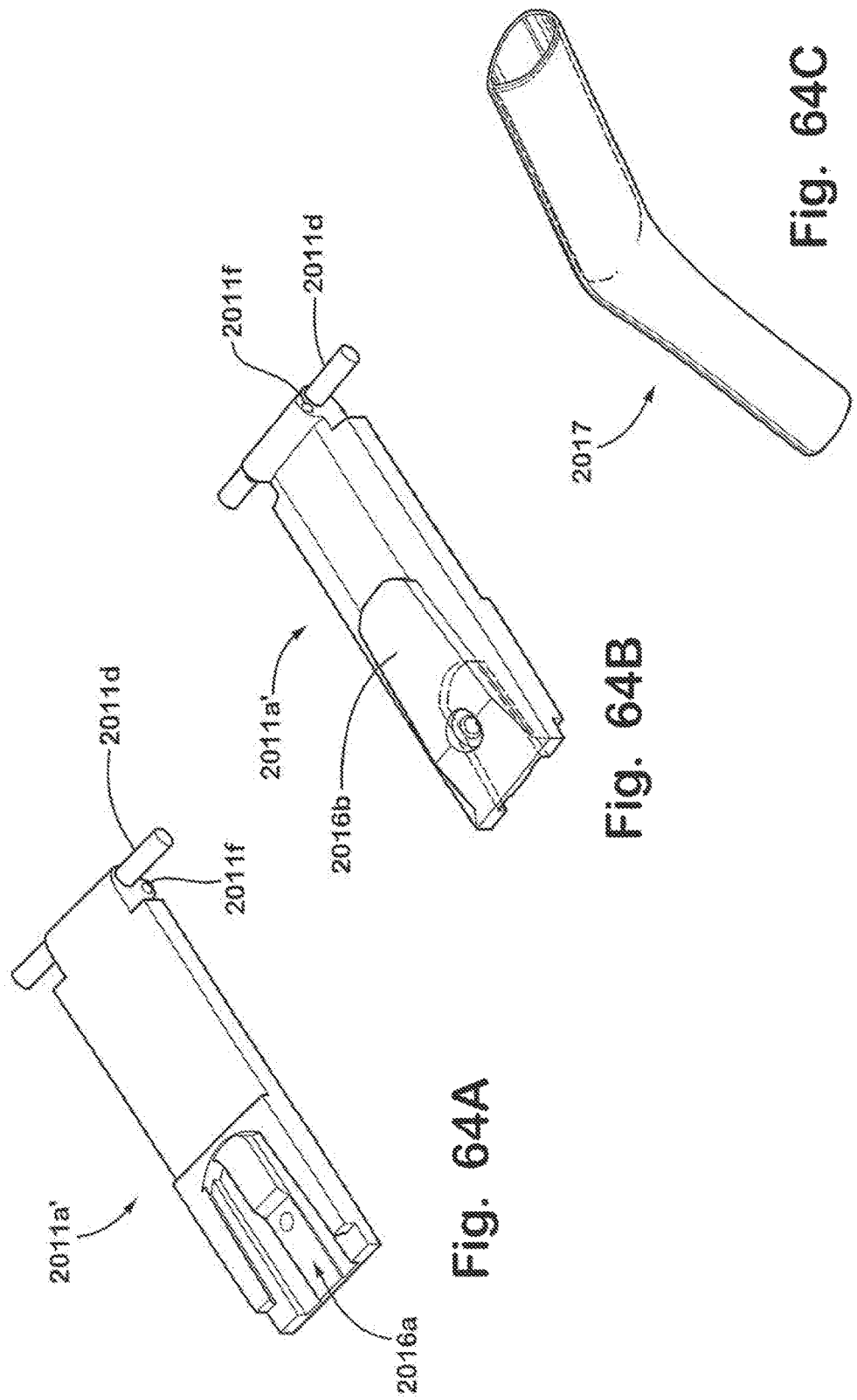

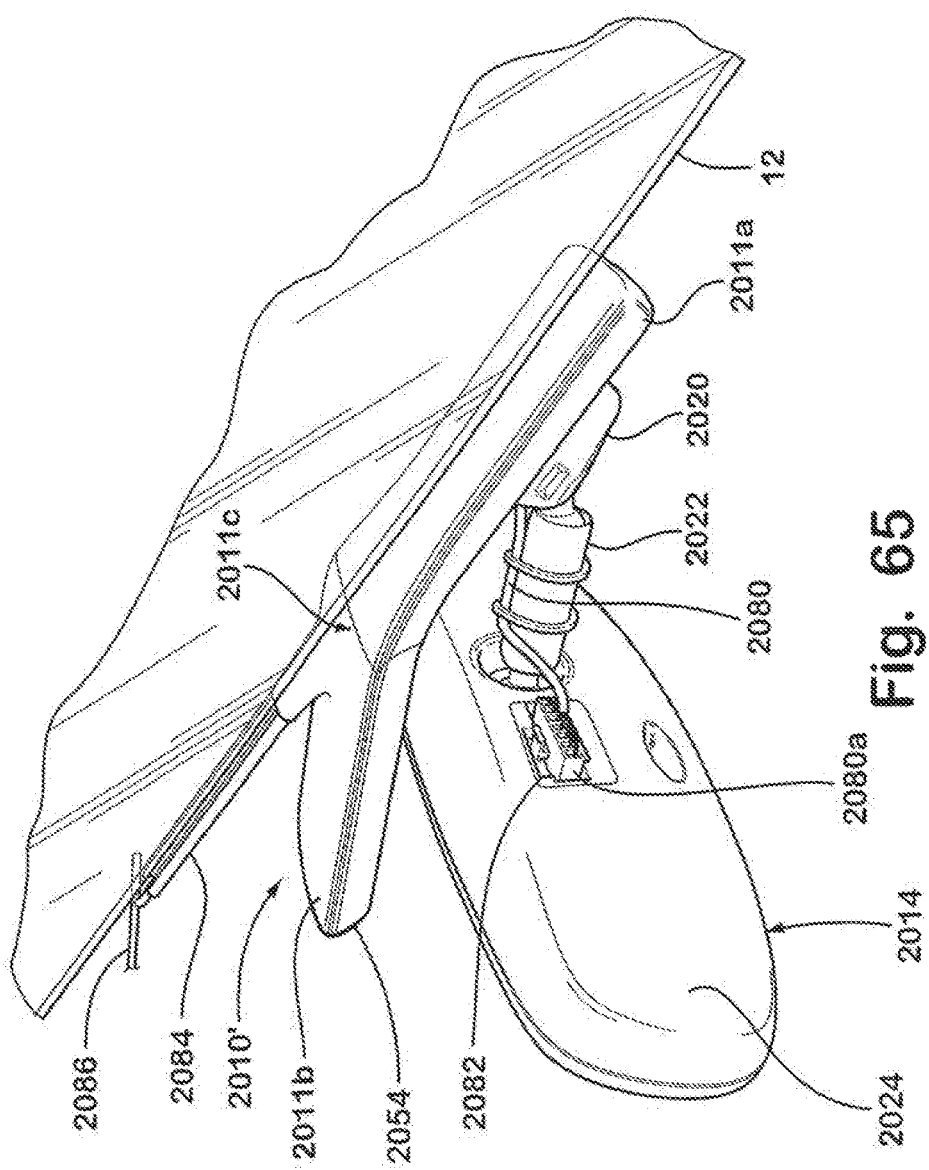

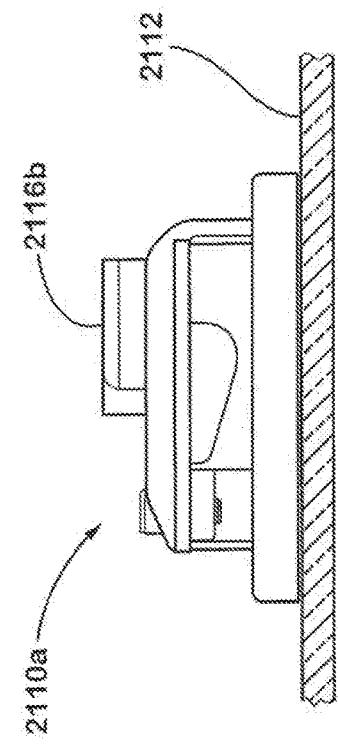
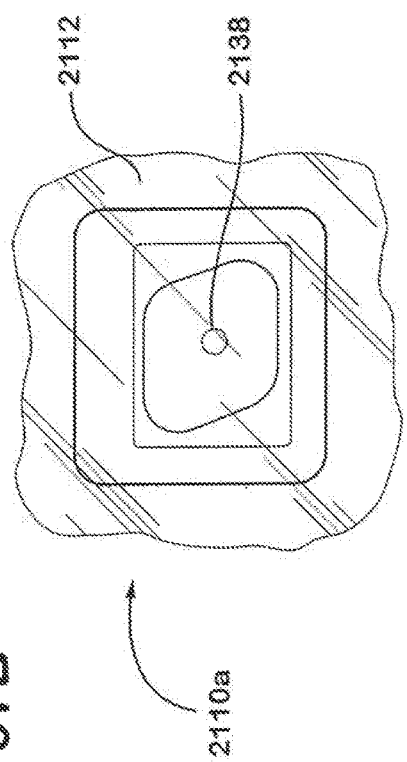
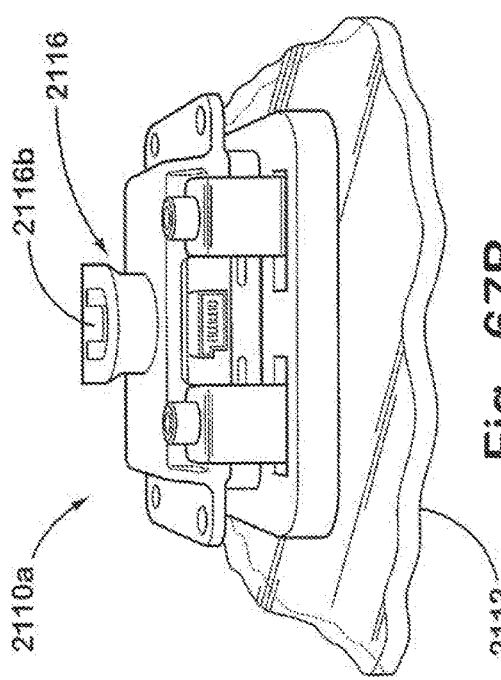

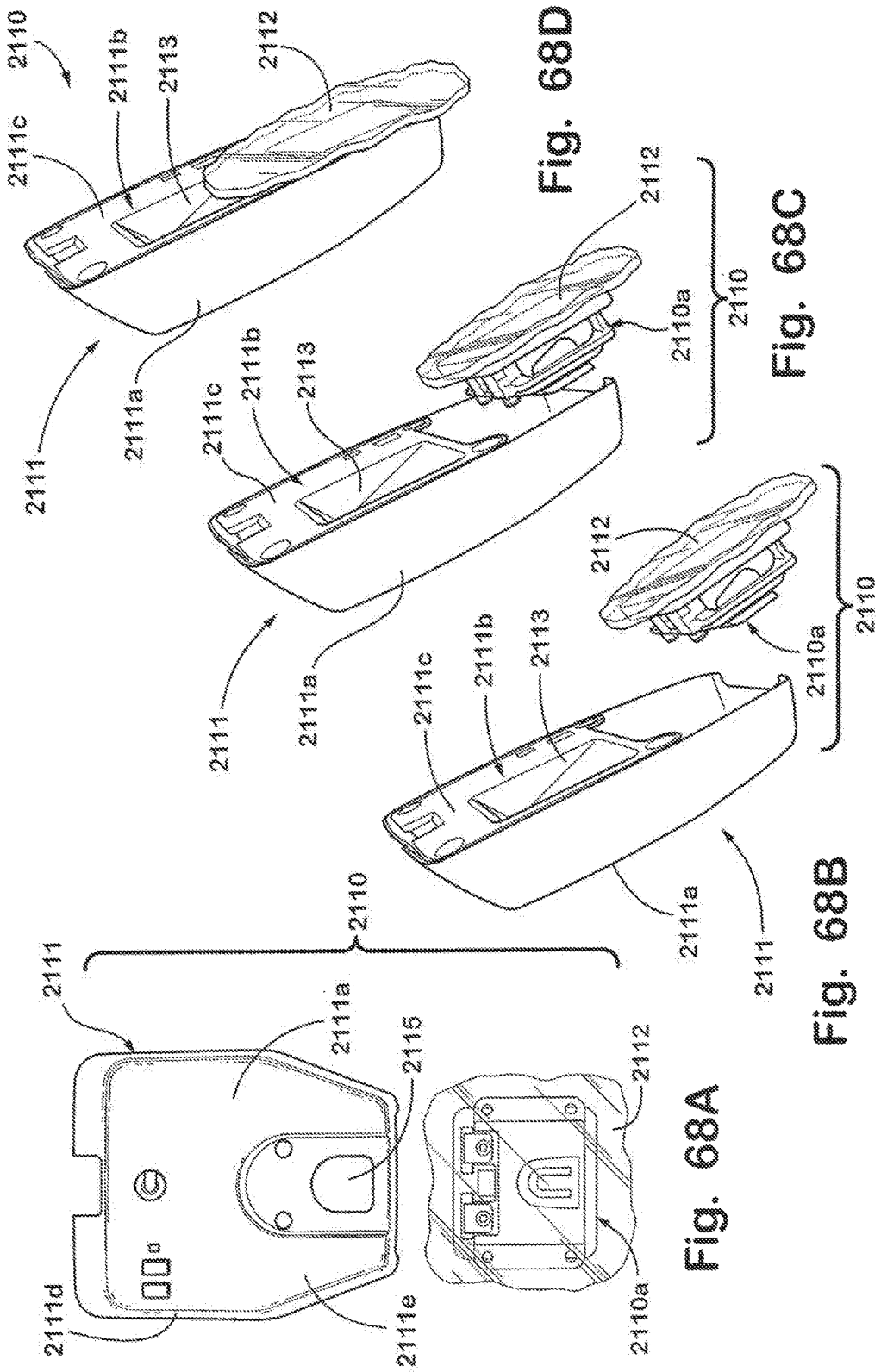

VEHICLE CAMERA SYSTEM

CROSS-REFERENCE TO RELATED APPLICATIONS

The present application is a continuation of U.S. patent application Ser. No. 14/299,409, filed Jun. 9, 2014, now U.S. Pat. No. 9,862,323, which is a continuation of U.S. patent application Ser. No. 13/964,137, filed Aug. 12, 2013, now U.S. Pat. No. 8,749,633, which is a continuation of U.S. patent application Ser. No. 13/800,681, filed Mar. 13, 2013, now U.S. Pat. No. 8,508,593, which is a continuation of U.S. patent application Ser. No. 13/470,860, filed May 14, 2012, now U.S. Pat. No. 8,405,726, which is a continuation of U.S. patent application Ser. No. 12/132,373, filed Jun. 3, 2008, now U.S. Pat. No. 8,179,437, which is a division of U.S. patent application Ser. No. 11/716,834, filed Mar. 12, 2007, now U.S. Pat. No. 7,533,998, which is a continuation of U.S. patent application Ser. No. 10/958,087, filed Oct. 4, 2004, now U.S. Pat. No. 7,188,963, which is a division of U.S. patent application Ser. No. 10/355,454, filed Jan. 31, 2003, now U.S. Pat. No. 6,824,281, which claims priority of U.S. provisional applications, Ser. No. 60/420,560, filed Oct. 23, 2002; Ser. No. 60/398,346, filed Jul. 24, 2002; Ser. No. 60/381,314, filed May 17, 2002; Ser. No. 60/374,724, filed Apr. 23, 2002; Ser. No. 60/364,008, filed Mar. 14, 2002; and Ser. No. 60/350,965, filed Jan. 31, 2002, which are all hereby incorporated herein by reference in their entireties.

FIELD OF THE INVENTION

The present invention relates generally to accessories useful for a vehicle and, more particularly, to accessories used in windshield electronic modules and interior rearview mirror assemblies.

BACKGROUND OF THE INVENTION

Certain accessories of a vehicle, such as a rain sensor or imaging sensor, typically are mounted tight against an interior surface of a windshield or window. This is required in some cases to maintain a desired distance between a light emitter/light sensor and the interior surface of the windshield, and/or to optically couple the component to the windshield, and/or to substantially seal the component at the windshield to prevent dust, dirt, smoke or other contaminants from affecting the component. In order to mount the accessories, it is desirable to move the accessories generally perpendicular to the surface of the window to avoid scratching of the window or the accessory by sliding the accessory relative to the window. It may be difficult for automobile assembly-line operators to mount such accessories onto, for example, a mirror mounting button on the interior surface of the windshield of a vehicle being assembled, since the assembly processes require multiple operations at the vehicle assembly plant.

Many camera-based accessories used in vehicles today require viewing through a window or windshield of the vehicle. The camera or sensor may be a contacting type of sensor, where the sensor is in contact with the interior surface of the windshield, or may be spaced from the windshield. It is desired to provide a blacked out area or ceramic frit region in areas where such accessories are mounted at the windshield, in order to enhance the appearance of the vehicle. Therefore, an aperture or port may have to be formed in the frit layer for the camera or image sensor to be aligned with. However, the frit layer then may include the port or aperture even for vehicles where the camera-based accessory is not selected as an option. In order to provide an appropriate frit layer for the camera-based accessory option, the vehicle manufacturer may need to plan or design different frit layers for different options available to the vehicle, which may result in a proliferation of windshields and part numbers for the different optional accessories.

Therefore, there is a need in the art for an accessory module that overcomes the shortcomings of the prior art devices.

SUMMARY OF THE INVENTION

The present invention is intended to provide an accessory module which is readily mountable at an interior surface of a windshield of a vehicle. The accessory module is mounted and preferably loaded to and against the windshield to maintain close and tight coupling of accessories within the module, such as a rain sensor, temperature sensor, image sensor and/or the like. The accessory module may have a head portion or accessory housing which is attached to or movably attached to a base portion which is mountable at an interior surface of a vehicle windshield.

According to an aspect of the present invention, an accessory system for a vehicle comprises a vehicle windshield having a first attachment member affixed thereto, an accessory module assembly comprising a mounting portion and a head portion, and an interior rearview mirror assembly. The mounting portion is configured to mount to the first attachment member and extends generally upward when mounted to the first attachment member. The mounting portion has a second attachment member. The head portion is at an upper portion of the mounting portion and extends generally horizontally and rearwardly from the upper portion with respect to the vehicle when the mounting portion is mounted to the first attachment member. The head portion comprises electronic circuitry for at least one accessory. The interior rearview mirror assembly comprises a mirror casing and a reflective element, and is mountable to the second attachment member. The head portion of the accessory module assembly extends from the upper portion of the mounting portion generally above the mirror casing. The head portion is at least one of viewable and user accessible above the mirror casing when the mirror assembly is mounted to the second attachment member.

The head portion may be movably attached to the upper portion of the mounting portion and may be movable relative to the mounting portion. The head portion may be pivotally mounted to the upper portion of the mounting portion and may be pivotable sidewardly relative to the mounting portion about a generally vertical pivot axis to adjust the angle of the accessory housing with respect to the driver of the vehicle, and/or may be pivotable upwardly and downwardly relative to the mounting portion about a generally horizontal pivot axis to adjust the angle of the accessory housing with respect to the driver of the vehicle.

The head portion may be articulatably mounted to the upper portion of the mounting portion and may be articulatable relative to the mounting portion about a pivot axis, wherein the pivot axis comprises a generally horizontal pivot axis when the mounting portion is mounted to the first attachment member. The head portion may be articulatable between a mounting orientation or folded orientation, where the head portion is positioned to be generally along the mounting portion, and an in-use orientation or non-folded orientation, where the head portion extends generally horizontally and rearwardly from the upper portion with respect to the vehicle when the mounting portion is mounted to the first attachment member. The head portion may be articulatable to the mounting orientation to facilitate mounting of the accessory module assembly to the first mirror attachment member. The head portion may extend generally horizontally and rearwardly with respect to the vehicle and generally above the mirror casing when the mounting portion is mounted to the first attachment member and when the head portion is in the in-use orientation and when the interior rearview mirror assembly is mounted to the second mounting member. The accessory module assembly may comprise a biasing element which biases the head portion toward the in-use orientation relative to the mounting portion.

Optionally, the head portion may comprise a display element and/or a user input device associated with the accessory. The display element and/or user input device may be viewable and/or user accessible above the mirror casing when the mirror assembly is mounted to the second attachment member.

Optionally, the at least one accessory may comprise at least two accessories. The accessories of the head portion may at least comprise a compass sensor and a compass display, or a microphone and a user input device (where the accessory module may provide a vehicular telecommunication function and/or a telephonic function), or a user input device and a garage door opener device (where the garage door opener device is operable to actuate a garage door opener for opening a garage door) or the like.

According to another aspect of the present invention, an accessory system for a vehicle comprises a vehicle windshield having a first attachment member affixed thereto, an accessory module assembly comprising a mounting portion and a head portion, and an interior rearview mirror assembly. The mounting portion is configured to mount to the first attachment member and to extend generally upward when mounted to the first attachment member. The mounting portion has a second attachment member. The head portion is pivotally attached to the mounting portion and houses electronic circuitry of at least one accessory. The interior rearview mirror assembly comprises a mirror casing and a reflective element and is mountable to the second attachment member. The head portion of the accessory module assembly extends from the mounting portion generally above the mirror casing, such that the head portion is viewable and/or user accessible above the mirror casing when the mirror assembly is mounted to the second attachment member.

According to another aspect of the present invention, an accessory system for a vehicle comprises a vehicle windshield having an attachment member affixed thereto, an accessory module assembly and an interior rearview mirror assembly. The accessory module assembly comprises a mounting portion for mounting the accessory module assembly to the attachment member, and a head portion for housing electronic circuitry associated with at least one accessory. The head portion is articulatably mounted to the mounting portion and is articulatable relative to the mounting portion between a folded orientation, wherein the head portion is folded generally along the mounting portion, and a non-folded orientation, wherein the head portion extends generally from the mounting portion. The interior rearview mirror assembly comprises a mirror casing and a reflective element, and is mountable to the mounting portion of the accessory module assembly.

According to yet another aspect of the present invention, an accessory module assembly includes a loading element/device, which functions generally to move and load the accessory module or a housing of the accessory module toward and against the windshield in a generally perpendicular motion with respect to the interior surface of the windshield. The loading device loads the accessory module against the windshield to maintain a tight and close interface between the accessory module and the windshield.

The accessory module may comprise a mounting portion which is attachable at a windshield portion of the vehicle and a housing for housing at least one accessory. The loading device or loading element may be configured to load the housing toward and against the windshield along the mounting portion in a generally perpendicular motion with respect to the interior surface of the windshield.

In one form, the loading device includes a ratcheting device which ratchets the accessory module toward engagement with the windshield. The ratcheting device may include a plurality of teeth or the like on corresponding portions of a body of the accessory module and an extender, which may mount to and extend from a mirror mounting button on a windshield. The corresponding teeth provide ratcheting of the module body toward and against the windshield, while also substantially limiting or precluding movement of the module body away from the windshield.

In another form, the loading device may include a pivotable hinge device which pivots the accessory module body toward engagement with the windshield.

The accessory module of the present invention may include one or more accessories and controls and may include a display, indicator and/or user interface buttons or switches or the like. The accessory module may include an electrical connection to the vehicle power and controls. The electrical connection may be connected during ratcheting or loading of the accessory module toward and against the windshield, such as via a snap connection, press contact or other means of connecting electrical components within the accessory module to the electrical system of the vehicle.

The accessory module may also include an electrical connector for connecting the electrical components or circuitry of the mirror head as the mirror head is mounted to the accessory module. The accessory module may include a pin connector or the like extending through and from a ball member, such that electrical connection is made as the mirror head is snapped or otherwise secured to the ball member.

According to another aspect of the present invention, an accessory module for a vehicle comprises a housing for housing at least one accessory of the vehicle and a pivotable hinge device positionable at a headliner portion of the vehicle. The housing is pivotably mounted at the pivotable hinge device, which is configured to pivot the housing toward and into engagement with a windshield of the vehicle. The hinge device is configured to substantially lock the housing into engagement with the windshield.

The accessory module may include a mirror attachment member at the housing for attaching an interior rearview mirror assembly when the housing is substantially locked into engagement with the windshield. The accessory module may also include an electrical connector for connecting to at least one electrical component or circuitry of the interior rearview mirror assembly. The electrical connector may connect the at least one electrical component or circuitry of the interior rearview mirror assembly as the interior rearview mirror assembly is mounted to the mirror attachment member.

The hinge device may be biased to urge the housing toward and against the windshield. The hinge device may comprise a spring-loaded hinge device, which urges and substantially locks the housing toward and into engagement with the windshield.

Therefore, the present invention provides an accessory module which is readily installed and/or loaded against the windshield of the vehicle. The accessory module is mounted to the windshield via connection to a standard attachment member, such as a mounting button, at the windshield, and then urged or loaded against the windshield via generally perpendicular movement of the accessory module toward the vehicle. The accessory module thus provides an attachment element which is familiar and readily acceptable to an assembly plant operator. Also, the accessory module of the present invention may provide for a deproliferation of part numbers at a vehicle assembly plant, since fewer part numbers for the interior rearview mirror assemblies may be needed. For vehicles with different accessories selected, a different assembly module may be mounted to the mounting attachment or button at the windshield.

Also, the accessory module or accessory module assembly of the present invention provides a head portion which may extend generally rearwardly from a mounting portion mounted to the vehicle and may extend generally above the rearview mirror when the rearview mirror is mounted to the mounting portion, such that the head portion is viewable and/or user accessible generally above the rearview mirror. The head portion may be movably or pivotally or articulatably mounted to the base or mounting portion, which is mountable to a mounting member or button at the windshield. The head portion may pivot or articulate to facilitate installation of the base portion and accessory module assembly to the mounting member, whereby the head portion may unfold or pivot to extend generally rearwardly from the base portion and generally above the mirror assembly. The accessory module thus may enhance the assembly or installation process for the accessory module to the vehicle windshield at the vehicle assembly plant. The accessory module may include a head portion which is selected to provide the desired accessory, accessories, function or functions and a common mounting portion or base.

These and other objects, advantages, purposes and features of the present invention will become apparent upon review of the specification in conjunction with the drawings.

BRIEF DESCRIPTION OF THE DRAWINGS

FIG. 1 is a side elevation and partial sectional of an interior rearview mirror assembly and accessory module in accordance with the present invention;

FIG. 2 is a perspective view of a mirror mounting button on an interior surface of a window;

FIG. 3 is a perspective view of an extension of the present invention as mounted on the button of FIG. 2;

FIG. 4 is a perspective view of a mirror mount on the extension of FIG. 3;

FIG. 5 is a perspective view of an accessory module body in accordance with the present invention on the extension of FIGS. 3 and 4;

FIG. 7 is a sectional view taken along the line VII-VII in FIG. 5, showing the accessory module as the module body is being moved along the extension;

FIG. 8 is a sectional view similar to FIG. 7, showing the accessory module body mounted to the extension and loaded against the window;

FIGS. 12A and 12B are side elevation and partial sectional views of an alternate embodiment of the accessory module of the present invention;

FIGS. 12C and 12D are front elevations of alternate embodiments of the accessory module and mirror assembly of FIGS. 12A and 12B, as looking forwardly with respect to the vehicle;

FIG. 23B is a sectional view of the accessory module taken along the line B-B in FIG. 23A;

FIGS. 24A and 24B are perspective views of another accessory module in accordance with the present invention;

FIGS. 25A-25C are perspective views of a mirror assembly mounted on the accessory module of FIGS. 24A and 24B;

FIGS. 26A-26D are views of another accessory module in accordance with the present invention;

FIG. 27 is a side elevation and partial sectional view of another accessory module in accordance with the present invention;

FIG. 28 is a partial sectional view of an extender and fastener for the accessory module of FIG. 27;

FIG. 29 is a forward facing view of the accessory module and interior rearview mirror assembly of FIG. 27;

FIG. 30 is a perspective view of a printed circuit board suitable for use with the accessory module of FIGS. 27 and 29;

FIG. 31 is a top plan view of a vehicle incorporating the accessory module of FIGS. 27-30;

FIG. 32 is a side elevation of the vehicle of FIG. 31;

FIG. 35A is a plan view of a windshield button useful with an accessory module of the present invention;

FIG. 35B is a side elevation of the windshield button of FIG. 35A;

FIG. 36 is a side elevation and partial sectional view of a mount extension of the present invention adapted to mount on the windshield button of FIGS. 35A and 35B;

FIG. 38C is a side elevation and partial sectional view of the accessory module of FIGS. 38A and 38B;

FIG. 38D is a sectional view taken along the line D-D in FIG. 38C;

FIGS. 39A and 39B are a plan view and a side view of another mounting button useful with an accessory module of the present invention;

FIGS. 40A and 40B are a plan view and a side view of a mount extension of the present invention adapted to mount on the windshield button of FIGS. 39A and 39B;

FIG. 41 is a partial sectional view of the retaining tab of the mount extension of FIGS. 40A and 40B as mounted on the button of FIGS. 39A and 39B;

FIG. 42A is a plan view of another mounting button useful with an accessory module of the present invention;

FIG. 42B is a sectional view of a retaining tab or hook of the button taken along the line B-B in FIG. 42A;

FIGS. 43A and 43B are a plan view and a side view of a mount extension of the present invention adapted to mount to the button of FIG. 42A;

FIG. 43C is a sectional view taken along the line C-C in FIG. 43B;

FIG. 44 is a side and partial sectional view of the retaining tab of the button of FIGS. 42A and 42B and the spring and hook of the mount extension of FIGS. 43A-C, as retained together;

FIGS. 45A and 45B are a plan view and a side view of a windshield mounting member with an extension at an end thereof having a mounting button for a mirror;

FIGS. 46A-C are a plan view, a side view and an end view of a mounting button useful with an accessory module of the present invention;

FIGS. 47A and 47B are an end view and a side view of a mount extension of the present invention adapted to mount to the mounting button of FIGS. 46A-C;

FIG. 48 is a side elevation and partial sectional view of the retaining tabs or hooks of the mounting button of FIGS. 46A-C and the mount extension of FIGS. 47A and 47B, as retained together;

FIGS. 49A and 49B are a plan view and a side view of a mounting button useful with an accessory module of the present invention;

FIGS. 50A and 50B are a plan view and a side view of a mount extension of the present invention adapted to mount to the mounting button of FIGS. 49A and 49B;

FIG. 51 is a plan view of a retainer for securing the mount extension of FIGS. 50A and 50B to the button of FIGS. 49A and 49B;

FIGS. 52A and 52B are a plan view and a side view of a mounting button arrangement for mounting an accessory module of the present invention to the windshield;

FIG. 53 is a side elevation and sectional view of a mount extension and accessory module of the present invention adapted for mounting to the button arrangement of FIGS. 52A and 52B;

FIGS. 54A and 54B are a plan view and a side view of another mounting button arrangement for mounting an accessory module of the present invention to the windshield;

FIG. 55 is a side elevation and sectional view of a mount extension and accessory module of the present invention adapted for mounting to the button arrangement of FIGS. 54A and 54B;

FIGS. 56A and 56B are a plan view and a side view of another mounting button arrangement for mounting an accessory module of the present invention to the windshield;

FIG. 57 is a side elevation and sectional view of a mounting tab for securing the accessory module to the button arrangement of FIGS. 56A and 56B;

FIGS. 58A-D are perspective views of another accessory module in accordance with the present invention;

FIG. 59 is a perspective view of another accessory module of the present invention with an electrochromic mirror assembly mounted thereto;

FIG. 60 is a perspective view of another accessory module of the present invention with a prismatic mirror assembly mounted thereto;

FIGS. 62A and 62B are perspective views of an articulatable accessory module of the present invention, with an interior rearview mirror assembly attached thereto;

FIGS. 63A-D are perspective views of the articulatable accessory module of FIGS. 62A and 62B, with the interior rearview mirror assembly removed therefrom;

FIGS. 64A and 64B are perspective views of a base or mounting portion useful with the articulatable accessory module of FIGS. 62A, 62B and 63A-D;

FIG. 64C is a perspective view of a support or stiffening member useful with the articulatable accessory module of FIGS. 62A, 62B and 63A-D;

FIG. 65 is a perspective view of another articulatable accessory module in accordance with the present invention;

FIGS. 67A-D are perspective, side and plan views of an accessory mounting module of an accessory module in accordance with the present invention; and FIGS. 68A-F are plan and perspective views of the accessory module and accessory housing and mounting module of FIGS. 66A-C and 67A-D.

DESCRIPTION OF THE PREFERRED EMBODIMENTS

Figure 6:
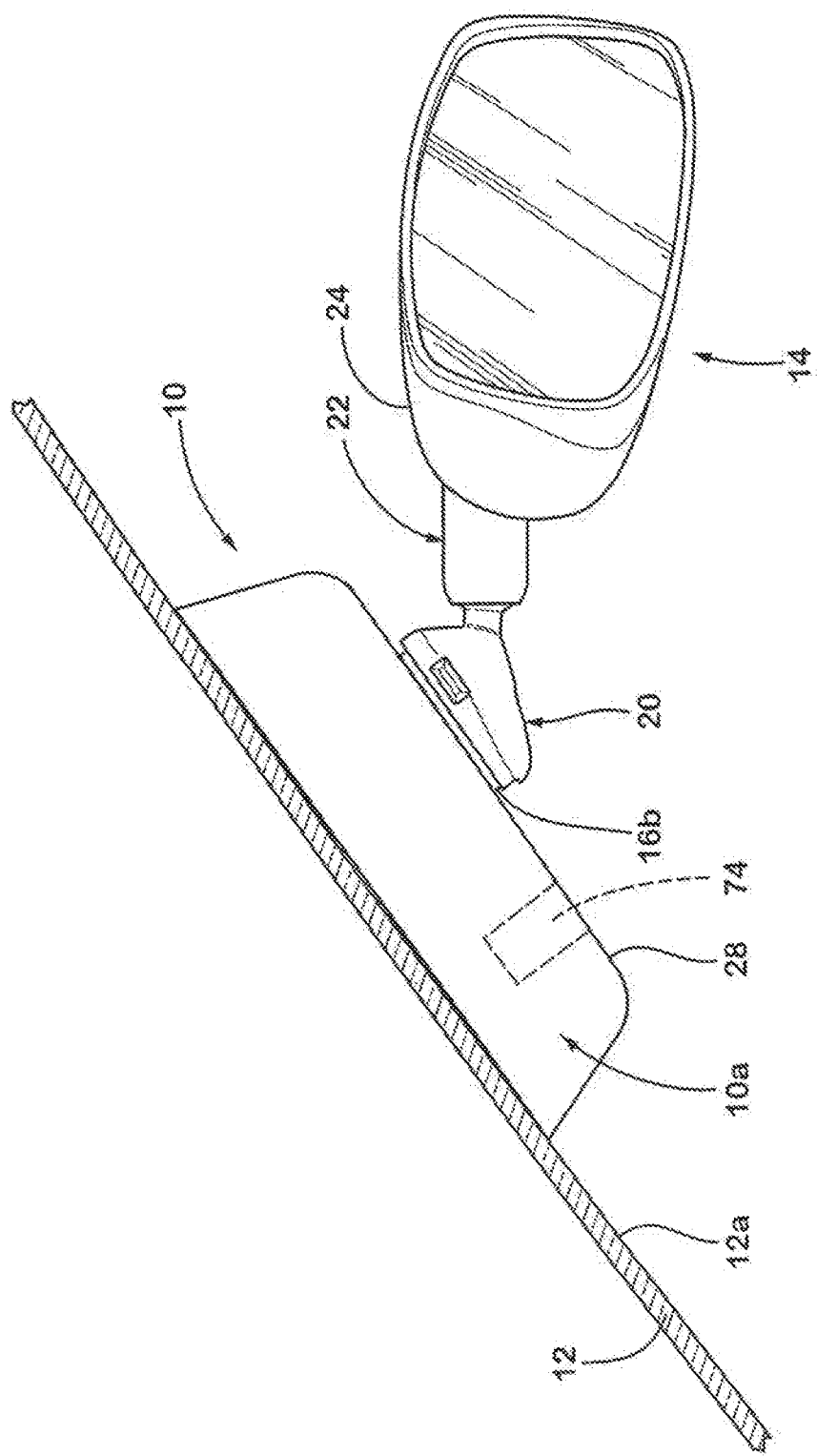
FIG. 6 is a side elevation of the accessory module of FIG. 5, with an interior rearview mirror mounted to the mirror mount in accordance with the present invention.

Referring now to the drawings and the illustrative embodiments depicted therein, an accessory module 10 is mountable to and against a windshield 12 and is positioned generally between an interior rearview mirror assembly 14 and the windshield 12 (FIGS. 1 and 5-10). The accessory module 10 is mounted toward and against an interior surface 12a of the windshield in a manner which allows the body 10a of the accessory module to move generally perpendicularly relative to the interior surface 12a and to be loaded against or biased toward and to the windshield, as discussed in detail below, and such as disclosed in commonly assigned U.S. provisional applications, Ser. No. 60/381,314, filed May 17, 2002; Ser. No. 60/374,724, filed Apr. 23, 2002; Ser. No. 60/364,008, filed Mar. 14, 2002; and Ser. No. 60/350, 965, filed Jan. 31, 2002, which are all hereby incorporated herein by reference. Accessory module 10 may include one or more accessories, such as a rain sensor, a forward facing image sensor, a headlamp control, a temperature sensor, an antenna, a microphone, a speaker, a rearward facing image sensor, a security system, a display, indicators, user interface buttons, switches or the like, interior lights, GPS controls, a humidity sensor, a compass sensor, an electrochromic (EC) mirror control, a remote keyless entry control, a toll collection control, and/or any other accessories or controls of the vehicle, such as discussed below.

Accessory module 10 is mounted to the vehicle windshield and includes an extender 16, which is mounted to and extends from a mounting attachment 18 (such as a conventional mirror mounting button) at the windshield 12. As shown in FIG. 2, mounting button 18 is bonded or otherwise secured to interior surface 12a of windshield 12. A mounting portion 16a of the extender 16 is slid or otherwise moved into engagement with the button 18. Extender 16 includes a second mounting attachment or button 16b (FIG. 3) at its outer end for receiving a mirror mount 20 thereon (FIG. 4). The button-on-button attachment may be similar to the attachments disclosed in U.S. Pat. No. 4,930,742, which is hereby incorporated herein by reference. The extender 16 provides a rigid extension of a mounting button from the interior surface of the windshield for mounting the mirror assembly to the windshield.

Extender 16 provides a structural, load bearing connection between the attachment member 18 and the mount 20 of the support arm 22 (FIG. 6) of the mirror 14 (or the mount of the mirror, as shown in FIG. 1) that is attachable to the accessory module. As such, extender 16 is preferably fabricated of a rigid, load bearing material, such as a metallic material or metal, such as a die cast metallic material, such as die cast zinc or die cast aluminum or the like. Extender 16 may be a solid member, or may include channels or passageways therealong, which may include a wireway passage, such as for wirings to pass therethrough. The length of extender 16 is sufficient for the housing or body 10a of the accessory module to slide over, but not so long as to create an excessive moment arm. Preferably, the length of extender 16 is selected to be approximately 0.5 inches to 3.5 inches, more preferably, approximately 0.75 inches to 2.5 inches, and, most preferably, approximately one to two inches. The extender 16 also provides structural support for the body of the accessory module 10.

Extender 16 is formed and adapted to mount to a particular mounting attachment member 18 at the windshield at one end of extender 16. The opposite end of the extender 16 is formed as a replication of the attachment member or button at the windshield of that particular vehicle. The extender of the present invention thus provides a mounting attachment member 16b for mounting a mirror mount thereto in the same manner as the mirror mount would mount to the attachment member 18 at the windshield. The extender may have some or all of the plastics of the accessory module molded to the extender. Optionally, the extender may be die cast, such as a die cast metal (preferably die cast zinc or die cast aluminum) or otherwise formed, such as by molding of an engineering plastic, such as a filled nylon engineering plastic or the like, and may be formed as a structural skeleton member, without affecting the scope of the present invention. A cover, such as a plastic or polymeric cover, may be snapped or otherwise affixed or attached to the skeleton extender, without affecting the scope of the present invention.

Advantageously, and for example, different extenders may be used to adapt the accessory module for applications in different vehicles, such as vehicles manufactured by different vehicle manufacturers. For example, the extender may be die cast, such as in a metal die casting tool, which requires significantly less tooling costs than molds or the like, such that in order to adapt the accessory module for an application in another vehicle line or manufacturer (where the mounting attachment member or button may differ from one another), a new extender may be formed such that the mounting portion 16a of the new extender accepts the button on the new vehicle and the second mounting attachment member 16b matches or substantially replicates the button of the other vehicle, while the body 10a of the module 10 remains the same or substantially the same. This provides a low cost change to the module and allows for the same module body to be used in different vehicles. Accordingly, a common accessory module body may be sold to different vehicle manufacturers with an appropriate extender combined with the body. This provides substantially reduced costs for different applications, since new injection molding tools are not required to mold a new accessory module body for each application or vehicle line or vehicle manufacturer.

Optionally, such as for aftermarket applications, the extender may be formed or die cast to have a mounting portion 16a for one vehicle (such as, for example, a vehicle manufactured by Ford Motor Company), and a mounting attachment member or button 16b for another vehicle (such as, for example, a vehicle manufactured by General Motors Corporation or Volkswagen or Audi or BMW). This allows a person in the aftermarket to install the accessory module in the vehicle and to replace the mirror in the vehicle with a mirror designed for a different vehicle.

As best shown in FIGS. 7 and 8, the body 10a of accessory module 10 is slid over and along extender 16 until a portion of the body 10a of accessory module 10 is engaged with and loaded toward the interior surface 12a of windshield 12. The mirror mount 20 is mounted to the second attachment member 16b at the end of extender 16. Interior rearview mirror 14 is pivotally mounted to a ball member 20a extending from mirror mount 20 in a known manner. As shown in FIG. 6, interior rearview mirror 14 may include a pivotable mounting arm 22 which pivotally receives ball member 20a therein. However, interior rearview mirror 14 may otherwise pivotally receive ball member 20a in a socket (not shown) in the casing 24 of mirror 14, or may otherwise mount to the end of mirror mount 20 or extender 16, without affecting the scope of the present invention. Preferably, the mirror and accessory mounting components provide a breakaway type connection or mount, such as the types disclosed in U.S. Pat. Nos. 6,172,613; 6,087,953; 5,820,097; 5,377, 949; and/or 5,330,149, which are hereby incorporated herein by reference.

The body 10a of accessory module 10 includes a structural member 26 and a cover 28, which together define a cavity 30 within accessory module 10 for mounting or receiving accessories therein. Structural member 26 includes a plate portion 32 and a mounting portion 34 extending from plate portion 32. The mounting portion 34 of structural member 26 provides an opening or passageway 34a for receiving extender 16 therethrough. In the illustrated embodiment, mounting portion 34 includes a plurality of teeth or projections 34b extending from at least a portion of the mounting portion 34a, while extender 16 likewise includes a plurality of teeth or projections 16c extending outwardly therefrom. The corresponding teeth 34b, 16c engage one another as structural member 26 is pressed along extender 16 and toward windshield 12 to provide a ratcheting of body 10a toward and against windshield 12. The teeth are angled to allow for movement of body 10a along extender 16 toward the windshield, yet substantially preclude movement of body 10a away from the windshield, such that accessory module 10 is retained tightly or snugly against the interior surface 12a of windshield 12.

Preferably, the teeth 34b are positioned along a flexible tab or portion (not shown) of mounting portion 34 of structural member 26 to allow the tab to be flexed radially outward and away from extender 16 to allow for removal of body 10a of accessory module 10 from the windshield for service, maintenance or replacement. Preferably, the tab or other ratcheting or loading device may be accessible from the outer portion of the module (such as at the second button 16b) to allow for easy release of the ratcheting or loading device. The tab may be flexed using a screwdriver or other tool inserted between the tab and extender 16 or via any other means to disengage the tab from the extender. Although shown and described as having a plurality of teeth engaging other teeth to ratchet and retain the module body against the windshield, other means for providing a generally perpendicular movement of the module body toward and against the windshield may be implemented, such as a threaded fastener retaining the module body to an extender or the like, without affecting the scope of the present invention.

Preferably, structural member 26 includes a retaining tab 36 (FIGS. 7 and 8), which loads against the mounting button 18 to secure the joint between the module and the button to minimize vibration of the module. In the illustrated embodiment, the retaining tab 36 is biased toward the button, such that as the structural member 26 is loaded against the windshield, the retaining tab 36 loads and is biased against the mounting button 18. Preferably, in order to further secure the accessory module to the button 18, the housing or structural member may substantially encase the extender 16, such that the housing or structural member closes over the slotted portion of the mounting portion 16a of extender 16, which allowed the extender to slide over the mounting button 18 on the windshield 12. The extender 16 is thus substantially precluded from sliding off from the mounting button 18.

The cover 28 and structural member 26 of module 10 may snap or otherwise be secured together to define the cavity 30. Optionally, the cover 28 may define the plate along the interior surface of the windshield, such that the cover is attachable to the structural member at each end of a mounting portion of a structural member positioned or mounted around the extender. Optionally, as shown in FIG. 7, accessory module 10 may include a sealing or cushioning member or strip 27 around the plate or cover portion of the module to cushion and/or seal the body 10a of accessory module 10 at the interior surface 12a of windshield 12, in order to limit or substantially preclude vibration or rattle between the module and the windshield. The sealing or cushioning member may comprise a soft material, such as an elastomeric material, such as a thermoplastic rubber material, and may be sufficiently resilient and dimensioned to provide a cushion between the module and the windshield and may take on the form of the windshield to further seal and cushion the accessory module at the windshield and to reduce noise and vibration of the accessory module. The cushioning member may cushion the module against the windshield and may take on the form of the windshield such that the cushioning member functions to adapt the module to different angles or curvatures of the windshield as the module is moved toward and loaded against the windshield.

As shown in FIG. 7, accessory module 10 may include an accessory 38, such as a rain sensor (such as the type disclosed in commonly assigned U.S. Pat. Nos. 6,320,176; 6,353,392 and 6,313,454, which are hereby incorporated herein by reference), an image sensor (such as a video camera, such as a CMOS imaging array sensor, a CCD sensor or the like, such as the types disclosed in commonly assigned, U.S. Pat. Nos. 5,550,677; 6,097,023 and 5,796,094, which are hereby incorporated herein by reference), a temperature sensor (such as a contact temperature sensor for measuring the temperature at or of the windshield), an antenna, or any other sensor or device which is desirable to mount in tight or close engagement with the windshield. The accessory or sensor 38 protrudes through an opening 32a in the plate 32 and may include a biasing member or spring 40 which biases the accessory outward from accessory module 10 and toward windshield 12. Accordingly, as the accessory module is loaded toward and against the windshield, the accessory 38 contacts the interior surface 12a of the windshield 12 and is pressed against the surface via biasing member 40, as shown in FIG. 8. The accessory 38 is thus optically coupled or positively coupled to the windshield and retained in intimate contact with the windshield. The accessory 38 may further include a sealing member (not shown) around a circumference of the accessory to engage the interior surface of the windshield and substantially seal the accessory to that portion of the interior surface of the windshield to protect that area of the windshield and the accessory from contaminants, such as dirt, dust, smoke, moisture or the like from affecting the performance of the accessory.

Although shown and described as coupling the accessory to or loading the accessory against the windshield, the accessory module of the present invention may alternately provide an accessory which is stood off from or spaced from the windshield. Such an arrangement may be suitable for an antenna or the like, since the antenna reception may be interfered with by the windshield, which may comprise an electrically conductive windshield or the like. The accessory module thus may provide a standoff antenna location to limit or substantially preclude such interference.

Figure 9:
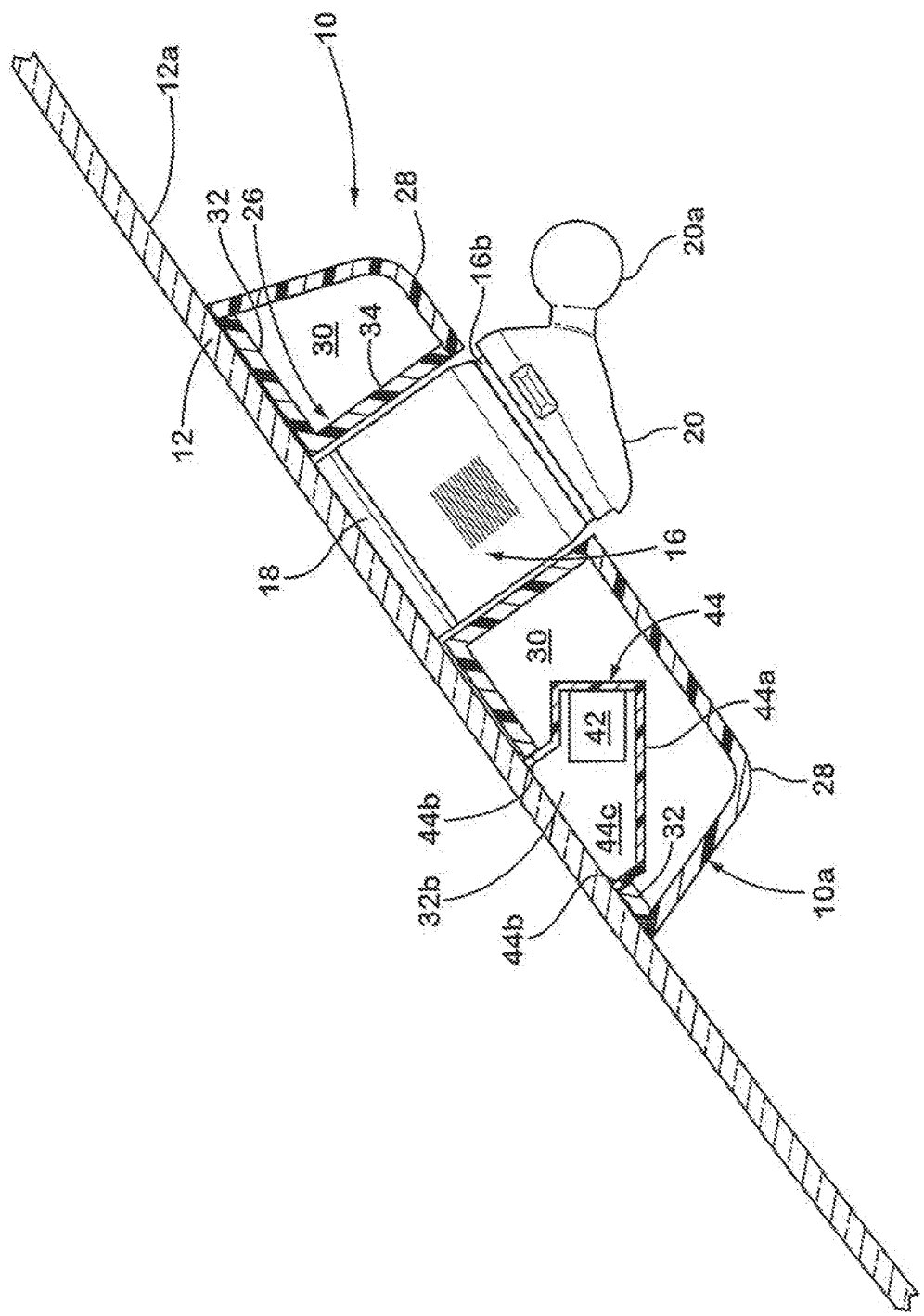
FIG. 9 is a sectional view taken along the line IX-IX in FIG. 5, showing an image sensor mounted within the accessory module.
Figure 10:
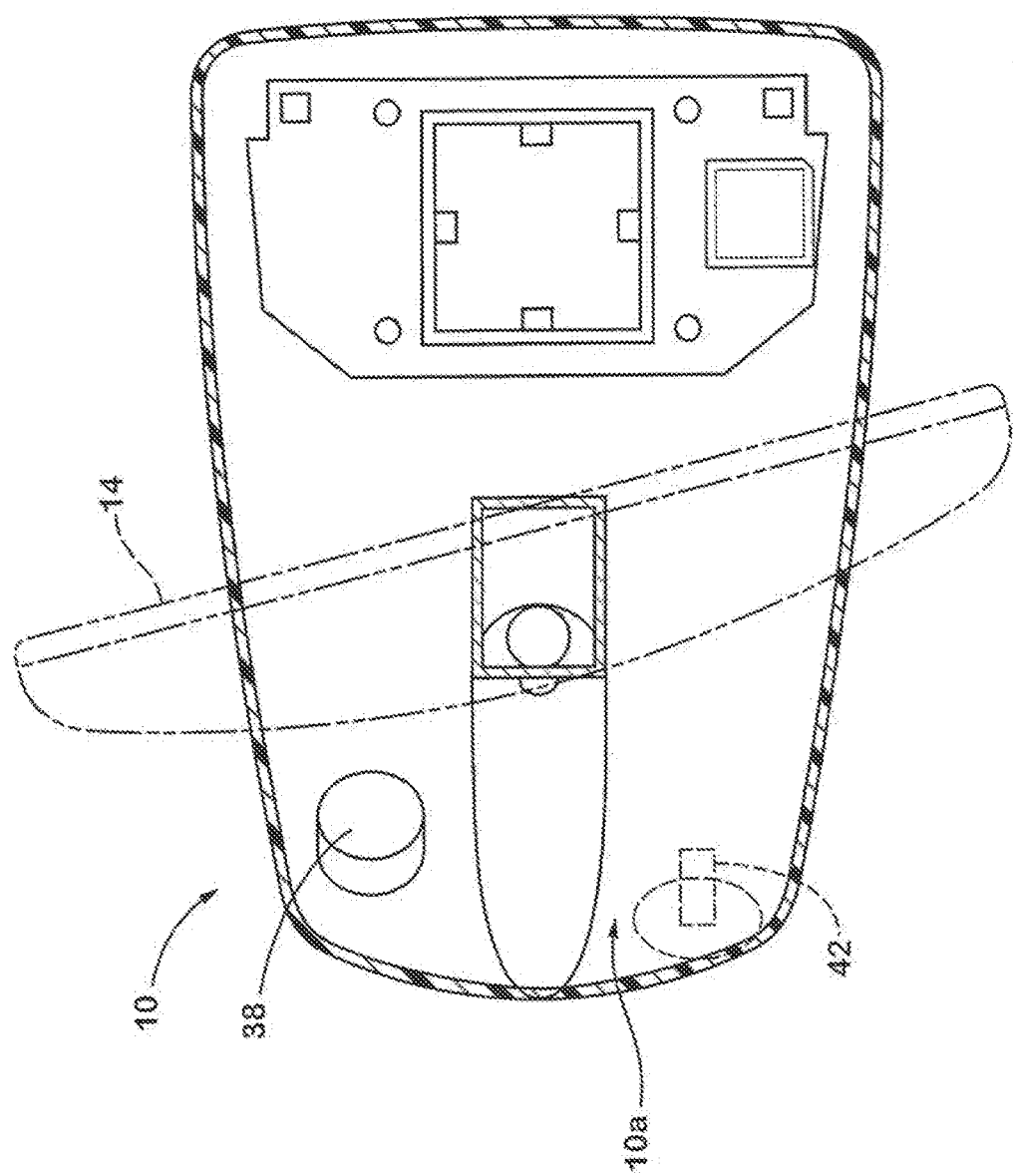
FIG. 10 is a lower plan view of an accessory module of the present invention similar to the accessory module of FIGS. 5-9.

As shown in FIG. 9, accessory module 10 may also or otherwise include an accessory 42 which is desirable to be oriented in a generally horizontal position or at a desired angle with respect to the windshield or horizontal. Such an accessory may comprise a forward facing image sensor or camera (preferably a video camera, such as a CMOS imaging array sensor, a CCD sensor or the like, such as the types disclosed in commonly assigned, U.S. Pat. Nos. 5,550,677; 6,097,023 and 5,796,094, which are hereby incorporated herein by reference) or a compass sensor or the like. The forward facing image sensor may be useful in an optical rain sensor, such as the types disclosed in U.S. Pat. Nos. 6,353,392; 6,320,176 and 6,313,454, which are hereby incorporated herein by reference, a headlamp control system, a lane departure detection or warning system, such as the types described in U.S. provisional applications, Ser. No. 60/433,700, filed Dec. 16, 2002, and Ser. No. 60/377,524, filed May 3, 2002, which are hereby incorporated herein by reference, an adaptive cruise control system, a sign recognition system and warning system, a night vision system, a pedestrian detection system, a vehicle classification identification system, a vehicle compatibility detection system, a pre-crash avoidance system, an emergency response image capture system, an environmental detection system (such as for detecting rain, fog, or the like), an ambient light level detection system, a vehicle relative position (such as for detecting the roll, yaw or the like of the vehicle), a compass calibration system (where the image captured from the image sensor is monitored to determine changes in direction of the vehicle to track the direction the vehicle is heading), a GPS system (where the image captured from the image sensor is monitored to determine the location of the vehicle when a signal from the GPS satellite(s) is interrupted), an electronic toll collection system, or any other system, without affecting the scope of the present invention.

As described such as in U.S. provisional application Ser. No. 60/433,700, filed Dec. 16, 2002 (incorporated above), an object detection system, such as a blind spot detection system, a lane change assist or aid system or device, a lane departure warning system, a side object detection system, a reverse park aid system, a forward park aid system, a forward, sideward or rearward collision avoidance system, an adaptive cruise control system, a passive steering system or the like, is provided that is operable to detect and/or identify a vehicle or other object of interest at the side, front or rear of the vehicle equipped with the object detection system. The object detection system, such as a lane change assist system, utilizes an edge detection algorithm to detect edges of objects in the captured images and determines if a vehicle is present in a lane adjacent to the equipped or subject vehicle in response to various characteristics of the detected edges, such as the size, location, distance, intensity, relative speed and/or the like. The system processes a subset of the image data captured which is representative of a target zone or area of interest of the scene within the field of view of the imaging system where a vehicle or object of interest is likely to be present. The system processes the detected edges within the image data subset to determine if they correspond with physical characteristics of vehicles and other objects to determine whether the detected edge or edges is/are part of a vehicle or a significant edge or object at or toward the subject vehicle. The system utilizes various filtering mechanisms, such as algorithms executed in software by a system microprocessor, to substantially eliminate or substantially ignore edges or pixels that are not or cannot be indicative of a vehicle or significant object to reduce the processing requirements and to reduce the possibility of false positive signals.

Preferably, accessory module 10 includes a mounting device 44 for such an accessory 42, which is adjustable to set the accessory 42 to be horizontal or to be at the desired angle regardless of the angle of the windshield to which accessory module 10 is loaded. Mounting device 44 provides a mounting platform or structure 44a for securing accessory 42 within cavity 30 of body 10a of accessory module 10. Mounting device 44 may be positioned at and partially through an opening 32b of plate 32 to provide a passageway from accessory 42 to the windshield 12.

The mounting device 44 may be adjustable relative to the structural plate or member 32 or to the housing 28 of accessory module 10 to align or orient the accessory 42 at the desired orientation. For example, the mounting device 44 may include a spherical member or ball joint (not shown) which allows for rotation or pivotal movement of the accessory 42 relative to housing 28 or plate 32 of accessory module 10 into the proper alignment or orientation (such as via rotation or pivotal movement of a portion of the platform 44a). Mounting device 44 may include an outer sealing member 44b which engages and seals against the interior surface 12a of windshield 12 to provide a sealed chamber 44c in which the accessory 42 is positioned. The ball joint may also include a wiping seal along the spherical member to seal the chamber 44c. The sealing members limit or substantially preclude dirt, dust, moisture, smoke or other contaminants from contacting or otherwise affecting the operation of accessory 42 of accessory module 10.

Although it is desirable to substantially seal an accessory within the accessory module, it may, in some cases, be desirable to provide a ventilation element, such as a ventilation passage, such as an air passage between the interior surface of the windshield and the component or a surface of the component closest to the windshield, in order to provide cooling of the accessory via air flow through the passage. Accordingly, the accessory module of the present invention may include such a passageway along the interfacing surface against the windshield. The surface(s) of the accessory module facing the windshield may include heat dissipating elements, such as, for example, heat dissipaters, fins or the like.

Many electronic components are rated at a high temperature from a stationary soak application. However, such components may not function in an optimal manner when at these higher temperatures. Optionally, forced cooling may be provided to the accessories or components of the accessory module, such as by a fan or the like (preferably, a low current fan, a solar powered fan or the like) to rapidly cool the accessories or components of the accessory module. The forced cooling element may be activated when the ignition of the vehicle is activated and then time out or deactivate a period of time following activation. The forced cooling element thus functions to rapidly lower the temperature of the components or accessories, so that they may function optimally, even after prolonged soaking in extreme temperatures, such as while the vehicle has been parked, such as on a sunny day.

Optionally, a surface of the accessory module closest to the windshield may be treated, such as by a deposition, painting, film, adhesive coating or the like, to provide a reflecting characteristic to the module, so as to reflect infrared radiation or the like which the module may be exposed to at the windshield. The air passage and/or treatment may thus reduce the effects of sun loading or thermal loading on the accessory module.

Accessory module 10 may further include electrical connections for any electrical components within accessory module 10 or at or within mirror 14. For example, the mounting button 18 and/or second button 16b may include electrical contacts which engage corresponding contacts at the mounting portion 16a of extender 16 and/or mirror mount 20, respectively, as the mounting portions are slid onto the buttons, such that electrical signals are provided to accessory module 10 and/or to mirror 14 via the contacts. The mounting button 18 may be electrically connected to a power source of the vehicle or other electrical system or the like via an electrical connector or wiring harness or via contacting a conductor at the windshield, such as a conductor which is integral with the glass of the windshield or deposited on the interior surface of the windshield and which is connected to the vehicle power source or other electrical system of the vehicle. The mirror mount 20 may then include an electrical connector or wiring which extends through an opening or passageway (not shown) in ball member 20a and into the housing 24 of mirror 14 for connection to electrical components or circuitry within housing 24. The electrical connector may extend from the ball member and be sufficiently rigid to provide a snap connection or the like to a corresponding connector positioned within housing 24 as housing 24 is snapped or otherwise secured to ball member 20a.

Optionally, the electrical connections to accessory module 10 may be provided via other means, such as other sliding means, rotating contacts, screw or fasteners (such as tightening of a screw at the button to make an electrical contact or connection), or plug type connectors or contacts (such as an electrical contact of a spring loaded contact on the housing contacting a conductor at the windshield, such as a conductor which is integral with the glass of the windshield or deposited on the interior surface of the windshield), such that the accessory module makes its electrical connections as the body 10a is ratcheted or loaded against the windshield. Also, the electrical connections to the mirror 14 may be provided via other means, such as other sliding means, rotating contacts, screw or fasteners (such as tightening of a screw at the second button to make an electrical contact or connection), or plug type connectors or contacts, such that the mirror makes its electrical connections as it is mounted to the extender.

Typically, the mounting button 18 is provided on the windshield by the glass or windshield manufacturer, such that the windshield is shipped to the vehicle assembly plant with the button affixed thereon. Preferably, the mirror manufacturer may then supply the accessory module, which includes the extender 16 and the body 10a, along with the mount 20 and mirror 14, as a single package to be mounted to the button 18 on the windshield at the vehicle assembly plant. The structural component 26 and housing 28 may be only partially installed onto the extender 16 as shipped to the assembly plant, such that the extender may be secured to the button prior to the module body being moved or loaded toward and against the windshield. This last step may be performed at the vehicle assembly plant after the extender has been secured to the button and after any electrical components or connections have been provided at or near the module. As the module body is then ratcheted or otherwise moved toward tight engagement with the windshield, the components, such as the image sensor, rain sensor and/or the like, may also be loaded against the windshield while the electrical connections to the vehicle electrical and/or control system may be simultaneously made.

Optionally, the extender may be made and supplied as a separate part or component from the accessory module, without affecting the scope of the present invention. However, such an approach may be less desirable, particularly with respect to the assembly plant operations.

Optionally, the accessory module may be provided with an electrical connector 70 (FIG. 1), such as a wire and multi-pin connector or the like, extending from the accessory module for connecting to or plugging into a corresponding connector provided at a headliner or overhead console of the vehicle. For example, an overhead console 71 of the vehicle may extend toward the glass or window area, such that the overhead console may be at or close to or adjacent to the windshield, such as described in U.S. Pat. No. 6,445,287, and in U.S. patent application Ser. No. 10/232,122, filed Aug. 30, 2002, now U.S. Pat. No. 6,975,215, which are hereby incorporated herein by reference, and may provide a feed or outlet or socket or connector 72 for connecting the electrical connector 70 of the accessory module thereto. Such a connection arrangement allows the vehicle manufacturer to provide an outlet at the overhead console or headliner of the vehicle to provide electrical connection and/or communication between various accessories or systems or power source of the vehicle and the accessory module and/or interior rearview mirror assembly, whereby the vehicle manufacturer does not have to provide a cable or wiring harness extending down from the overhead console or headliner, as is typically done with conventional mirror assemblies and the like. The accessory module manufacturer and/or supplier may thus provide the electrical connector or plug for extending to and connecting to the connector or outlet at the overhead console or headliner of the vehicle when the accessory module is mounted at the windshield of the vehicle. This allows for enhanced freedom in the harness and/or connection between the accessory module and the overhead console or headliner, whereby the accessory module may provide a high speed connection or different wires or cables as desired or required to power and/or drive the particular accessories and/or the like within the accessory module and/or the mirror assembly.

It is further envisioned that such a connector or outlet or plug or socket or the like may be provided at an overhead console or headliner of a vehicle for connection to an electrical wire or connector of other modules or components, such as a connector from an interior rearview mirror assembly or other type of accessory module or a separate windshield electronic module or the like. The connector at the overhead console or headliner may provide for electrical connection to items or components or accessories of an accessory module, mirror assembly, windshield electronic module or the like which may share circuitry with other items or components or accessories of the vehicle, such as at the overhead console or headliner, and/or may provide for electrical power connection to the accessory module, mirror assembly, windshield electronic module or the like, and/or may provide for electrical communication to or control of items, components or accessories of the accessory module, mirror assembly, windshield electronic module or the like, such as from another accessory or system of the vehicle.

Optionally, the accessory module may include a rechargeable battery or power source, such as a rechargeable battery pack (such as shown generally at 74 in FIG. 6) or the like, which may provide power to the accessory or accessories of accessory module 10 and/or of mirror assembly 14. The accessory module may then comprise a standalone battery operated accessory module and may not require electrical connection to a vehicle power source or the like. Preferably, the rechargeable battery pack is attachable to and detachable from the accessory module to ease removal and recharging of the battery pack when the power supply of the battery pack is low. The accessory module may include contacts or connectors at a battery pack receiving portion of the module which electronically connect to the accessories or circuit board of the accessory module (similar electrical connections may electronically connect the accessory module to one or more accessories of the interior rearview mirror assembly). The contacts or connectors may contact or connect to corresponding contacts or connectors at the battery pack when the battery pack is attached to the battery pack receiving portion of the module, such that the rechargeable battery pack is electronically connected to the accessories or circuit board of the accessory module when attached to the accessory module.

The rechargeable battery pack may include a plug or connector which is configured or adapted to plug into a vehicle power jack or outlet, such as a cigarette lighter type of outlet in the vehicle. The connector or plug may be molded into or integrated into the battery pack, such that the battery pack may be removed or unplugged from the accessory module and plugged into the power outlet of the vehicle to recharge the battery or batteries of the rechargeable battery pack. The accessory module or battery pack may include a low power indicator which may be activated or illuminated or deactivated when the power level of the battery pack is reduced to a low level whereby the battery pack requires recharging. Also, the batter pack may include a full charge indicator to indicate when the battery pack has completed the recharging process while plugged into the vehicle outlet.

The battery pack may thus be recharged by the vehicle power source or battery, such as while the vehicle is being driven or even when the vehicle is not in operation. The recharging process may result in a minimal draw of power from the vehicle, such that the battery pack may be recharged when the vehicle is not running, but may not significantly drain the battery or power supply of the vehicle. After the battery pack is recharged, the battery pack may be unplugged from the vehicle outlet and plugged into or attached to the accessory module to provide power to the accessory or accessories of the accessory module and/or the mirror assembly. Optionally, solar panels or the like may be provided as a primary source for recharging of the battery pack, without affecting the scope of the present invention.

Although shown and described as being attachable to and detachable from the accessory module, it is envisioned that a rechargeable battery pack in accordance with the present invention may be equally applicable for removably mounting to a mirror assembly or other module or console of the vehicle, in order to provide power to an accessory or accessories at or within the mirror assembly or other module or console of the vehicle. The rechargeable battery pack of the present invention provides a rechargeable battery or power source and may be suitable for use with a standalone accessory module, console or mirror assembly, whereby the accessory module, console or mirror assembly may include various accessories, but may not require electrical connection to the vehicle power source or the like. Optionally, a portion of the accessory module, such as a head portion or the like, may include such a rechargeable battery pack and may be detachable from the rest of the accessory module, whereby the portion of the accessory module may be plugged into a power outlet of the vehicle to recharge the rechargeable battery pack contained or housed therein.

The accessory module of the present invention may also include one or more antennae, which may be mounted as a separate component of the module, or may comprise conductive elements attached to or deposited directly onto the surfaces of the structural member or the cover plate of the accessory module. The antenna may be useful for a GPS system, a mobile/remote transaction system, such as a smart card system or an electronic toll collection system or the like, a remote keyless entry system, a communication system and/or any other system which may transmit a signal and/or receive a signal via an antenna.

Accessory module 10 may include any other accessories or components which it would be desirable to have in the general location of the interior rearview mirror. Because the accessory module is positioned at the interior rearview mirror and may be electrically coupled to the mirror, the accessory module may allow for decontenting of the mirror, such that many accessories, which may have been previously positioned at or within the mirror housing, are positioned at or within the accessory module. The mirror may still include lights, electrochromic elements or the like, and may receive the appropriate electrical signals from the connection between the mirror and the mount at the extender. However, other electrical components and/or controls and/or circuitry may be moved to the accessory module of the present invention.

Figure 11:
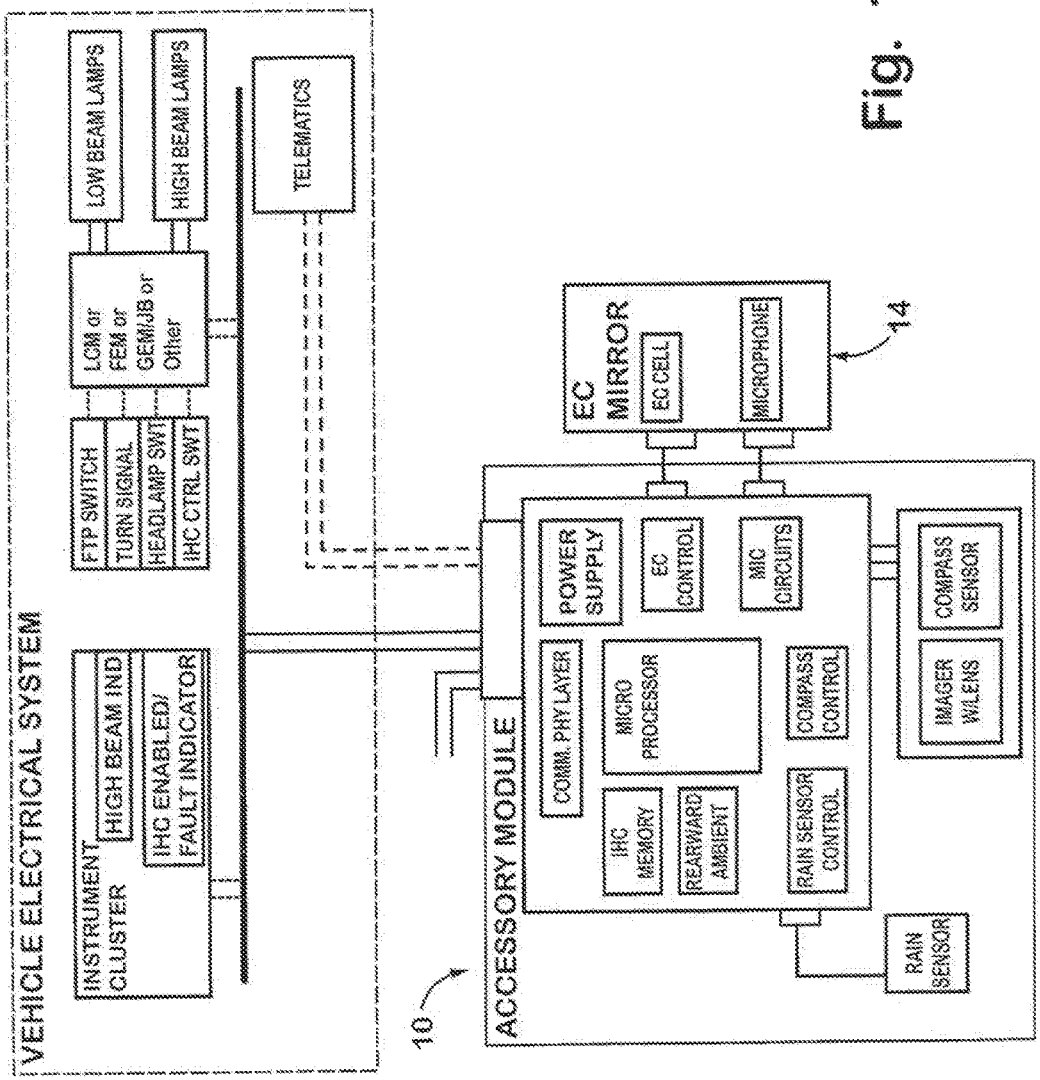
FIG. 11 is a block diagram of examples of accessories and functions of an accessory module in accordance with the present invention.

The accessory module of the present invention may include various accessories or features, such as shown in FIG. 11. For example, the accessory module may include one or more displays, such as a text display, an icon display, a display on demand type display, such as a video or touch screen interface display, a biometric imager, such as for fingerprint authentication or the like, an infrared sensor, such as a zonal temperature sensor, such as suitable for an auto climate control, a forward facing image sensor, such as described above, a rearward facing image sensor (such as for biometric imaging (such as for face recognition, iris recognition or the like), seat height or position detection, drowsiness detection, safety/restraints object detection and position, emergency response image capture system, intrusion detection or the like), an electronic field sensor (such as the type disclosed in commonly assigned U.S. patent application Ser. No. 09/992,119, filed Nov. 14, 2001, now U.S. Pat. No. 6,768,420, which is hereby incorporated herein by reference), a microphone (such as the type disclosed in commonly assigned U.S. Pat. Nos. 6,243,003 and 6,278,377, and/or U.S. patent application Ser. No. 09/466,010, filed Dec. 17, 1999, now U.S. Pat. No. 6,420,975, which are hereby incorporated herein by reference), a speaker, a telematics module (which may include a GPS module or system, a wireless communication module or system, an antenna for a GPS or phone or communication system or the like, a human/machine interface (HMI), a display, such as an LED display, dot matrix display, alpha numeric display, video display or the like, a microphone and/or microphone circuits, which may be operable for speech or voice recognition, noise reduction or noise cancellation), a speaker, a rechargeable battery pack, a humidity sensor, a compass sensor and/or compass control, an electrochromic (EC) control, a remote keyless entry sensor, a tire pressure monitoring system (TPMS), an electronic toll collection sensor, an emergency or roadside assistance system, an intelligent headlamp control and memory, user interface controls (such as buttons, switches or the like for controlling various accessories of the vehicle, such as a sunroof, a communication system, lamps, security systems, displays or the like) or any other accessories, sensors, lights, indicators, displays, or the like which may be suitable for mounting or positioning at or within the accessory module. The accessory module may also provide for glare reduction characteristics of the rearview mirror.

For example, the accessory module and/or the mirror assembly may include one or more other accessories, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener device for actuating a garage door opening mechanism for opening a garage door or the like, such as disclosed in U.S. Pat. Nos. 6,396,408; 6,362,771; and 5,798,688, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381; and/or Ser. No. 09/793,002, filed Feb. 26, 2001, now U.S. Pat. No. 6,690,268, microphones, such as disclosed in U.S. Pat. Nos. 6,243,003; 6,278,377; and/or 6,420,975, speakers, a compass, such as disclosed in U.S. Pat. Nos. 5,924,212; 4,862,594; 4,937,945; 5,131,154; 5,255,442; and/or 5,632,092, a tire pressure monitoring system (TPMS), such as the types disclosed in U.S. Pat. Nos. 6,294,989; 6,445,287; and/or 6,472,979, and in U.S. patent application Ser. No. 10/232,122, filed Aug. 30, 2002, now U.S. Pat. No. 6,975,215; and Ser. No. 10/279,059, filed Oct. 23, 2002, now U.S. Pat. No. 6,774,774, a seat occupancy detector, a trip computer, an ONSTAR® system and/or the like (with all of the above-referenced patents and patent applications being commonly assigned, and with the disclosures of the referenced patents and patent applications being hereby incorporated herein by reference in their entireties). The accessory or accessories may be positioned at or within the accessory module housing and/or the mirror casing and may be included on or integrated in a printed circuit board positioned within the respective housing or casing, without affecting the scope of the present invention.

The accessories or components of the accessory module may be connected to the vehicle electronic or communication systems and may be connected via various protocols or nodes, such as Bluetooth, SCP, UBP, J1850, CAN J2284, Fire Wire 1394, MOST, LIN and/or the like, depending on the particular application of the accessory module of the present invention. The accessory module may be electronically integrated with the vehicle electrical and/or control systems. For example, the accessory module may connect to a sunroof control, a rain sensor control, a mass motion sensor, a roof lighting control, a microphone/cell phone control, a climate control, an electrochromic mirror reflective element or cell control and/or the like. The accessory module may provide an output to the vehicle system or systems over a communication bus, such as a high beam activation level (which may be dependent on the module interface type, such as duty cycle, active/inactive, percent illumination, etc.), an intelligent headlamp control enabled/fault indicator status, a rain sensor status, a compass status, an ambient light level status (which may be an interior or exterior lighting status), an exterior condition status, an autolamp status, a sunload status and/or the like. The accessory module may also receive various inputs over the communication bus or communication line, such as an intelligent headlamp control enabled/disabled status, a transmission status (such as park, reverse, neutral, drive, low or other gear settings), a headlamp status, a vehicle speed, a steering wheel angle, a turn signal status, and/or the like. The accessory module may be in electrical communication with the interior rearview mirror assembly, such as for controlling an electrochromic cell of the mirror and/or a microphone of the mirror and/or the like, and may be in communication with a telematics system of the vehicle, such as to provide a signal from a microphone or speaker at the accessory module and/or the interior rearview mirror assembly. The accessory module may include a vehicle connector for connecting to a wire or cable of the vehicle, which may provide power and electrical communication to the accessory module, such as via a communication bus or the like. Optionally, the accessory module may include a rechargeable battery pack, such as described above, and may thus comprise a standalone accessory module and thus may not require electrical connection to the vehicle wiring and/or controls.

Figure 13:
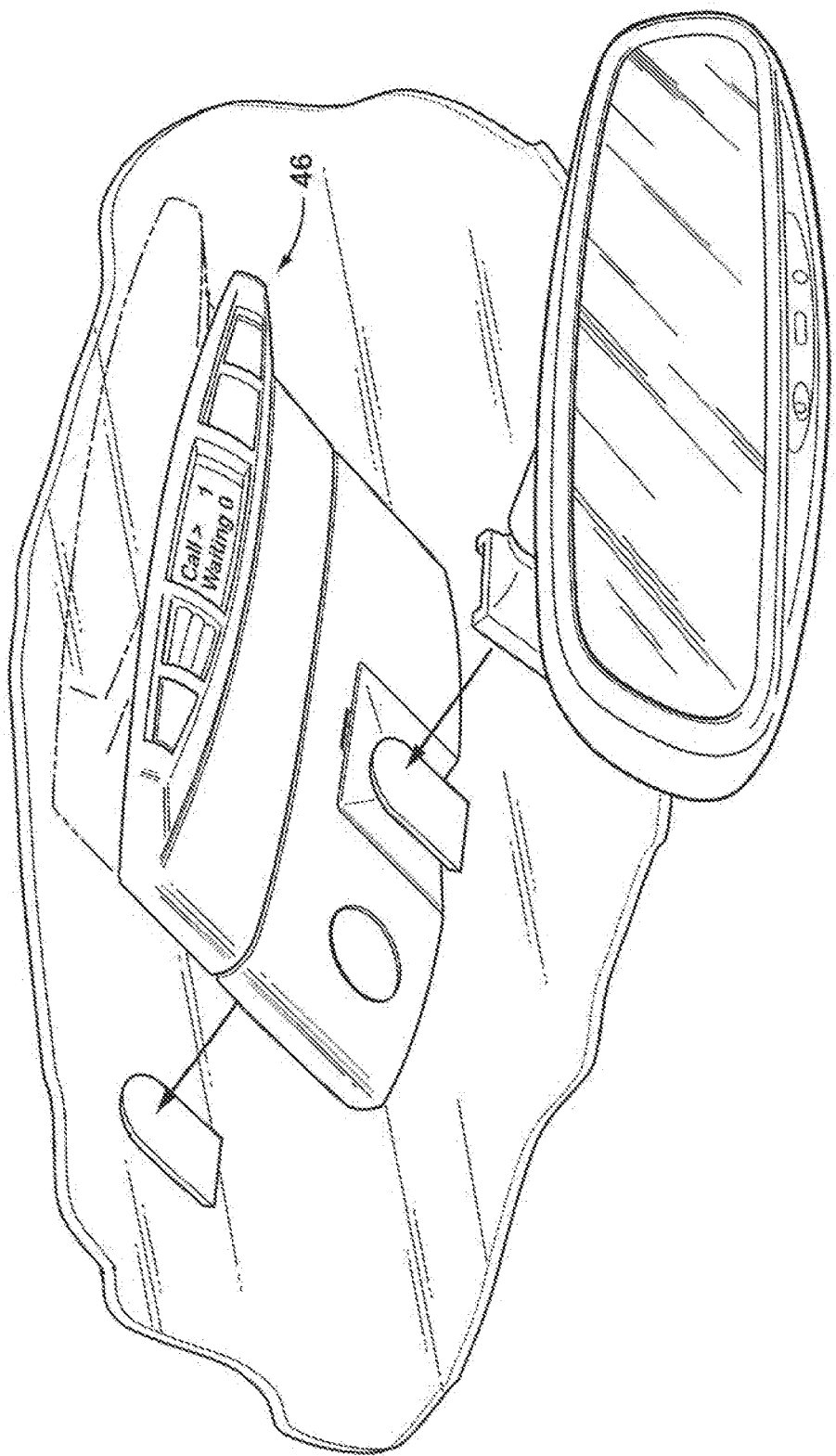
FIG. 13 is a perspective view of another alternate embodiment of an accessory module in accordance with the present invention.

Accessory module 10 may also include user interface controls, such as buttons, switches or the like, displays, indicators, microphones, speakers or the like. Some of these may be provided at or along a display or interface area above the mirror, such as shown at display or interface area 46 in FIGS. 12A-D and 13. Optionally, accessory module 10 may include an extension (such as shown in FIGS. 59-65) which extends over or under the mirror 14 to provide easier or enhanced access and viewing of various user interface controls or displays or the like, without affecting the scope of the present invention. It is further envisioned that display or interface portion or area 46 may comprise an upwardly extending display or user interface portion and may be extendable and retractable relative to the mounting button area of the accessory module, such that the extension may be moved upward to provide clearance over the mirror (as shown in FIGS. 12A, 12B and 13) or such that the extension may be moved upward toward the headliner of the vehicle, depending on the application of the accessory module of the present invention.

Figure 14:
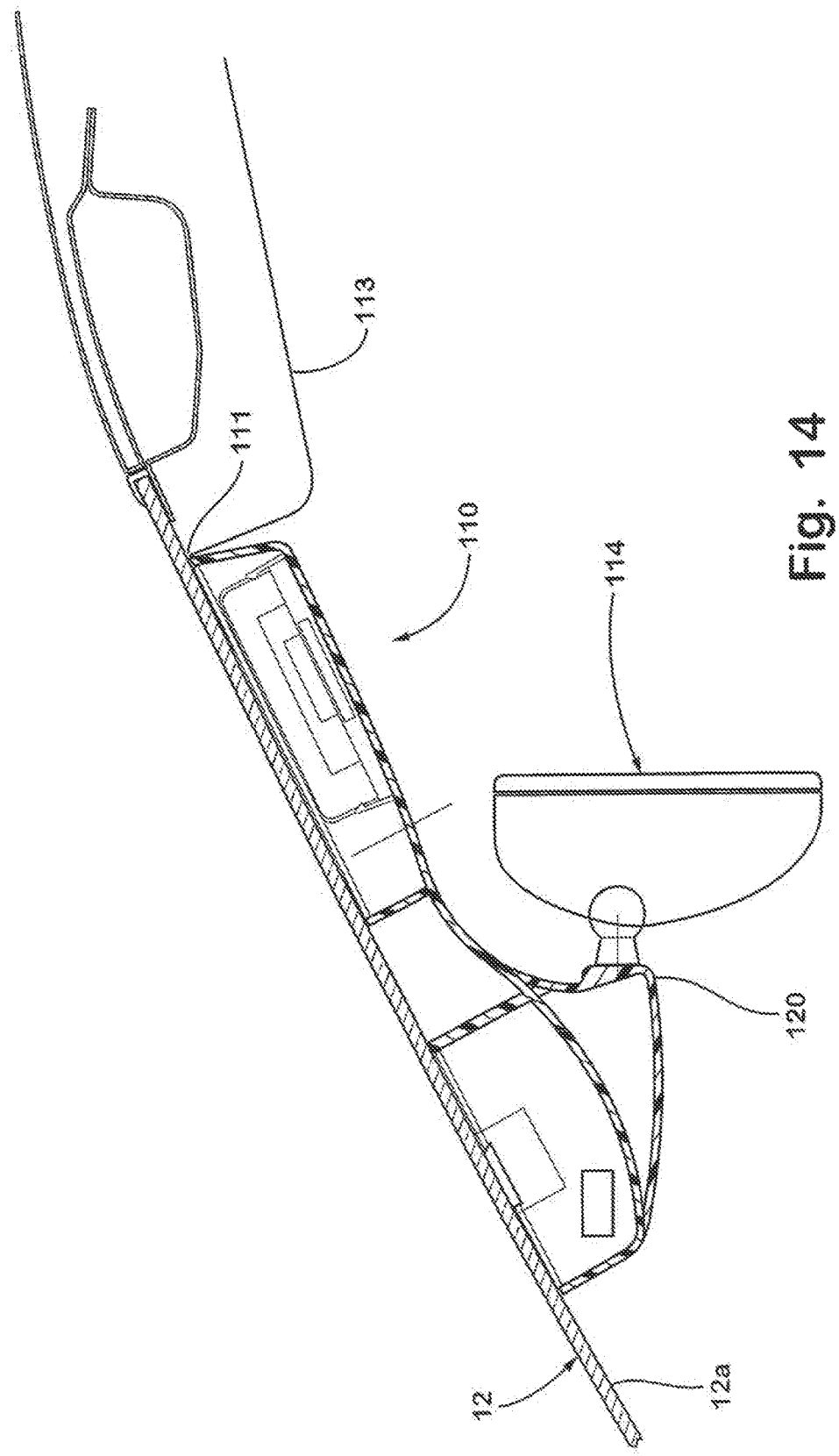
FIG. 14 is a side elevation and partial sectional view of an alternate embodiment of an accessory module in accordance with the present invention, which is pivotable into engagement with the windshield.

Referring now to FIG. 14, an accessory module 110 in accordance with the present invention is loaded toward and against the interior surface 12a of the windshield 12 via pivotal movement of the accessory module 110 about a pivot axis or joint 111 at the headliner 113 of the vehicle. The accessory module 110 includes a mirror mount 120 which extends from a lower portion of the module for mounting a mirror assembly 114 thereto. Accessory module 110 may include any and/or all of the accessories or components discussed above with respect to accessory module 10 and may provide for electrical connection to the electrical components or accessories via electrical connection when the module is pivotably mounted at the headliner and/or when the module is pivoted toward and against the windshield to load the module against the windshield, such as via electrical contacts or plugs or the like, as discussed above. The accessory module 110 may be loaded toward and against the windshield via a ratcheting of the module as it is pivoted toward engagement with the windshield or via other means for loading and retaining the module at the windshield.

Figure 15:
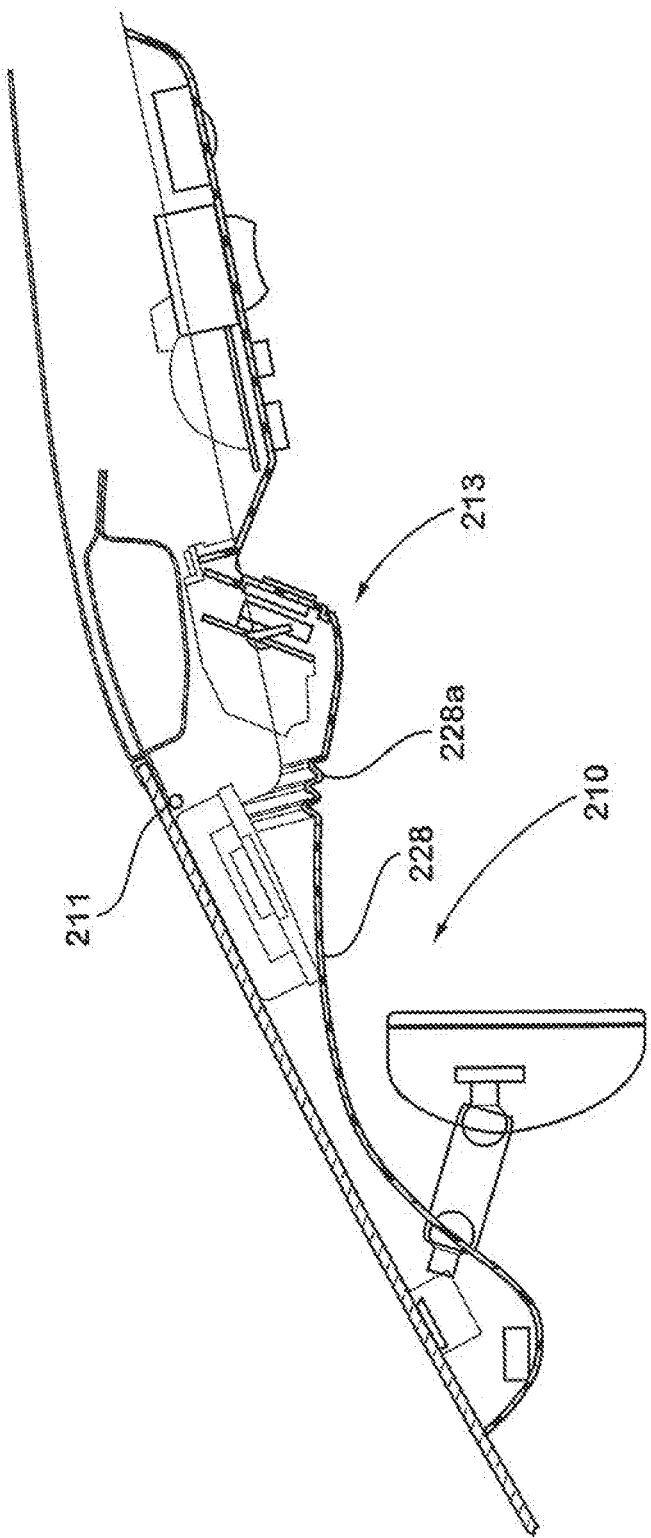
FIG. 15 is a side elevation and partial sectional view of another alternate embodiment of an accessory module in accordance with the present invention, which is pivotable into engagement with the windshield.
Figure 16:
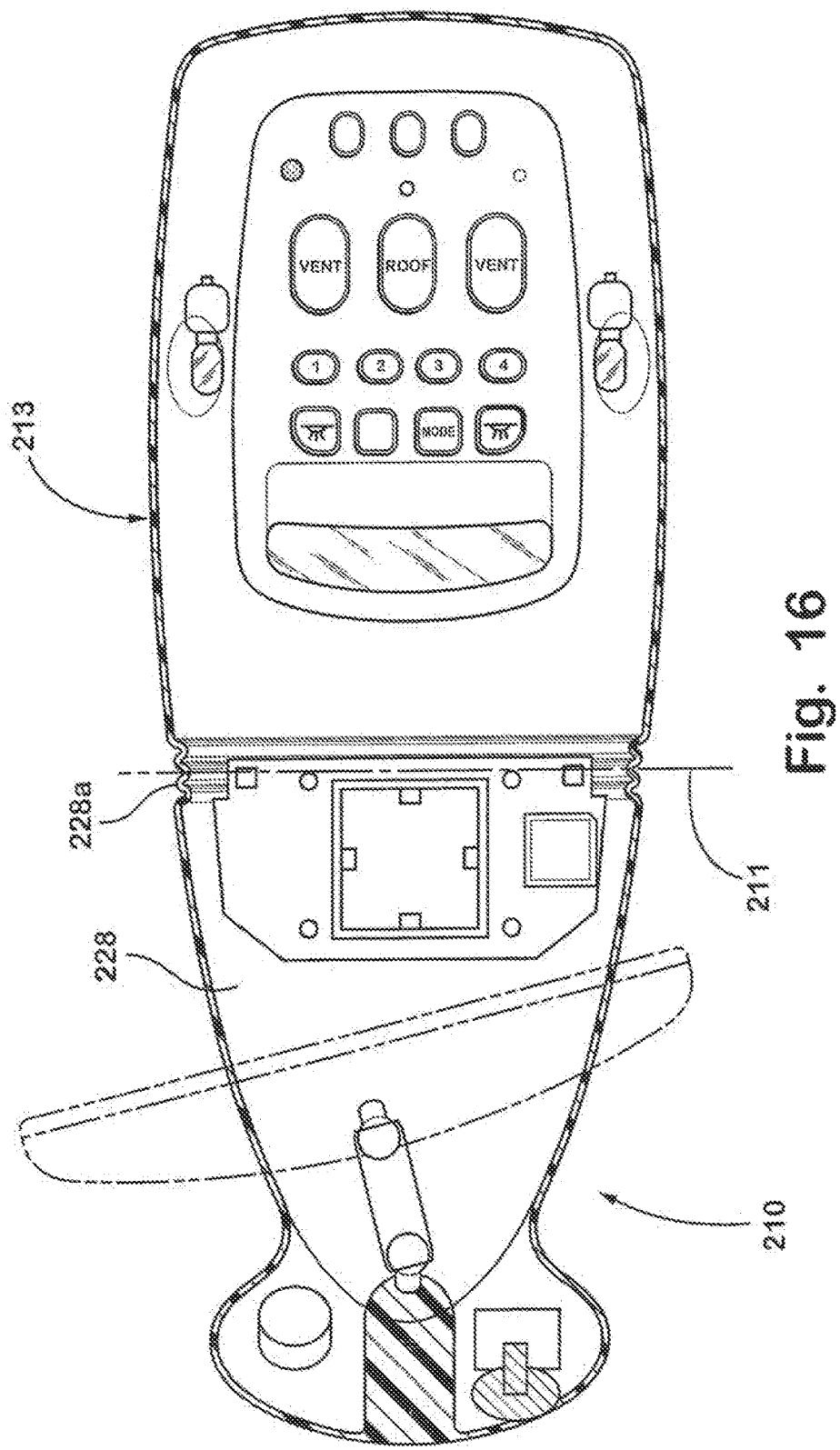
FIG. 16 is a lower plan view of the accessory module of FIG. 15.

Optionally, as shown in FIGS. 15 and 16, an accessory module 210 may be pivotally mounted at the headliner 213 of the vehicle, such as at a pivot axis or joint 211, and may include an expandable area 228a of the housing 228 to provide a continuous module housing 228 while accommodating flexing of the module housing as the module is pivoted toward or away from the windshield. As shown in FIGS. 15 and 16, some of the interface controls, displays, lights, indicators and/or the like may be positioned at a control console at and along the headliner of the vehicle, without affecting the scope of the present invention.

Optionally, the accessory module of the present invention may be an extension of a header portion of the vehicle and/or a header console of the vehicle, such as to provide a viewing area or display visible through the windshield from outside the vehicle, such as described in commonly assigned, U.S. patent application Ser. No. 09/710,016, filed Nov. 10, 2000, now U.S. Pat. No. 6,445,287, which is hereby incorporated herein by reference. The module or lobe extending down from the header portion or console may be spring mounted or otherwise loaded or biased toward the windshield and may include a cushioning or sealing member to cushion the module against the windshield.

Optionally, the header portion or console may be installed at the roof or header of the vehicle (such as before the windshield is installed to the vehicle) and may include a lobe or module which may be movable forwardly with respect to the vehicle to move and load the module against the interior surface of the windshield after the windshield is installed in the vehicle. The module may be spring loaded to move and load the module toward and against the windshield, or may be ratcheted forward or otherwise moved toward the windshield to move and load the module toward and against the windshield of the vehicle. The module may then be retractable or movable away from the windshield to facilitate access, service, maintenance or replacement of the accessory module.

Figure 17:
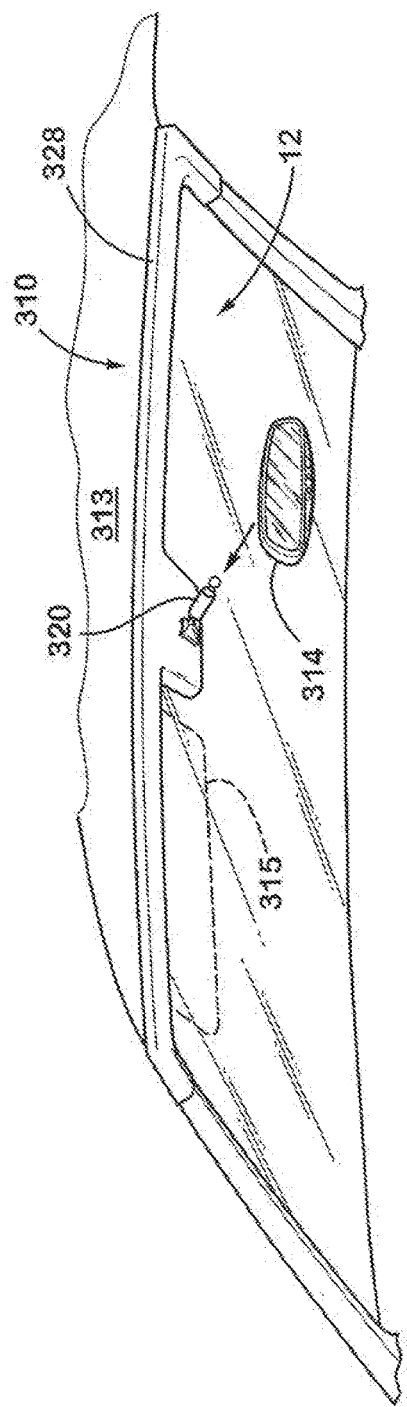
FIG. 17 is a perspective view of another alternate embodiment of an accessory module in accordance with the present invention which extends along a headliner of the vehicle.

Referring now to FIG. 17, an accessory module 310 in accordance with the present invention may comprise a housing 328 which extends at least partially across the headliner 313 of the vehicle and provides a mount 320 for mounting a mirror assembly 314 thereto. In the illustrated embodiment, the accessory module 310 extends entirely across the headliner between the A-pillars of the vehicle to provide a continuous module along and above the upper edge of the windshield. The accessory module 310 may include one or more sun visors 315, which may fold down or be pulled down and unrolled from within the accessory module 310 to provide shielding of the sun from the driver's or passenger's eyes. The accessory module 310 may include any and/or all of the accessories or components discussed above with respect to accessory module 10 and may provide for electrical connection to the electrical components or accessories via electrical connection when the module is mounted along the headliner (such as via screws, snaps, or other fasteners) and against the windshield (whereby the module is preferably loaded against the windshield), such as via electrical contacts or plugs or the like, similar to those discussed above.

Figure 18:
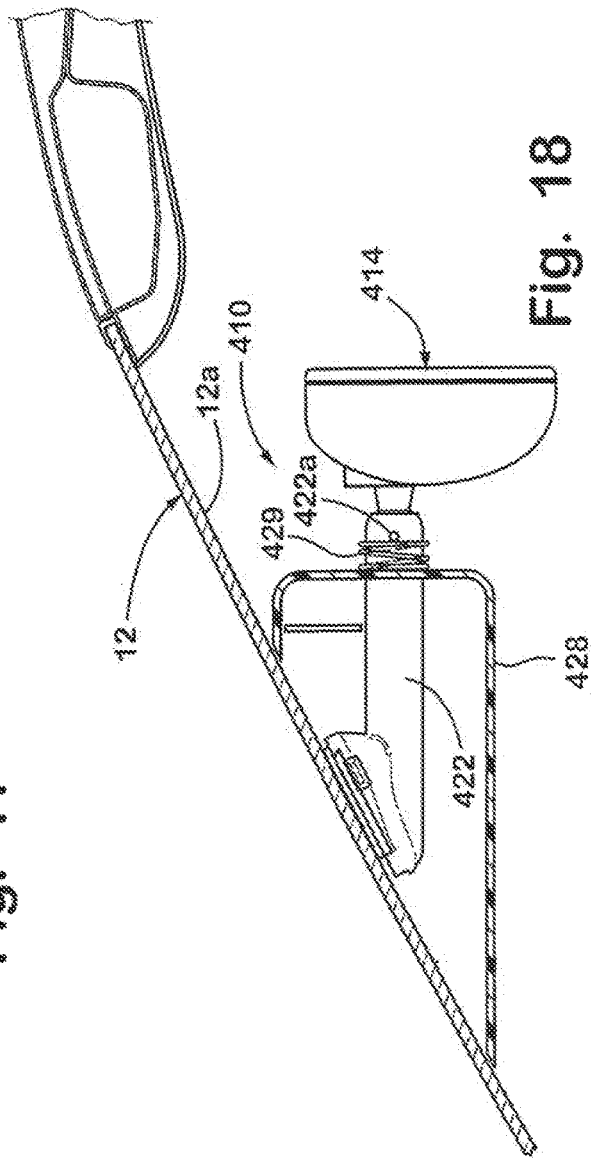
FIG. 18 is a side sectional view of another alternate embodiment of an accessory module in accordance with the present invention.

Referring now to FIG. 18, an accessory module 410 may be biased or spring loaded against the interior surface 12a of the windshield via a biasing member or spring 429 along the mounting arm 422. Spring 429 is positioned between a raised portion or stop 422a along mounting arm 422 of mirror 414 and a cover 428 of accessory module 410. The accessory module 410 may include accessories, displays, user interface controls and/or the like, as discussed above with respect to accessory module 10.

Figure 19:
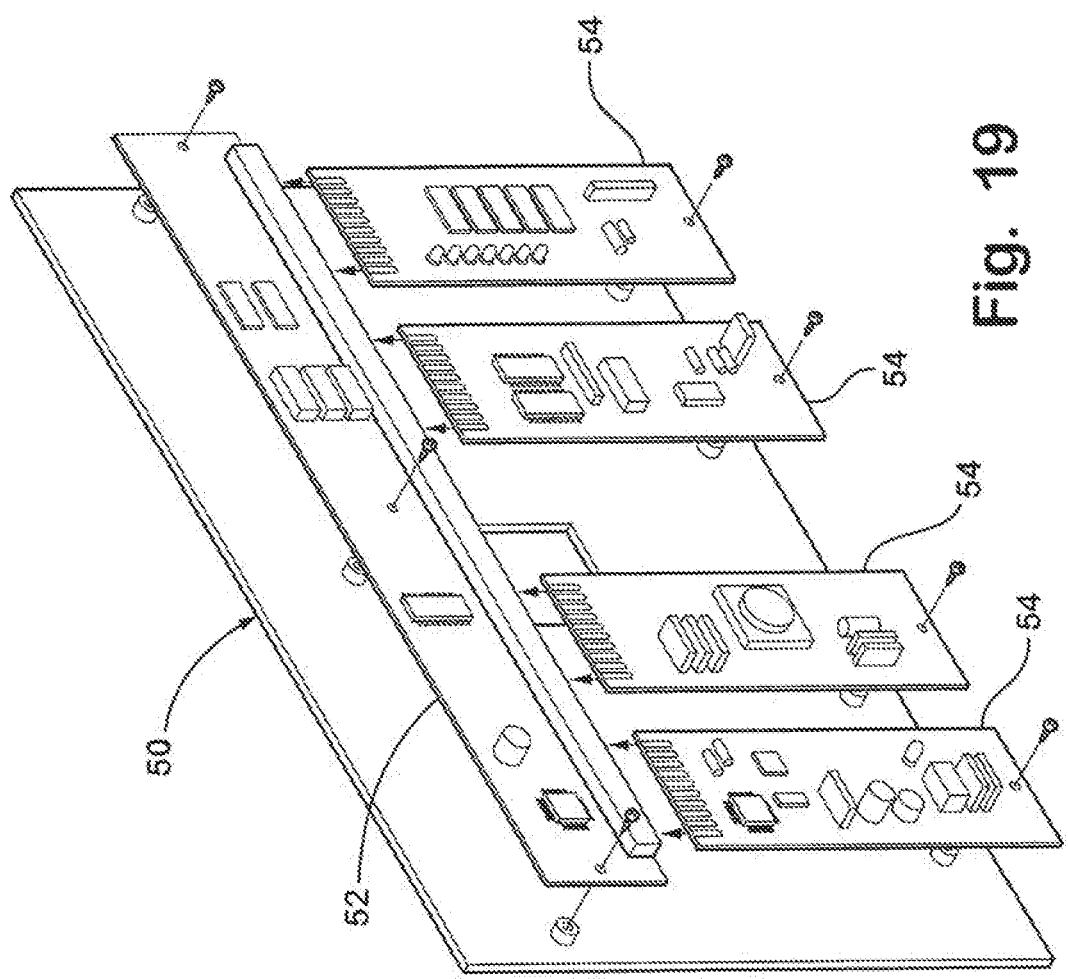
FIG. 19 is a perspective view of a platform for mounting electrical circuit boards or other electrical connections suitable for use with the present invention.

As shown in FIG. 19, an accessory module in accordance with the present invention may include a plate or platform 50, which may further include a main board or power bus 52 mounted or affixed thereto. The platform 50 may then include one or more electronic sub-boards 54, which may be attached to the platform 50 as desired, depending on the particular application of the accessory module and on the desired features or accessories of the module.

Figure 20:
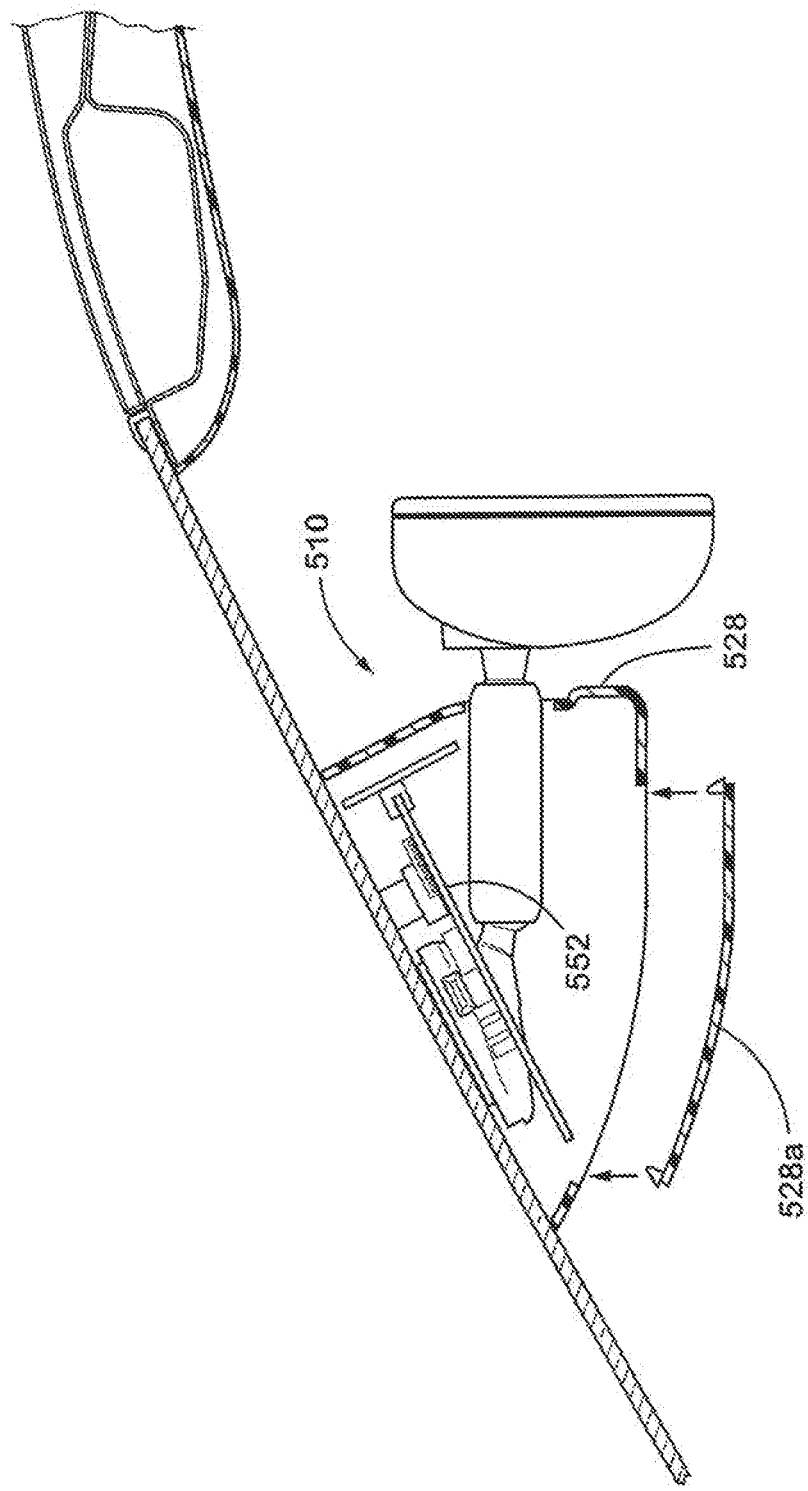
FIG. 20 is a sectional view of another alternate embodiment of an accessory module in accordance with the present invention, with a removable circuit board.
Figure 21:
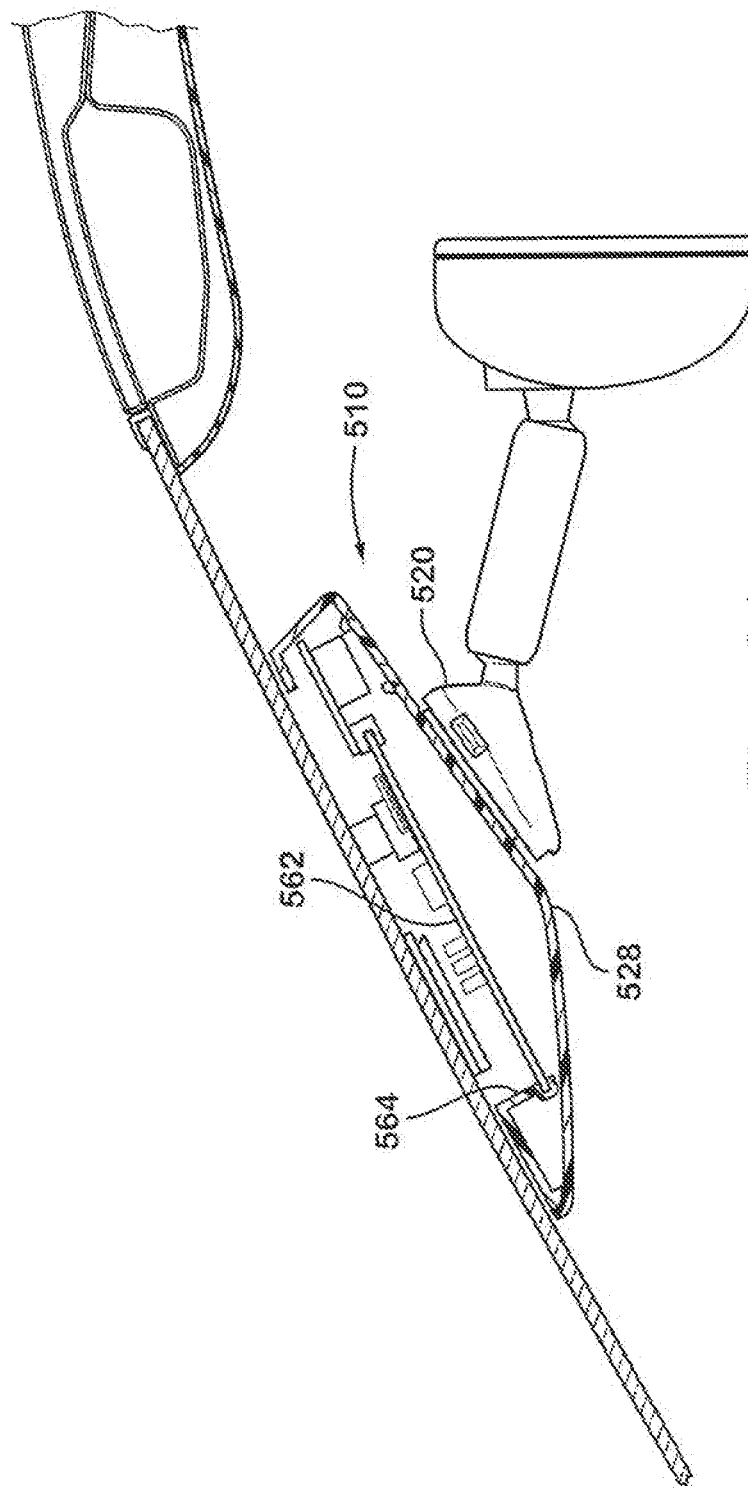
FIG. 21 is a sectional view of another alternate embodiment of an accessory module in accordance with the present invention, with a removable circuit board.

It is further envisioned that an accessory module 510 (FIG. 20) may include a removable, plug-in module 552, which may be installed in or removed from the module depending on the application of the module and the desired functions and features of the module. The accessory module 510 may include a removable panel 528a at housing 528 to facilitate access to the plug-in module 552. Alternately, a plug-in module or card 562 may be retained in connection with an electrical connector via a retention clip 564, as shown in FIG. 21. As also shown in FIG. 21, the mirror mount 520 may connect to an exterior surface of housing 528 of accessory module 510.

Figure 22:
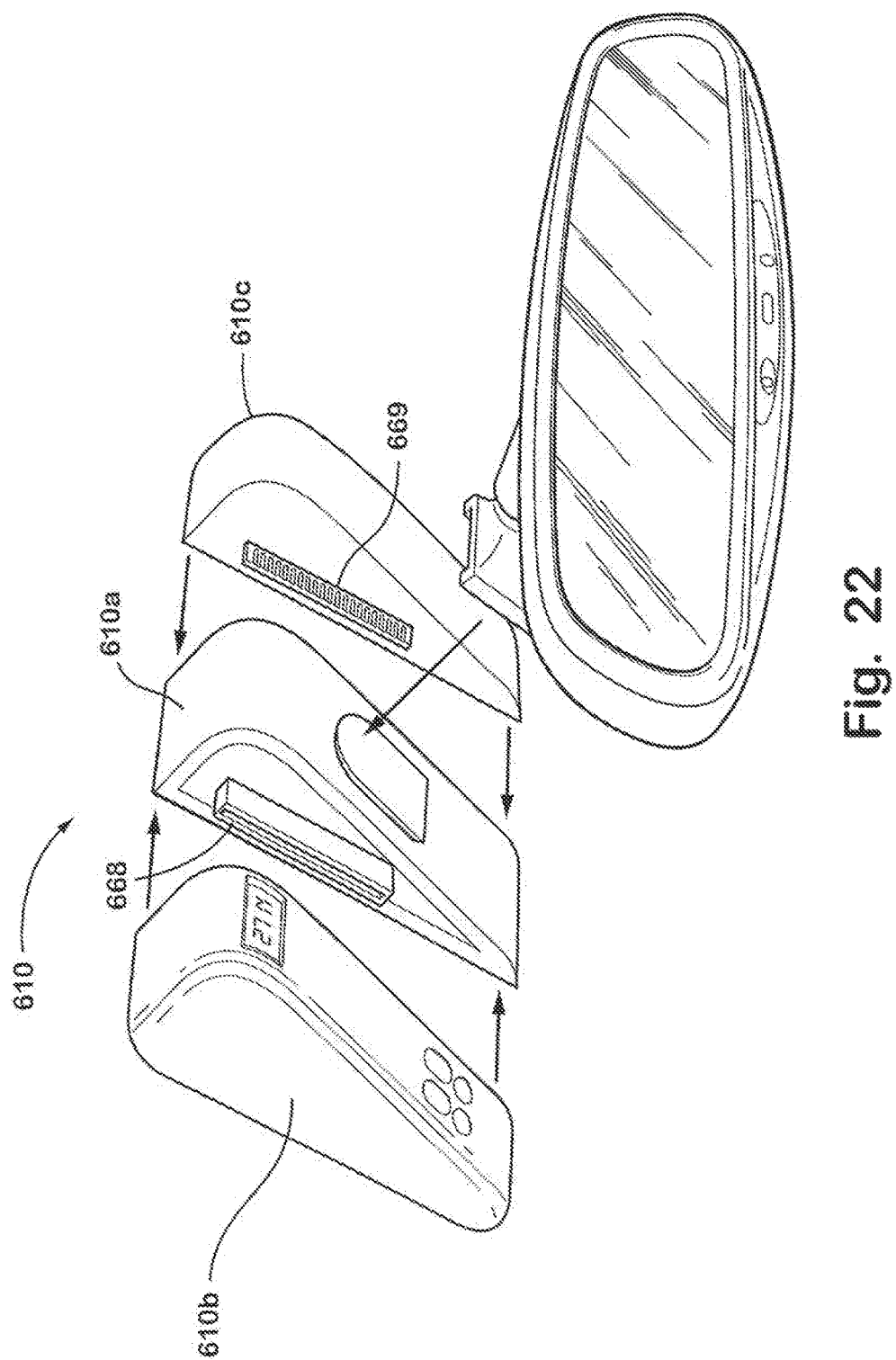
FIG. 22 is a perspective view of another alternate embodiment of an accessory module in accordance with the present invention, with removable or interchangeable side pods.

Optionally, an accessory module 610 (FIG. 22) of the present invention may include a center module 610a mounted to or at the windshield in a manner according to the present invention. The center module 610a may provide a connector 668 along one or both sides of the center module for connection of one or more side pod modules 610b, 610c. The center module 610a and/or the side pod modules 610b, 610c may include various accessories, displays, controls, indicators and/or the like, such as discussed above with respect to accessory module 10. The electrical connections to the side pod modules 610b, 610c may be made as the side modules are snapped or otherwise attached or mounted to center module 610a, such as via electrical connectors 668, 669.

Figure 23A:
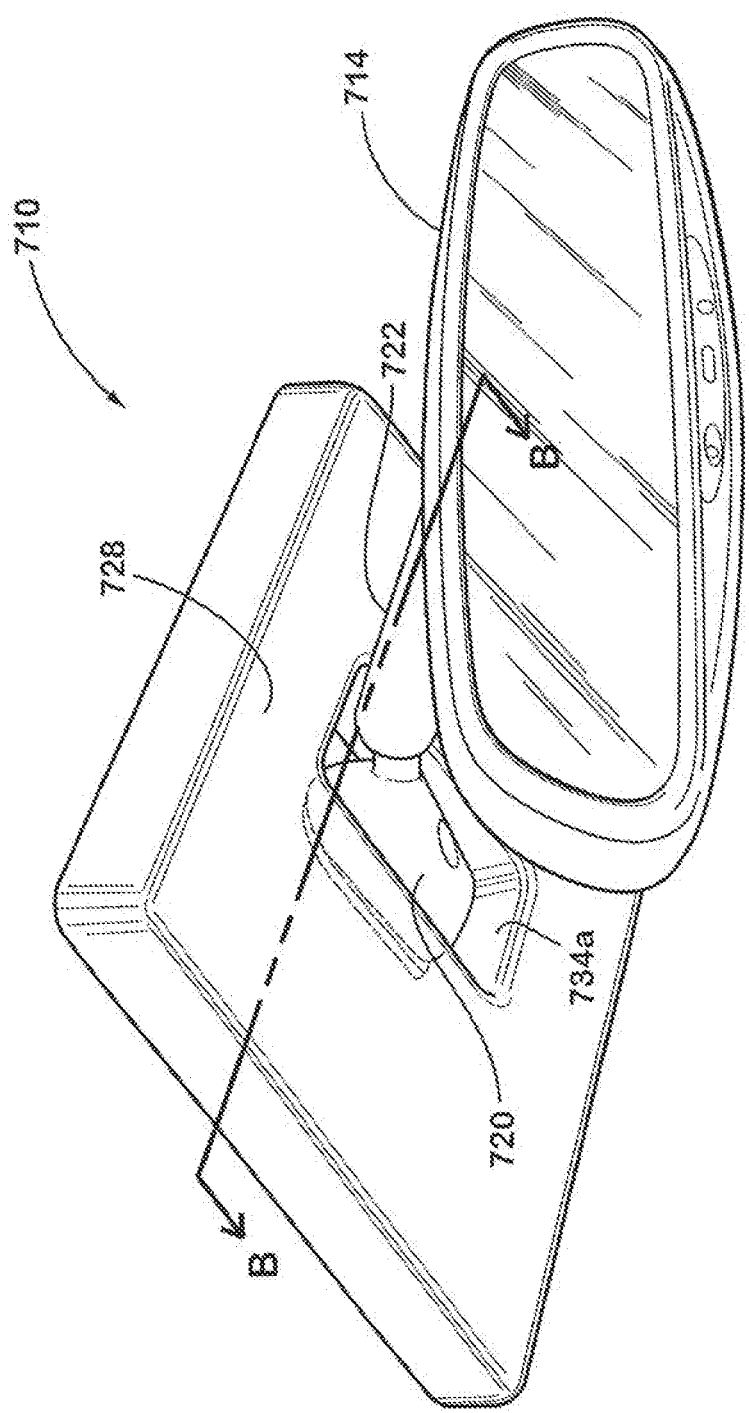
FIG. 23A is a perspective view of another alternate embodiment of an accessory module in accordance with the present invention.

As shown in FIGS. 23A and 23B, an accessory module 710 may mount to the windshield 12 and include an opening or passageway 734a for fitting the accessory module around a mounting button 718, mount 720 and mounting arm 722 of a mirror 714. The accessory module 710 may include a structural mounting portion or member 726 and a cover 728, which define a cavity 730 for housing various accessories or the like. The accessories may include any accessories, controls, indicators, displays and/or the like as discussed above.

Referring now to FIGS. 24A, 24B and 25A-C, an accessory module 810 is mountable to a mounting button (not shown) at a windshield of a vehicle and provides a second mounting button 816a for mounting a mirror mount 820 and mirror 814 to accessory module 810. The second mounting button 816a is positioned within a pocket or recessed area, where the pocket allows sufficient clearance for the mirror mount 820 to fit in and slide onto the button 816a. The accessory module may extend upward and over the mirror 814, as can be seen in FIGS. 25B and 25C, to provide access to one or more user interface controls or buttons 811 at an upper end of the accessory module 810.

In the illustrated embodiment of FIGS. 24A, 24B and 25A-C, the accessory module may provide buttons 811, such as for actuating a garage door opener device or system of the vehicle or accessory module for actuating a garage door opener mechanism for opening a garage door or the like, such as the types described in U.S. Pat. Nos. 6,396,408; 6,362,771; 5,798,688 and 5,479,155, which are hereby incorporated herein by reference, such as the type available from Johnson Controls, Inc. of Plymouth, Mich., under the name HOMELINK®. The accessory module 810 includes a mounting portion 810a and an upper extension 810b which extends over the mirror 814. The angle of the upper portion 810b relative to the lower portion 810a is selected according to the angle of the windshield of the targeted vehicle, such that the buttons are directed generally parallel to the floor of the vehicle when the accessory module is mounted to the windshield. Desirably, the upper portion may be pivotable so that the upper portion may be canted toward the driver and secured in such position, or the upper portion may desirably be rigidly canted toward the driver (such as approximately 10-35 degrees, and preferably 15-25 degrees), to provide enhanced visibility and access to the buttons by the driver of the vehicle.

Optionally, the upper portion 810b of the accessory module may include an information display, such as a compass display (not shown). Desirably, all of the compass circuitry, including the vacuum fluorescent display and the compass sensors, may be created on one circuit board, thus allowing economy of parts fabrication. Also, because the accessory module, when mounted to the windshield, is rigid and does not move, the orientation of the compass sensing element, such as a magnetoresistive sensor, such as described in U.S. Pat. No. 5,802,727, and U.S. patent application Ser. No. 09/540,702, filed Mar. 31, 2000, now U.S. Pat. No. 6,513,252, which are hereby incorporated herein by reference, remains substantially fixed relative to the vehicle. The compass and/or compass display may be of the types disclosed in U.S. provisional application, Ser. No. 60/420,010, filed Oct. 21, 2002, which is hereby incorporated herein by reference.

Optionally, the accessory module of the present invention may be mounted on the button at the windshield during a first operation at the vehicle assembly plant. For example, the module mounting member may be adapted to be attached to the button (preferably in a detachable way), and may include a mechanical fastener, such as a screw or other fastener, or a snap type connection or the like to secure the mounting member the button. Because the second button on the accessory module is a replicate of the button on the windshield, the mirror may mount on the second button during a second operation. Optionally, the accessory module may be provided to a vehicle assembly plant with the mirror assembly preattached to the module. The entire assembly may thus be adapted to be readily mounted to the attachment member or button at the windshield in a single operation at the vehicle assembly plant. The accessory module of the present invention preferably provides visual and mechanical guides or cues to facilitate the mounting operation as the accessory module is mounted to the windshield.

Figure 26D:
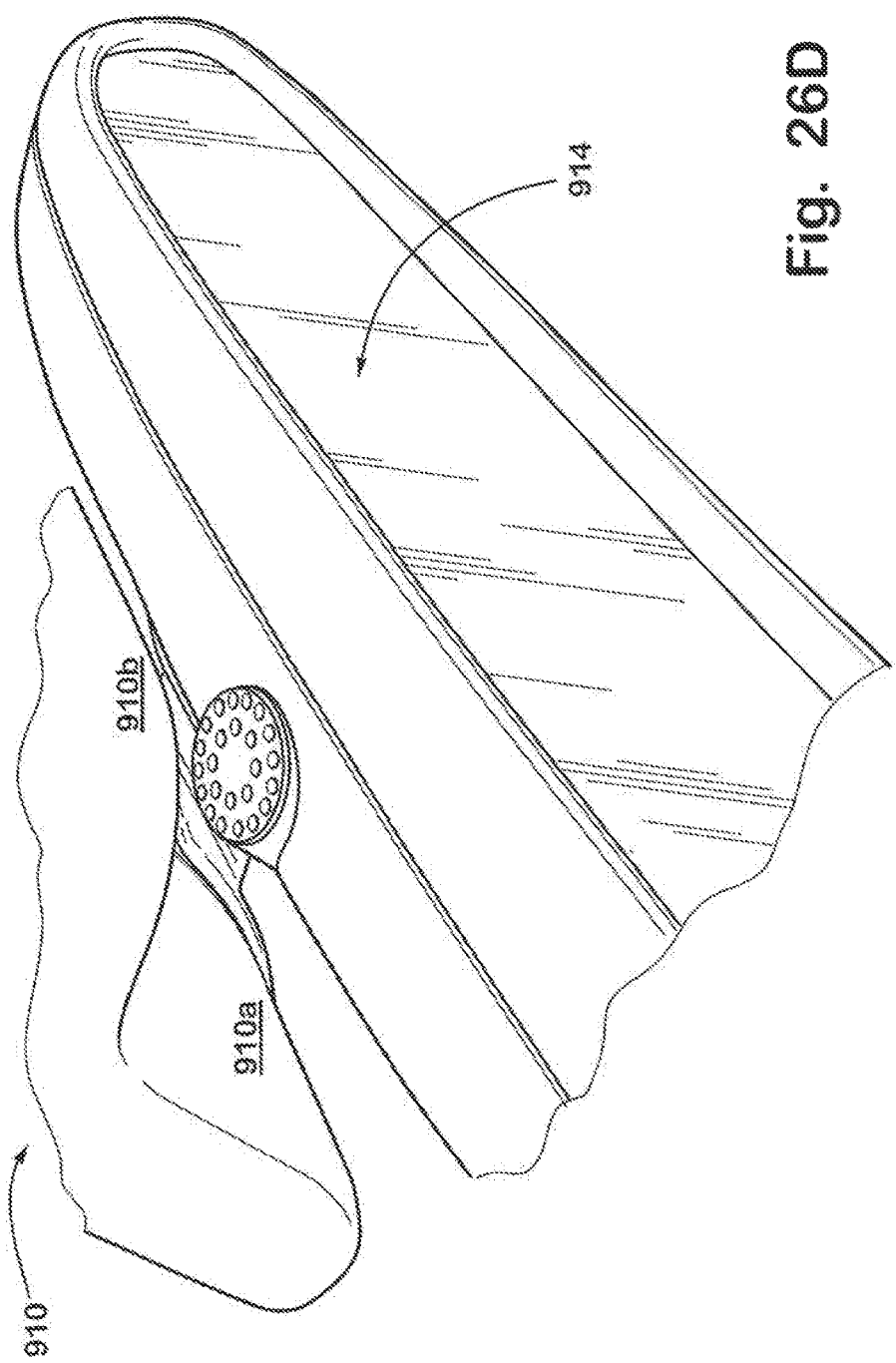

Referring now to FIGS. 26A-26D, an accessory module 910 is mountable at and/or loadable against an interior surface of a vehicle windshield, such as in a similar manner as discussed above with accessory module 10. Accessory module 910 is substantially similar to accessory module 10 discussed above, such that a detailed discussion of the features and characteristics of the accessory module will not be repeated herein. As shown in FIGS. 26C and 26D, the rearview mirror assembly 914, which is mounted to the mounting portion 920 at accessory module 910, may include a microphone 915. Microphone 915 may be mounted at an upper portion of the mirror assembly 914 and beneath an upper, curved portion 910b of the body 910a of accessory module 910. The microphone 915 may be of the type disclosed in commonly assigned, U.S. Pat. Nos. 6,243,003 and 6,278,377, and/or U.S. patent application Ser. No. 09/466,010, filed Dec. 17, 1999, now U.S. Pat. No. 6,420,975, and/or U.S. provisional applications, Ser. No. 60/415,233, filed Oct. 1, 2002, Ser. No. 60/429,360, filed Nov. 26, 2002, which are all hereby incorporated herein by reference.

Referring now to FIGS. 27-32, a stand-alone accessory module 1010 is mounted to an interior surface 12a of a windshield 12 of a vehicle and includes an extender 1016, which is mounted to and extends from a mounting attachment 1018 (such as a conventional mirror mounting button) at the windshield 12. A mounting portion of the extender 1016 may be slid or otherwise moved into engagement with the button 1018, as discussed above with respect to accessory module 10. Thus, accessory module 10 may detachably attach (and preferably breakaway if impacted, such as in an accident) to button 1018 (such as using a fastenerless attachment element, such as a top clip attachment, such as described in U.S. Pat. No. 5,576,687, which is hereby incorporated herein by reference) or may be secured thereto using a screw or similar fastener.

Extender 1016 may comprise a die-cast metallic member or a plastic molded member or the like, without affecting the scope of the present invention. As shown in FIG. 28, extender 1016 may include a channel or passageway 1017, such as a cylindrical passageway and/or threaded passageway, extending lengthwise through the extender, such that a threaded fastener or screw 1015 may be threaded through the extender to an opening or indentation in the button to retain or secure the extender to the button. The screw may be countersunk into the extender to provide a generally flat surface at the opposite end from the button end. Further, the channel may include a larger diameter passageway 1017a (large enough for the head of the fastener to be driven into to countersink the head of the fastener within the extender), which may extend substantially into the extender 1016 to allow the fastener 1015 to be partially threaded onto a threaded portion 1017b of the passageway, yet still be substantially within the countersunk portion. Because the fastener 1015 is initially positioned at least partially within the extender, a drive tool may be easily aligned with and engaged with the head of the fastener for driving the fastener into its securing position. The accessory module, including the extender and screw, may thus be provided to the vehicle assembly plant, whereby the screw or fastener may be easily driven into and/or against the mounting button 1018 by an operator at the vehicle assembly plant. The operator may then slide or otherwise position the extender onto the button and drive the screw or fastener into place to secure the extender to the button and windshield.

Extender 1016 includes a second mounting attachment or button at its outer end for receiving a mirror mount 1020 thereon (FIG. 27). The button-on-button attachment may be similar to the attachments disclosed in U.S. Pat. No. 4,930,742, which is hereby incorporated herein by reference. In addition to providing structural support for the housing of the accessory module and for the accessories included therein or mounted or attached thereto, the extender provides a rigid extension of a mounting button from the interior surface of the windshield for mounting (and supporting) an interior rearview mirror assembly 1014 to the windshield 12. The interior rearview mirror assembly may comprise a prismatic mirror assembly or an electrochromic mirror assembly or the like, without affecting the scope of the present invention, and with the interior rearview mirror assembly preferably forming a detachable and/or breakaway attachment to the outer end of extender 1016 of accessory module 1010.

Similar to extender 16, discussed above, extender 1016 provides a structural, load bearing connection between the attachment member 1018 and the mount 1020 of a support arm 1022 of the interior rearview mirror assembly 1014 (or the mount of the mirror, such as shown in FIG. 1) that is attachable to accessory module 1010. As such, extender 1016 is preferably fabricated of a rigid, load bearing material, such as a metallic material or metal, such as a die cast metallic material, such as die cast zinc or die cast aluminum or the like. Extender 1016 may comprise a solid member, or may include channels or passageways therealong, which may include a wireway passage, such as for wirings to pass therethrough or a channel-way to accommodate a screw type fastener, such as described above. The length of extender 1016 is sufficient for the housing or body 1011 of accessory module 1010 to slide over/secure to, but not so long as to create an excessive moment arm or to unduly move the reflective element of the interior rearview mirror assembly that attaches to the accessory module toward and close to the driver of the vehicle. Extender 1016 also provides structural support for the body of the accessory module and for any accessories contained therein or attached thereto.

As discussed above with respect to accessory module 10, extender 1016 is formed and adapted to mount to a particular mounting attachment member 1018 at the windshield at one end of extender 1016. For O.E.M. automaker installations, the opposite end of the extender is typically formed as a replication of the attachment member or button at the windshield of that particular vehicle (however, as previously indicated, the opposite end of the extender may be different from the button that the extender is mounted to so as to allow aftermarket installation of an accessory module that has a mirror mounting end for a mirror that anticipates a different button). Similar to extender 16, extender 1016 may have some or all of the plastics of the accessory module molded to the extender, such as by integral molding. Optionally, the extender may be die cast, such as a die cast metal (preferably die cast zinc or die cast aluminum) or otherwise formed, such as by molding of an engineering plastic, such as a filled nylon engineering plastic or the like, and may be formed as a structural skeleton member. Extender 1016 may be a solid construction or a hollow construction, such as a solid or hollow slug, and is preferably of limited length or extension so as to both facilitate ease of attachment to the mirror button by a vehicle assembly line operator (and where a screw or other fastener is used, the driving of the screw by the operator) and to minimize the further extension of the mirror reflector of the mirror assembly toward the driver when the mirror assembly is mounted to the extender. Preferably, the extension is no more than approximately two inches long, more preferably, no more than approximately 1.25 inches long, and most preferably, no more than approximately 0.75 inches long, to provide a sufficient space between the mirror mount 1020 and the mounting button 1018 for housing or body 1011. A cover, such as a plastic or polymeric cover, may then be snapped or otherwise affixed or attached to the skeleton extender, without affecting the scope of the present invention.

Housing or body 1011 of accessory module 1010 includes a base portion or fixed portion 1011a and an upper portion or movable portion or head portion 1011b extending from the base portion, as shown in FIG. 27. Base portion 1011a may be integrally molded with or onto extender 1016 or may snap or otherwise be secured to extender 1016, such as in the manners described above. For example, body 1011 can be formed in a separate molding operation and can snap onto extender 1016 as desired, without affecting the scope of the present invention. Body 1011 includes a mounting portion 1011c for mounting head portion 1011b to base portion 1011a, and preferably for movably or pivotably mounting head portion 1011b to base portion 1011a. Although shown as having the head portion 1011b positioned above the base portion 1011a, it is envisioned that a head portion (or tail portion) may also or otherwise be mounted at a lower end of the base portion and positioned below the base portion and interior rearview mirror assembly, without affecting the scope of the present invention.

The mounting portion 1011c of housing 1011 preferably allows for different types of head portions to be mounted to a standard or common base portion. The different heads may be tooled up or manufactured with different accessories associated therewith. For example, if a vehicle is made with a display as an option, a head portion with the display option may be mounted to the base portion of the accessory module, whereas if a vehicle is made with a garage door opener option, a head portion with such a garage door opener option may be mounted to the base portion. Clearly, other accessories or options may be incorporated into accessory module 1010, without affecting the scope of the present invention. The base portion thus may be a common part, while the head portion may be selected to match a desired function or option of the vehicle and may be mounted to the base portion. In such applications, all of the electronics, such as electronic circuitry for a compass system and display, a temperature display, a garage door opener device or system and associated buttons, a user input device or buttons, such as for a telematics system or the like, a microphone and/or any other desired system or systems or accessory or accessories may be positioned at or within the head portion, such that the accessory module may comprise the same base portion irrespective of the selected option or options or function or functions of the head portion.

The different modules with different features may mount to the mounting portion 1011c and optionally may be movably or adjustably mounted thereto. For example, the mounting portion 1011c may include pivot or swivel elements, such as a ring or partial ring of detents or indents or a ball joint or other type of swivel joint connection, which allows head portion 1011b to pivot or swivel relative to base portion 1011a, such as side to side and about a generally vertical pivot axis when the accessory module is mounted to the vehicle, so as to direct the head portion 1011b toward the driver, and/or up and down and about a generally horizontal pivot axis when the accessory module is mounted to the vehicle, so as to adjust a level at which the head portion is positioned. This allows for the different modules to be mounted to the generally fixed base portion and adjusted to an appropriate orientation for optimal viewing by the driver of the vehicle, even though the module may be installed in different vehicles, such as different vehicles with different angled windshields or different driver's head position relative to the windshield. However, in certain installations, the module mounting portion may have a preset angle, such that the head portion may snap onto the base portion and be generally fixed (such as at a preset angle) relative to the base portion, without affecting the scope of the present invention.

The detent ring allows for the head (or tail) portion to pivot or swivel and to click or snap or lock into place at one or more particular angles (such as at approximately six degrees downward and approximately twelve degrees toward the driver). The detent ring may include several detents, such that the head portion may be adjusted to one of several positions or orientations relative to the base portion. The head portion may be adjusted to an appropriate position when installed and then generally fixed or locked relative to the base portion, or may be adjustably mounted such that the head portion may be later adjusted by the driver of the vehicle if desired. The swivel or pivot mounting elements may be molded into the housing portions of the accessory module, or may be attached thereto, without affecting the scope of the present invention.

Optionally, the mounting portion 1011c may provide a swivel joint which may include a generally spherical ball shaped member which includes a plurality of dimples or indentations on its surface (such as similar to the surface of a golf ball), such that a corresponding portion of the mounting portion may at least partially receive the ball shaped member and engage an appropriate one or ones of the dimples or indentations to substantially secure or fix the head portion in a desired orientation relative to the base portion of the accessory module. The head portion may be adjustable via pivotal movement of the head portion relative to a horizontal direction or the x and y axes of the vehicle and/or relative to a vertical direction, such as left and right and/or up and down, to horizontally and/or vertically adjust the orientation of the head portion at various angles relative to the base portion.

As shown in FIGS. 31 and 32, the head portion 1011b of accessory module 1010 may be angled or canted to a desired orientation with respect to the windshield and with respect to a location corresponding to a typical location of the head of the driver of the vehicle. Preferably, the head portion of the accessory module is pivotable to be canted or positioned at an angle A with respect to the longitudinal axis 1009 (FIG. 31) of the vehicle which is approximately 8-18 degrees toward the driver of the vehicle, more preferably, approximately 10-15 degrees, and most preferably, approximately 11-13 degrees. Also, the head portion 1011b may be angled downwardly toward the driver's head at an angle B with respect to a generally horizontal plane 1007 (FIG. 32). Preferably, the head portion may be angled downwardly toward the driver's head location at an angle greater than approximately 1 degree and less than approximately 15 degrees, and more preferably, greater than approximately 5 degrees and less than approximately 10 degrees downward.

Accessory module 1010 may include various accessories within base portion 1011a and/or head portion 1011b. For example, in the illustrated embodiment, base portion 1011a of accessory module 1010 includes a forward facing video image sensor or system 1062. The image sensor or system 1062 may include an intelligent rain sensor (such as the type disclosed in commonly assigned U.S. Pat. Nos. 6,320,176; 6,353,392; 6,313,454; 6,341,523; and 6,250,148; and/or in U.S. patent application Ser. No. 10/023,162, filed Dec. 17, 2001, now U.S. Pat. No. 6,516,664; and Ser. No. 10/348,514, filed Jan. 21, 2003, now U.S. Pat. No. 6,968,736, which are all hereby incorporated herein by reference), an image or vision system or sensor (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, which are hereby incorporated herein by reference), an intelligent headlamp controller (such as the type disclosed in U.S. Pat. No. 5,796,094 and/or in U.S. provisional applications, Ser. No. 60/420,560, filed Oct. 23, 2002; Ser. No. 60/398,346, filed Jul. 24, 2002; Ser. No. 60/381,314, filed May 17, 2002; Ser. No. 60/374,724, filed Apr. 23, 2002; Ser. No. 60/364,008, filed Mar. 14, 2002; and Ser. No. 60/350,965, filed Jan. 31, 2002, which are all hereby incorporated herein by reference), an intelligent lane departure warning system, such as the types described in U.S. provisional applications, Ser. No. 60/433,700, filed Dec. 16, 2002, and Ser. No. 60/377,524, filed May 3, 2002, which are hereby incorporated herein by reference, and/or the like. The image sensor may be implemented with any type of vehicle vision system or the like, such as a vision or imaging system utilizing principles disclosed in U.S. Pat. Nos. 6,396,397 and 6,201,642, and/or U.S. patent application Ser. No. 10/010,862, filed Dec. 6, 2001, now U.S. Pat. No. 6,757,109; and Ser. No. 09/199,907, filed Nov. 25, 1998, now U.S. Pat. No. 6,717,610, which are hereby incorporated herein by reference. As discussed above, the accessory module of the present invention may provide for positive perpendicular coupling of the base portion of the accessory module to the windshield to optically couple such sensors toward and against the windshield if desired.

Base portion 1011a of the illustrated embodiment of FIG. 27 further may include a short-range radio frequency (RF) transceiver 1064 for communication with other vehicle electronic or communication systems and may communicate to such systems via various protocols or nodes, such as Bluetooth, SCP, UBP, J1850, CAN J2284, Fire Wire 1394, MOST, LIN and/or the like, depending on the particular application of the accessory module of the present invention. The accessory module may be electronically integrated with the vehicle electrical and/or control systems. For example, the accessory module may connect to a sunroof control, rain sensor control, mass motion sensor, roof lighting control, microphone/cell phone control, climate control, or the like, without affecting the scope of the present invention.

As shown in FIG. 27, head portion 1011b may include a microphone or microphone array 1066 for receiving audio or voice signals from within the cabin of the vehicle. The microphone or microphone array may be part of a communication system, such as disclosed in U.S. Pat. Nos. 6,243,003 and 6,278,377, and in U.S. patent application Ser. No. 09/466,010, filed Dec. 17, 1999, now U.S. Pat. No. 6,420,975, which are hereby incorporated herein by reference. Preferably, as shown in FIG. 27, microphone 1066 is mounted or positioned at an underside of head portion 1011b, which shelters the microphone from direct moisture intrusion, such that the microphone or microphone array is sheltered from direct exposure to debris or rain or the like, such as when the accessory module is mounted in a convertible.

Head portion 1011b preferably includes a single circuit element 1052 (FIGS. 27 and 30), such as a printed circuit board (PCB) mounted at least partially within head portion 1011b. As shown in FIG. 30, printed circuit board 1052 may include a display element 1054 along or partially along an edge of the board and may include one or more user-actuatable controls or buttons 1056 near or adjacent to the display element 1054. The display element may be any type of display, such as a vacuum fluorescent (VF) display, a light emitting diode (LED) display, an electroluminescent (EL) display, a liquid crystal (LCD) display, a video screen display or the like, and may be for displaying various information (as discrete characters, icons or the like, or in a multi-pixel manner) to the driver of the vehicle, such as compass heading information, passenger side inflatable restraint (PSIR) information, tire pressure status, and/or the like. The buttons may be for actuating or controlling various accessories or controls or components associated with the vehicle, such as for a compass calibration setting or zone setting, a telematics actuation, a garage door opener device, an electronic toll control (such as disclosed in U.S. patent application Ser. No. 09/793,002, filed Feb. 26, 2001, now U.S. Pat. No. 6,690,268, which is hereby incorporated herein by reference), and/or the like, or may be for switching the display between various functions or modes, without affecting the scope of the present invention. The head portion 1011b may include appropriate openings along its face 1011d, such that the display element 1054 is visible through one opening, while the buttons or controls may partially protrude through other corresponding openings when an appropriate circuit board is installed within the head portion. This allows for the manufacturer of the printed circuit board to easily place the board in the head portion of the accessory module of the present invention.

As shown in FIG. 30, the printed circuit board 1052 may include other electronic components 1058, such as integrated circuits, resistors, capacitors, diodes and/or the like. The printed circuit board or element may also include one or more accessories, such as a compass sensor 1060 for a compass system of the vehicle, such as a compass system of the type disclosed in commonly assigned U.S. Pat. No. 5,255,442, and U.S. patent application Ser. No. 09/540,702, filed Mar. 31, 2000, now U.S. Pat. No. 6,513,252, which are hereby incorporated herein by reference. The compass sensor may be a magnetoresistive sensor, a magneto-capacitive sensor, a magneto-inductive sensor, or a flux-gate sensor or the like, without affecting the scope of the present invention. In this regard, it is preferable that the head portion is not user movable or adjustable by the driver or occupant of the vehicle when installed in the vehicle, so that the alignment of the compass sensor is predictable relative to the x and y axes of the vehicle and generally invariant over the driving use of the vehicle. The head portion may be set relative to the base portion at a generally fixed or preset angle, but preferably is a fixed mount that may not be adjustable by a user, such as a driver or occupant of the vehicle, in such an application. The head portion thus may be generally fixedly positioned at the or relative to the base portion when the accessory module is mounted at the vehicle, and thus may be non-adjustable by a driver or occupant of the vehicle during normal use of the vehicle and/or the accessory module.

Preferably, the accessory module of the present invention may include a network bus, such as a CAN bus or a LIN bus, such as disclosed in U.S. Pat. No. 6,291,905, which is hereby incorporated herein by reference. The network bus may be operable to communicate with other systems of the vehicle, such as with accessories or elements of the interior rearview mirror assembly.

Optionally, the interior rearview mirror assembly may include an electrochromic rearview mirror, preferably utilizing a solid polymer matrix electrochromic medium, such as described in U.S. Pat. No. 5,910,854, which is hereby incorporated herein by reference. The network bus of the accessory module may then be in communication with the reversing system of the vehicle, such that the accessory module knows when the vehicle is shifted into reverse. The bus may then be operable to communicate this to the electrochromic rearview mirror assembly to disable the electrochromic dimming of the mirror when the vehicle is in reverse, as is desired and known in the art. The accessory module of the present invention thus may provide for hard wiring between the printed circuit board within the accessory module and the rearview mirror assembly, and may thus eliminate the need for hard wiring the mirror to the reverse system of the vehicle. The mirror assembly may be hard wired to the bus or node of the accessory module, which is only a minimal distance, such as approximately three inches, and substantially less distance than wiring from the mirror to the reverse system. The present invention thus may provide for a node or bus in the head portion of the accessory module and may allow the interior rearview mirror assembly to be manufactured without a CAN bus or other type of network bus or node.

The interior rearview mirror assembly may include other accessories in addition to the accessories contained in or mounted to the accessory module. For example, the interior rearview mirror assembly may include lights, and may be a modular rearview mirror assembly, such as described in U.S. Pat. No. 6,124,886, which is hereby incorporated herein by reference, or may have various other accessories, such as disclosed in U.S. Pat. No. 6,222,460, which is hereby incorporated herein by reference.

The accessory module 1010 thus allows for a display and/or user actuated controls to be adjusted or canted to a desirable orientation with respect to the windshield and the driver of the vehicle. The interior rearview mirror may be pivoted or adjusted independent of the accessory module and may be separately detachable from the accessory module. The adjustable portion of the accessory module may be interchangeable with other portions, depending on the desired or selected options for the particular vehicle in which the accessory module is being installed. The selected adjustable head (or tail) portion may be mounted to a common base portion and adjusted to the desired orientation. The accessory module of the present invention thus allows for various accessories to be mounted within an accessory module which is mountable to the windshield of various vehicles. The adjustable nature of the head or tail portion relative to the generally fixed base portion allows the display or control functions to be optimally oriented with respect to the driver of the particular vehicle, and accounts for various angles of windshields and other design parameters of various vehicles, without requiring specific mounting components. Optionally, the accessory module may include a rechargeable battery pack, such as described above with respect to accessory module 10. The battery pack may be removable or detachable from the accessory module and may plug into a power outlet of the vehicle for recharging, or the portion of the accessory module that houses the battery pack, such as the head portion of the accessory module, may be detachable and may be plugged into a power outlet of the vehicle for recharging.

Figure 33:
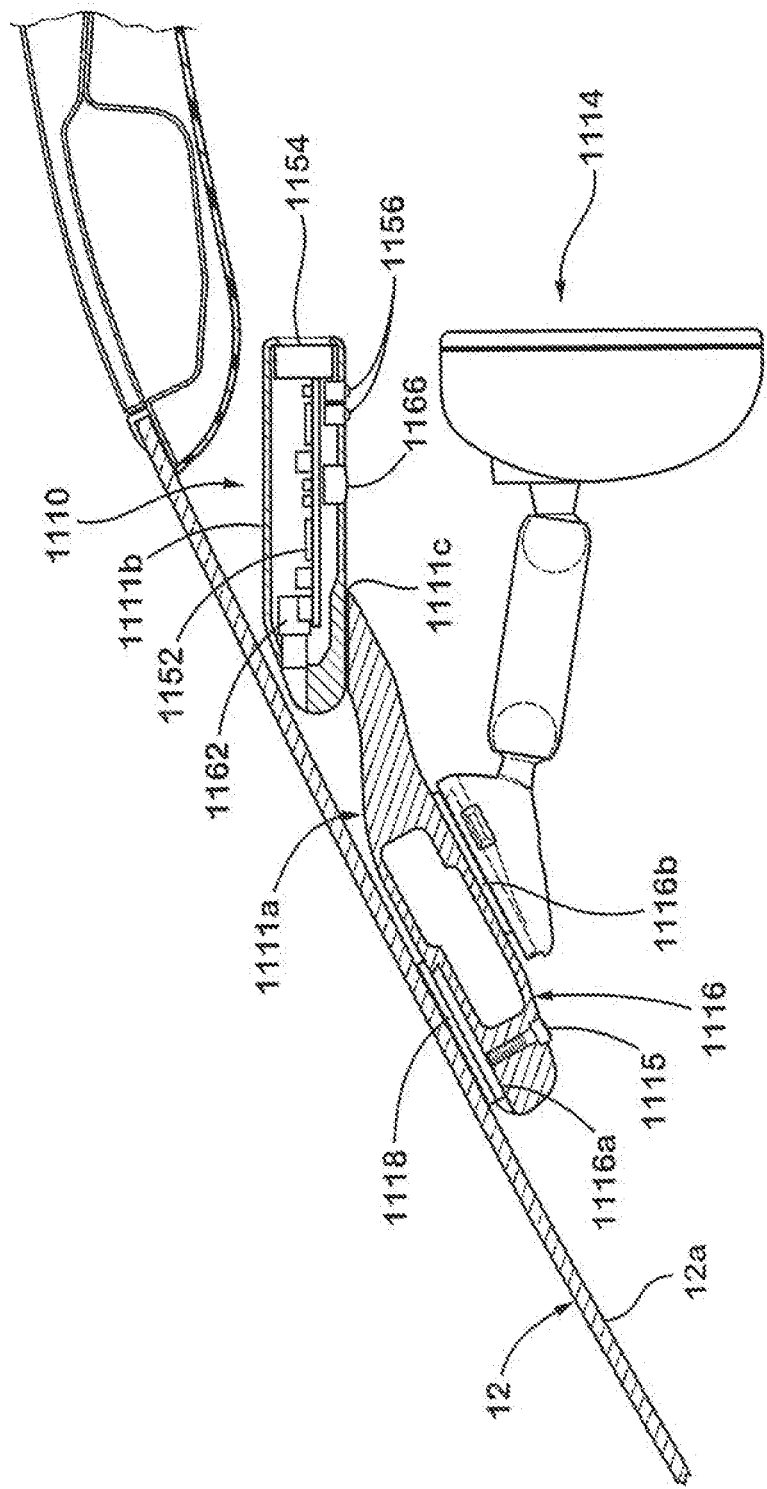
FIG. 33 is a side elevation of another accessory module in accordance with the present invention.
Figure 34:
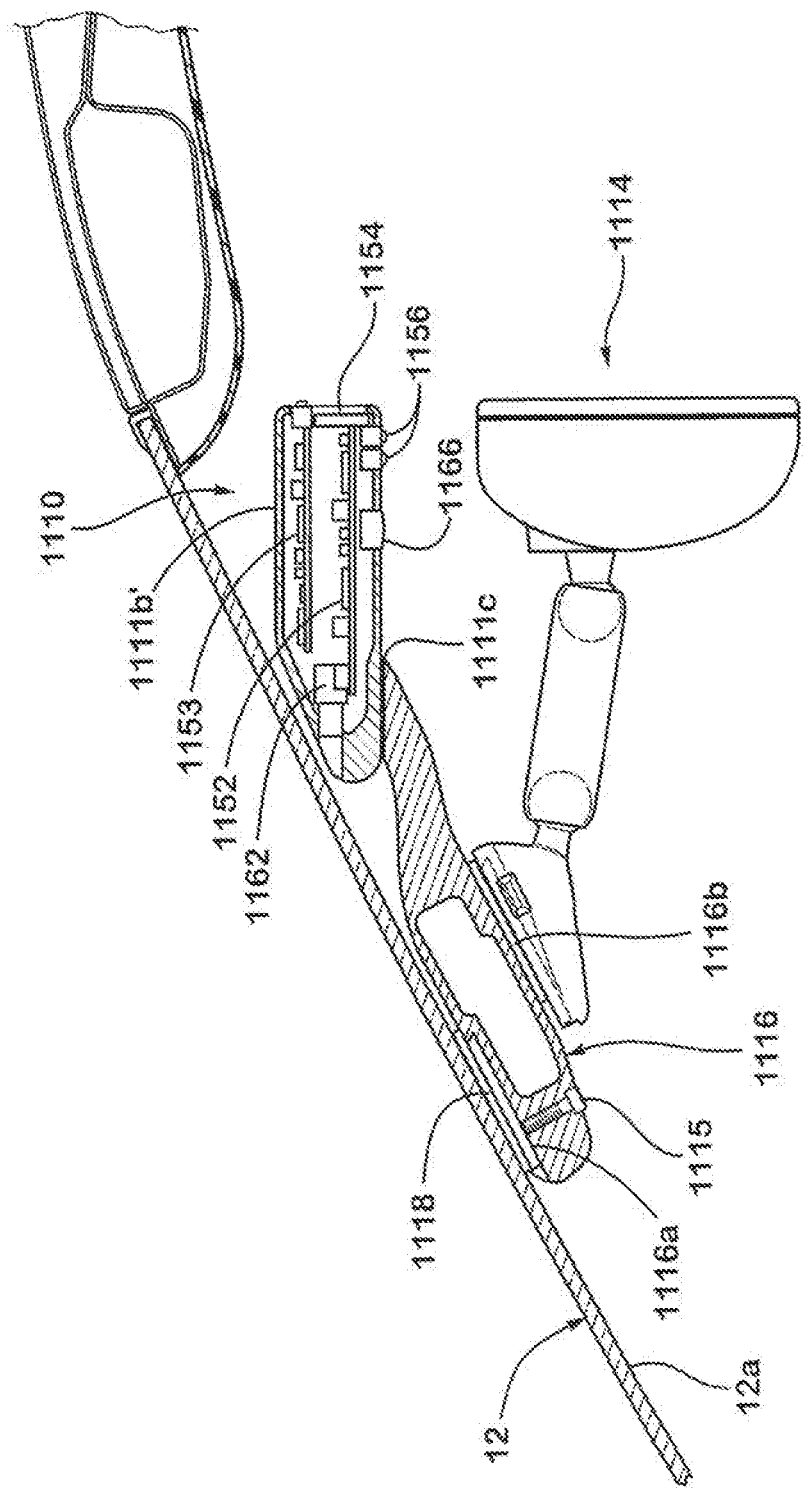
FIG. 34 is a side elevation of yet another accessory module in accordance with the present invention.

Referring now to FIGS. 33 and 34, an accessory module 1110 is mountable to a windshield mounted button 1118 at an interior surface 12a of a windshield 12 of a vehicle. Similar to accessory module 10, discussed above, accessory module 1110 includes a mounting extender 1116, which mounts to button 1118 via a mounting portion 1116a and includes a second mounting button or mirror attachment member or the like 1116b for mounting an interior rearview mirror assembly 1114 to accessory module 1110. As shown in FIGS. 33 and 34, the mounting buttons 1118, 1116b may be staggered, such that the mirror mounting button 1116b is positioned above the windshield button 1118. This allows for easy attachment or securement of extender 1116 and accessory module 1110 to windshield button 1118, such as via a fastener 1115, while maintaining access to the fastener after the interior rearview mirror assembly 1114 has been mounted to accessory module 1110. Fastener 1115 may then be driven generally straight through the accessory module and extender and into the windshield button 1118, without interference with the mirror mounting button 1116b, to secure accessory module 1110 to windshield button 1118.

As shown in FIG. 33, and as discussed above with respect to accessory module 1010, accessory module 1110 may include a lower body portion or stalk or stem portion 1111a and an upper or head portion or accessory housing 1111b mounted to an upper end of stalk portion 1111a. Head portion 1111b may be adjustably mounted to stalk portion 1111a at a joint 1111c (such that a driver of the vehicle may pivot or swivel the head portion to a desired angle toward the driver's head area) or may be generally fixedly secured to stalk portion 1111a, such as at a desired or preset angle toward the driver area. For example, the desired angle may be preset and selectable at the vehicle manufacturing plant. This allows the lower or stalk portion 1111a to be a common part for various applications of the accessory module, whereby a desired head or cap portion 1111b may be mounted to the stalk portion in accordance with the vehicle model or options selected for a particular vehicle.

Because it is desirable to provide generally flat circuitry for the electrical components of the mirror and/or accessory module, head portion 1111b may be adapted to receive a flat printed circuit board 1152 therewithin. It is also preferable to have the circuitry on a single or unitary circuit board, rather than two boards with wires connecting them. This avoids bending of the circuitry and may reduce or substantially avoid wires between the circuit board and the associated components. In the illustrated embodiment of FIG. 33, circuit board 1152 is directly connected to a display 1154, user actuable buttons 1156, a microphone 1166, and a forward facing camera or image sensor 1162, each of which is positioned at or within or partially within head portion 1111b of accessory module 1110 in the immediate vicinity of the flat circuit board 1152. However, a circuit board may be positioned in head portion 1111a and connected to other accessories or additional accessories, such as discussed above and/or below, without affecting the scope of the present invention.

As shown in FIG. 34, a different or optional head portion 1111b' may be provided on stalk portion 1111a of accessory module 1110. Head portion 1111b' is adapted to receive a second printed circuit board 1153 therewithin, which is associated with other components or circuitry of accessory module 1110 and/or interior rearview mirror assembly 1114. For example, circuit board 1153 may be directly connected to other user actuable buttons 1157 or the like at or within head portion 1111b'. Head portion 1111b' provides a double decker circuit board arrangement or double decker bus arrangement within the head portion. The different head portions 1111b, 1111b' may be selected depending on the particular application of the accessory module. For example, head portion 1111b may be selected and mounted to lower portion 1111a if the vehicle includes a compass option or the like, while head portion 1111b' may be selected and mounted to lower portion 1111a if additional or other options are associated with the vehicle at which the accessory module is mounted.

Referring now to FIGS. 35-57, alternate embodiments are shown of a mount extender or extension in accordance with the present invention which is adapted for mounting to a ring shaped mounting button or a mounting button, which is otherwise opened in the center region of the button. The ring-shaped buttons are suitable for applications where a rain sensor or other accessory may be included as part of the mounting extension, such that the accessory may be coupled to or loaded against the windshield as the mounting extension is pressed or mounted onto the button, or where an accessory may be part of the button or may be a separate component positioned within the button and against the windshield. For example, a rain sensor may be positioned at the center region of a generally ring-shaped or U-shaped windshield mounted button, such as disclosed in U.S. Pat. Nos. 6,250,148 and 6,341,523 and in U.S. patent application Ser. No. 10/023,162, filed Dec. 17, 2001, now U.S. Pat. No. 6,516,664; and Ser. No. 10/348,514, filed Jan. 21, 2003, now U.S. Pat. No. 6,968,736, which are all hereby incorporated herein by reference.

As shown in FIGS. 35A and 35B, a mounting button 1218 is generally ring-shaped or open, so as to allow an accessory, such as a rain sensor or the like (not shown), to be positioned at a central region of the mounting button 1218, and generally loaded or positioned against the windshield (not shown in FIGS. 35A and 35B). Mounting button 1218 is bonded or otherwise secured or affixed to the interior surface of the windshield, and includes a plurality or ridges or notches or teeth 1218a at two or more of the side walls 1218b of button 1218. In the illustrated embodiment, each of three side walls 1218b of button 1218 include teeth 1218a.

A mounting extension 1216 (FIG. 36) may include a second mirror mounting button 1216b at an outer end thereof. Similar to mounting extension 16, discussed above, the mirror mounting button 1216b may be a conventional shaped mounting button for mounting an interior rearview mirror assembly thereto. At least two of the side walls 1216c of mounting extension 1216 include a corresponding mounting tab or portion 1216a extending inwardly from a lower edge of the mounting extension.

The mounting extension 1216 may be secured to mounting button 1218 by aligning the mounting tabs 1216a with the corresponding notches or teeth 1218a of mounting button 1218 and pressing mounting extension 1216 generally perpendicularly toward the windshield. The teeth 1218a may include a tapered opening or passageway 1218c (FIG. 35B) to ease alignment of the tabs 1216a with teeth 1218a. The mounting tabs 1216a engage the teeth 1218a of button 1218 as mounting extension 1216 is pressed onto button 1218. The teeth 1218a of button 1218 are tapered, as can be seen in phantom in FIG. 35B, to allow for a ratcheting attachment of the mounting extension 1216, such that the rain sensor or other accessory 1238 may be generally perpendicularly loaded or pressed against and retained against the windshield. Additionally, a spring or biasing member 1238a may be provided at a cross member or support 1216d extending across mounting extension 1216 between opposite side walls 1216c of mounting extension 1216. The biasing member 1238a functions to push or bias the rain sensor into engagement with the windshield as the mounting extension is pressed into place on the button. Optionally, the accessory or rain sensor may be a component of the mounting extension 1216, such that the accessory is pressed into engagement with the windshield as the mounting extension is mounted to the button 1218. An outer housing or casing (not shown) of an accessory module may be mounted or secured to the mounting extension, as discussed above.

Figure 37B:
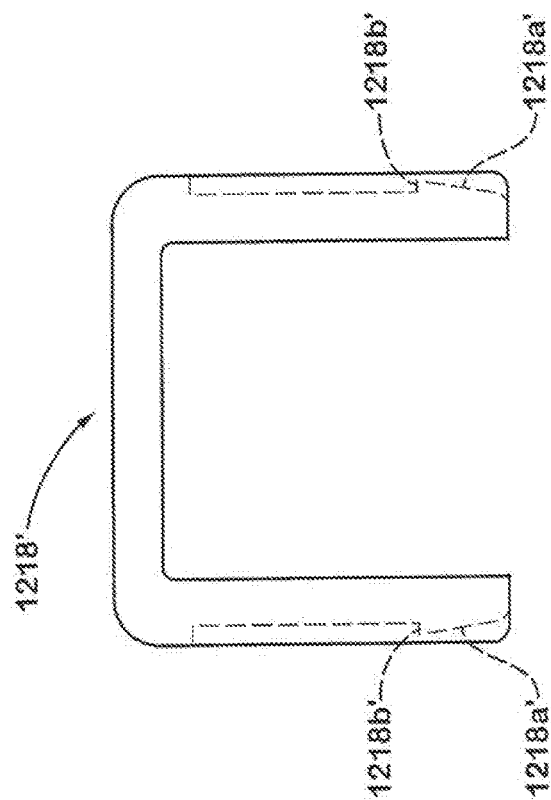
FIGS. 37A and 37B are a side view and a top view of another mounting button useful with an accessory module of the present invention.
Figure 37A:
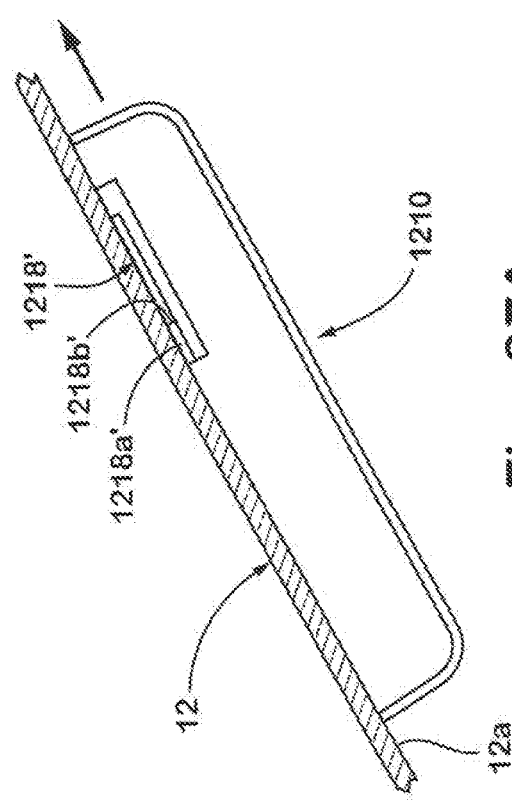

As shown in FIGS. 37A and 37B, a generally U-shaped mounting button 1218' is securable to an interior surface 12a of the windshield. Mounting button 1218' includes a tapered or ramped portion 1218a', which includes a stop surface 1218b'. Ramped portion 1218a' is positioned along and recessed within each side of button 1218'. An accessory module 1210 may be mounted to button 1218' by sliding the accessory module up and onto the button (the accessory module may include a mount extension of the types discussed herein which slides onto the button), over the ramped portion 1218a' and past the stop surface 1218b'. The stop surface 1218b' substantially precludes movement of the accessory module in the opposite direction, so as to retain the module on the button. Button 1218' has clearance for a rain sensor (not shown) to be positioned within the U-shaped button and not interfere with the sliding and mounting of the accessory module onto the button. The accessory module and/or mounting extension may be secured to button 1218' via a spring type attachment or the like. For example, the accessory module may include a spring (not shown) which flexes or deflects as it slides over the ramp 1218a' and flexes back after the spring passes the ramped portion 1218a'. The spring then engages the opposite facing stop surface 1218b' and thus provides resistance to movement in the opposite direction, so as to retain the module on the button 1218'. However, other mounting means may be implemented, such as set screws or the like securing the module to the button from one or both sides, without affecting the scope of the present invention.

Figure 38A:
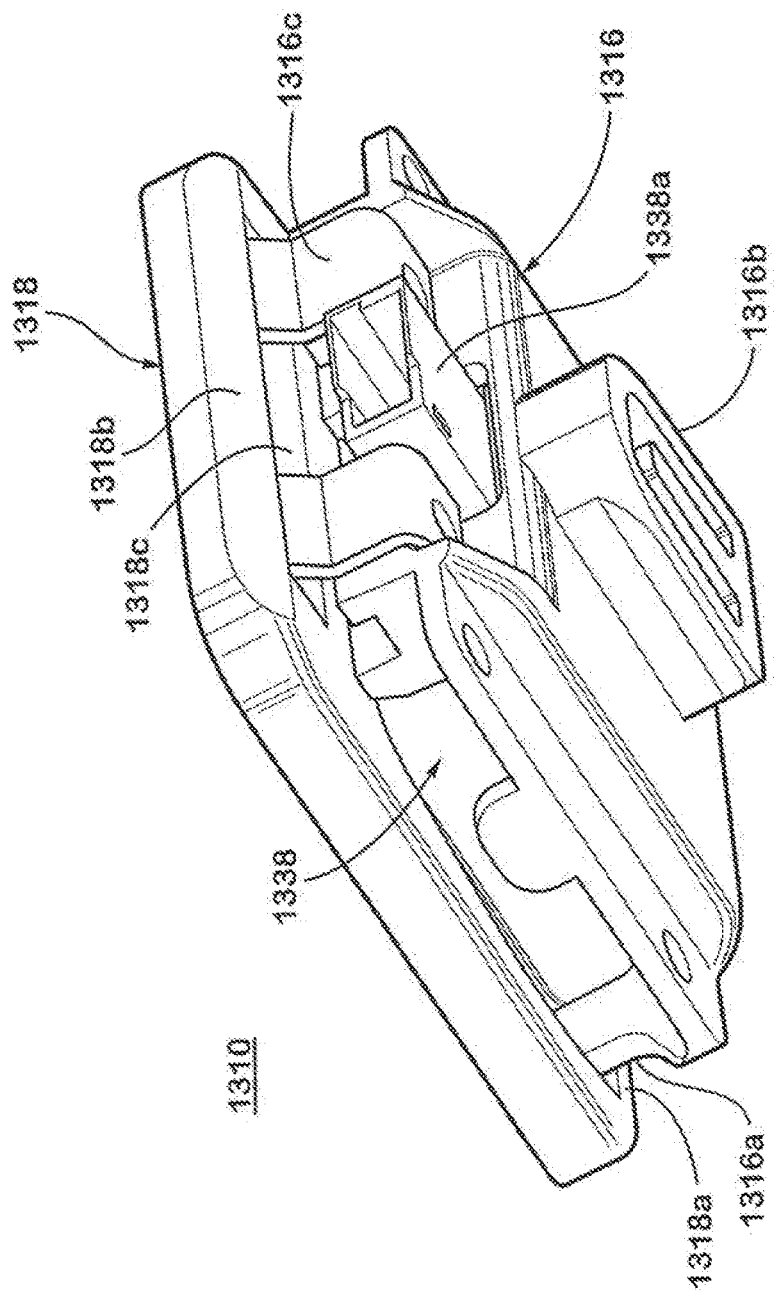
FIGS. 38A and 38B are perspective views of a mount extension and button of an accessory module in accordance with the present invention.
Figure 38B:
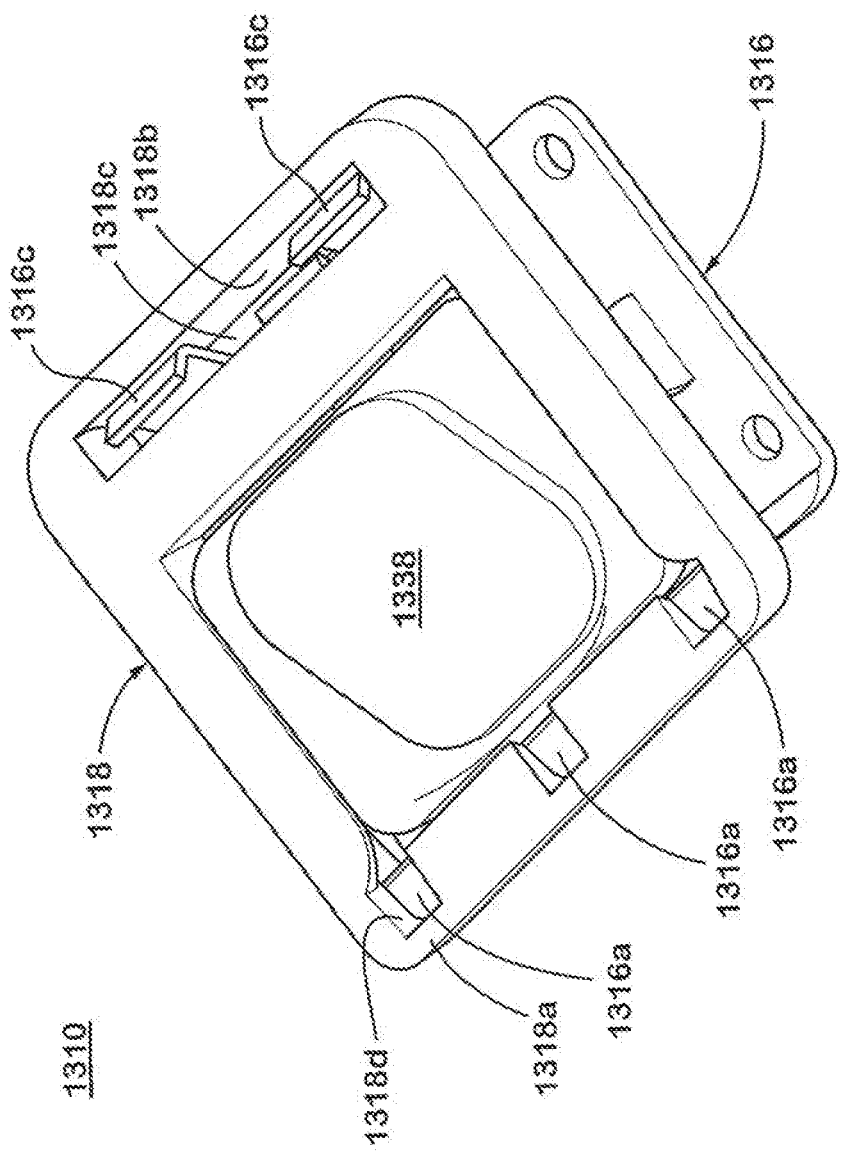
Figure 58A:
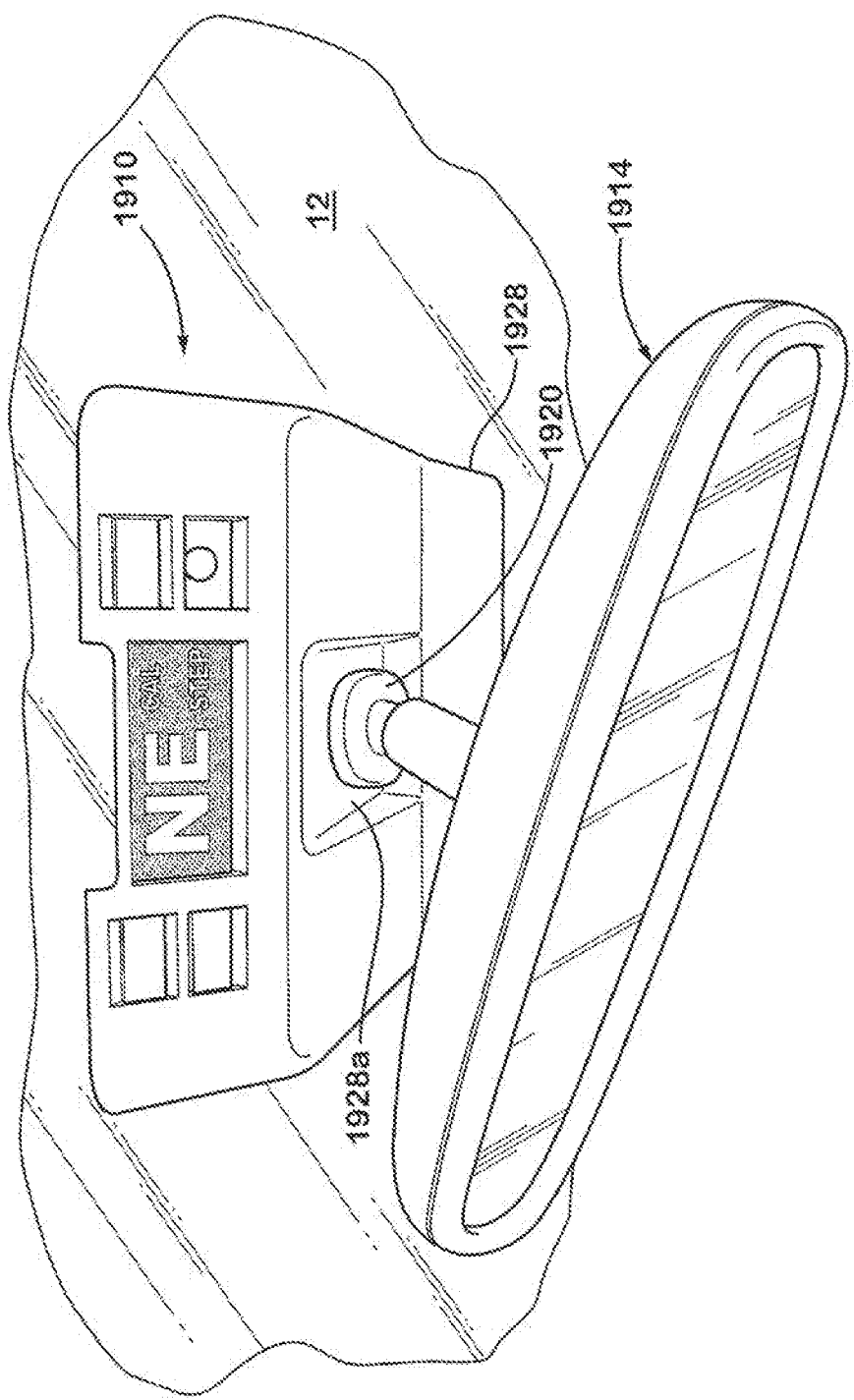
Figure 58B:
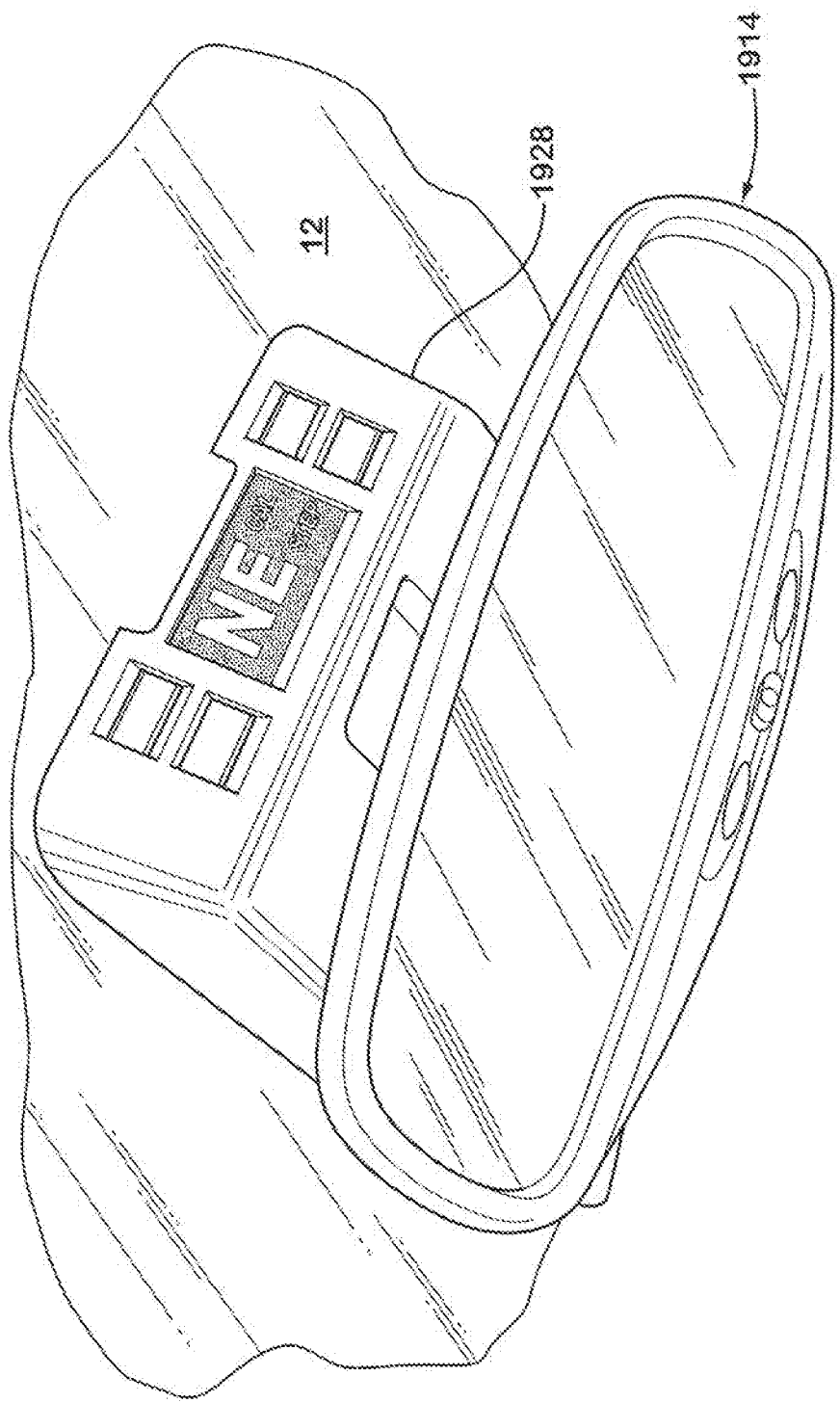
Figure 58D:
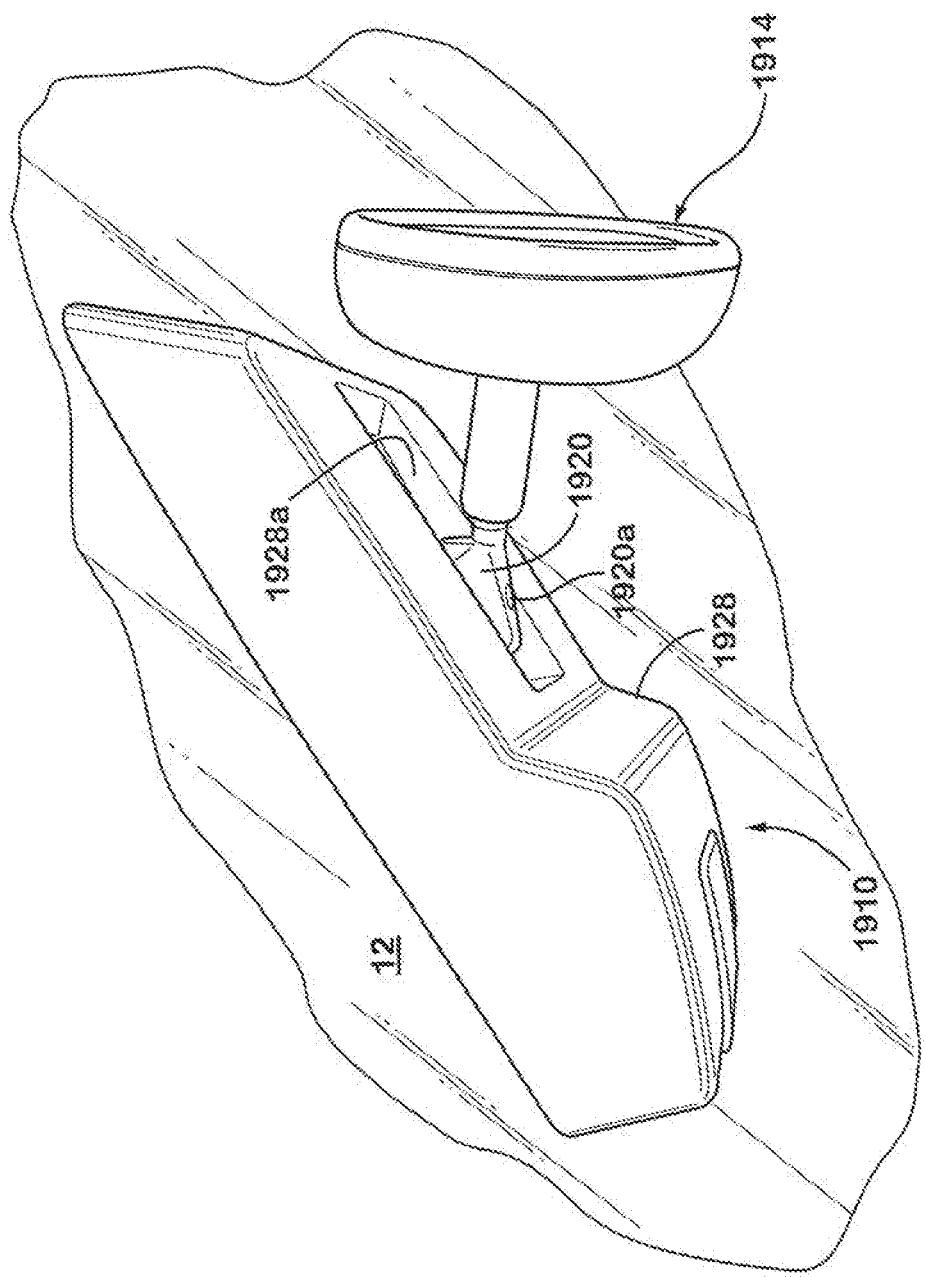
Figure 61A:
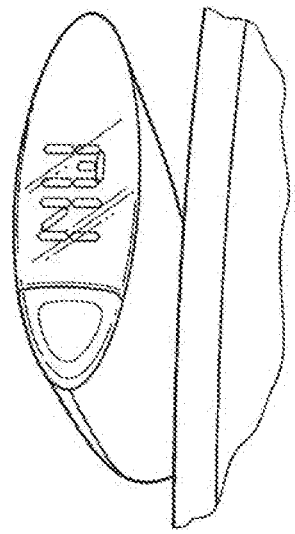
FIGS. 61A-I are perspective views of other embodiments of an accessory module in accordance with the present invention.
Figure 61B:
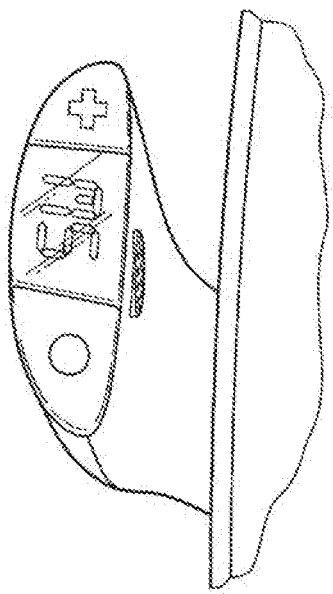
Figure 61C:
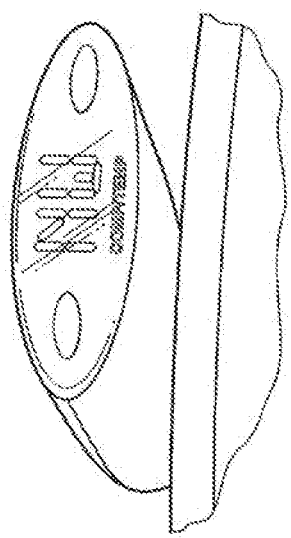
Figure 61D:
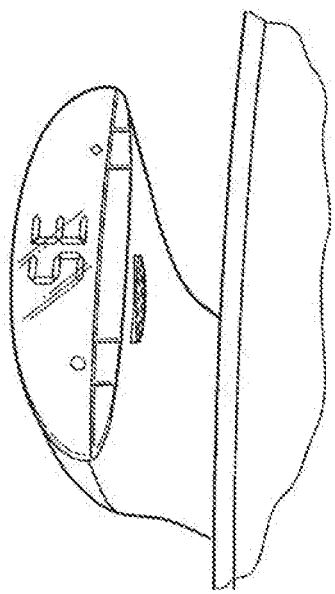
Figure 61E:
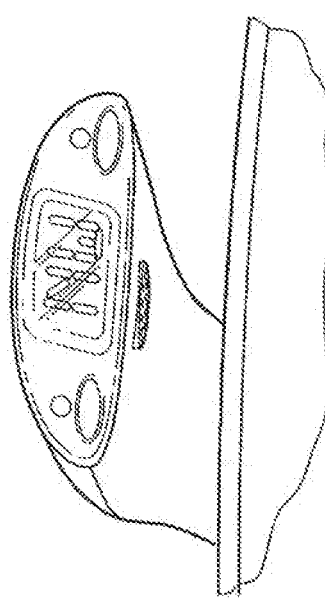
Figure 61F:
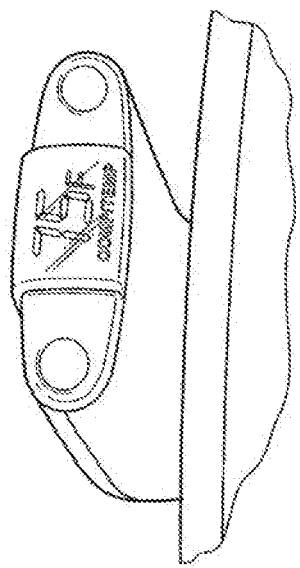
Figure 61G:
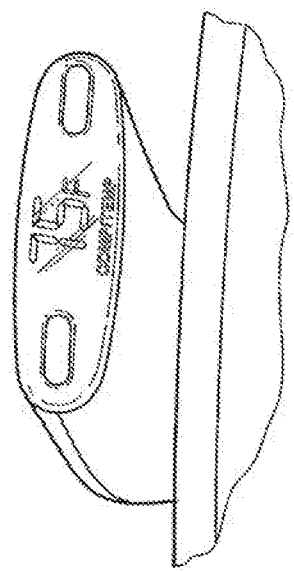
Figure 61I:
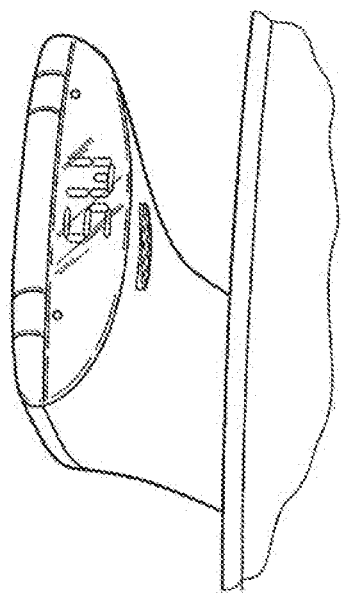
Figure 61H:
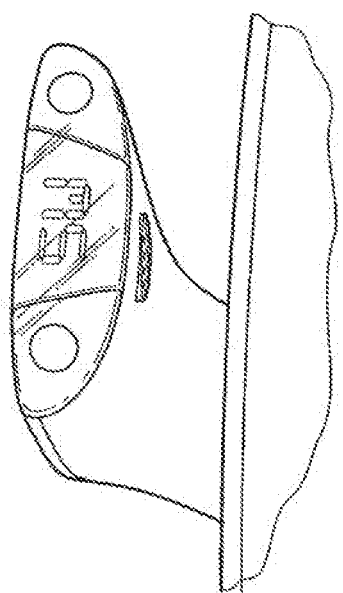

Referring now to FIGS. 38A-D, an accessory module 1310 includes an accessory 1338, such as a rain sensor or the like, and is mounted at an interior surface 12a of the windshield 12 of a vehicle. A generally ring-shaped mounting button 1318 is secured to the interior surface 12a of the windshield 12 and includes at least one lip or hook portion 1318a (FIGS. 38A and 38C) at one end of button 1318 and at least one tab or hook portion 1318b at the other end of button 1318. As can be seen in FIG. 38B, hook portion 1318a may be positioned along spaced apart openings or slots 1318d along the end of button 1318, while hook portion 1318b may be at a slot 1318c extending along the end of button 1318. The central region of button 1318 is generally open to receive accessory 1338 therein, such that accessory 1338 may be loaded against the windshield at the center region of button 1318.

Accessory module 1310 includes a mounting extension 1316 for mounting to button 1318. As best shown in FIG. 38B, mount extension 1316 includes a plurality of hooks or tabs 1316a at one end for engaging the hook portion 1318a of button 1318, and one or more springs or tabs 1316c at the other end for engaging hook portion 1318b of button 1318, in order to secure mount extension 1316 to button 1318. As shown in FIG. 38A, the springs 1316c may be spaced apart to provide clearance for a connector 1338a of accessory 1338 to pass therethrough to facilitate electrical connection of the accessory to the vehicle wiring. Similar to mount extension 16, discussed above, mount extension 1316 includes a mirror mounting button 1316b at an outer portion for mounting an interior rearview mirror assembly thereto. As shown in FIG. 38D, mount extension 1316 may include an accessory mounting or loading member 1316d, such as a strip of two sided adhesive foam or the like, to secure the accessory 1338 to mount extension 1316 and/or to load the accessory toward and against the windshield 12.

Mount extension 1316 is mounted to button 1318 via insertion of hooks 1316a into hook portion 1318a and then pressing mount extension 1316 toward button 1318 to engage springs 1316c with hook portion 1318b. The accessory 1338 may then be loaded and retained against the windshield by mount extension 1316. Accessory module 1310 further includes a cover or housing 1328 which is secured to mount extension 1316, such as via fasteners 1329 (FIG. 38D) or the like.

With reference to FIGS. 39A-41, another embodiment of the present invention includes a mounting button 1318', which may be generally ring-shaped and includes a raised tab or hook portion 1318a' along one wall and a pair of openings 1318c' defined within a pair of raised loops or rings 1318d' at or toward an opposite end of button 1318' from raised tab 1318a' (FIGS. 39A and 39B). A corresponding mounting button 1316' may include side walls and a mirror mounting button 1316b' (FIGS. 40A and 40B). A lip or extension or hook 1316a' may extend outwardly from a lower portion of one end or wall of mount extension 1316', while a pair of tabs or hooks 1316c', such as a stamped member or spring, may extend from each side of mount extension 1316'. Lip 1316a' may be inserted within raised tab 1318a' of button 1318 and then mounting extension 1316' may be pushed generally toward the button 1318' and windshield 12 to secure the mounting extension 1316' to the button 1318'. As shown in FIG. 41, as mounting extension 1316' is pressed onto button 1318', hooks 1316c' may flex outwardly as they slide over the raised rings or portions 1318d' around the openings 1318c', and then flex inward into engagement with the openings 1318c' in button 1318' to retain mounting extension 1316' to button 1318'. Although shown as having openings 1318c' and hooks 1316c' positioned along the side of the respective components, the openings and hooks may be positioned along an upper side or edge of the button 1318' and mount extension 1316', respectively, without affecting the scope of the present invention.

As shown in FIG. 40B, mounting extension 1316' may include one or more accessories 1338', such as a rain sensor or the like. The components of accessory 1338' may be positioned or clipped or snapped into the appropriate spaces or openings or recesses 1316d' in mounting extension 1316'. A housing or casing (not shown) of the accessory module may be provided around and secured to the mounting extension 1316', such as discussed above. Mount extension 1316' may further provide one or more fastening locations (not shown), such as threaded openings or the like, for receiving a fastener to secure the cover or housing of the accessory module thereon, such as discussed above with respect to accessory module 1310.

Referring now to FIGS. 42A-44, a ring-shaped mounting button 1418 (FIGS. 42A and 42B) may be secured to a windshield and includes a plurality of generally rigid raised tabs, hooks or extensions 1418a spaced around a perimeter wall 1418b of button 1418 (the hooks may be spaced or positioned at two or more of the sides of button 1418). The tabs 1418a may have a generally flat locking surface 1418a' for engaging and locking at a retaining spring 1419, as discussed below. A mounting extension 1416 includes a mirror mounting button 1416b and side walls 1416c (FIGS. 43A-C). Each of the side walls 1416c may include a retaining spring 1419 connected thereto, such as at a pair of openings or apertures 1416c' at opposite ends of each side wall 1416c. The springs are positioned generally along a lip or tab or hook 1416a of the respective side walls 1416c. As shown in FIG. 43C, the retaining springs 1419 may be curved or wave-shaped to allow for flexing of the spring at the desired regions as the spring engages the respective tab 1418a on the button 1418. As can be seen with reference to FIG. 44, as mounting extension 1416 is pressed onto and over tabs 1418a of button 1418, springs 1419 will flex as tabs 1418a engage the springs and will function to engage the locking surface 1418a' of tabs 1418a when mounting extension 1416 is pressed over the button 1418 and toward the windshield a sufficient amount. The tabs 1416a and 1418a and the spring 1419 function to limit or substantially preclude disconnection of the mounting extension 1416 from the button 1418 after the mounting extension 1416 has been mounted on button 1418 and loaded against the windshield.

As shown in FIGS. 45A and 45B, a mounting button 1518 useful with an accessory module of the present invention may be generally ring-shaped, as discussed above, and may provide multiple mounting portions or tabs or apertures 1518a for mounting to a correspondingly formed mounting portion of a mounting extension (not shown). Mounting button 1518 further includes a mirror mounting button 1517 extending from a portion thereof, such as extending upward from an upper wall 1518b of mounting button 1518. Mounting button 1518 may then receive or mount a mounting extension and associated housing of an accessory module at mounting portions 1518a, while receiving an interior rearview mirror assembly (not shown) at button 1517, such that the mirror assembly may be positioned generally above the accessory module.

Referring now to FIGS. 46A-48, a mounting extension 1616 mounts to a ring-shaped mounting button 1618 and is retained thereto via a retaining hook or retainer 1619 (FIG. 48). As shown in FIGS. 46A-C, mounting button 1618 includes side walls 1618c, which include a plurality of spaced apart, raised tabs or extensions 1618a extending upwardly or outwardly therefrom. Each of the tabs 1618a includes a generally flat locking surface 1618a'. Likewise, mounting extension 1616 includes opposite side walls 1616c with a plurality of spaced apart tabs or extensions 1616a extending downwardly or outwardly therefrom (FIGS. 47A and 47B). Each of the tabs 1616a also includes a generally flat locking surface 1616a'. Similar to mounting extension 16, mounting extension 1616 also includes a mirror mounting button 1616b for receiving an interior rearview mirror assembly at an outer end of mounting extension 1616 from the windshield of the vehicle.

Mounting tabs 1618a and 1616a are correspondingly spaced and alternating so as to align with the gaps between the other tabs 1616a and 1618a, respectively. As mounting extension 1616 is pressed toward mounting button 1618, the tabs align with the respective gaps and the mounting extension is moved toward the windshield until the flat locking surfaces 1618a' and 1616a' generally oppose one another and define a gap therebetween, as shown in FIG. 48. Retaining hook 1619, which may be a separate component or may be part of a housing or casing or cover of the accessory module associated with mounting extension 1616, may then be slid or snapped or otherwise positioned between the opposed surfaces 1618a', 1616a' to secure the mounting extension 1616 to the mounting button 1618. For example, retaining hook 1619 may be a generally continuous edge or lip of a cover or housing of the accessory module, and may snap or slide between all of the hooks or tabs on both sides of the button and the mounting extension. The cover may be a separate part or may be attached to the mounting extension, without affecting the scope of the present invention. As the mounting extension is pressed into place on the button, the retainer 1619 flexes outward as it engages the hooks of the button, and then snaps into place between the hooks once it clears the hooks of the button. As shown in FIG. 47A, mounting extension 1616 may also include openings or holes 1616e for receiving posts or the like from the cover or housing of the accessory module to secure the cover to the mounting extension.

Referring now to FIGS. 49A-51, a mounting extension 1716 (FIGS. 50A and 50B) mounts to a ring-shaped mounting button 1718 (FIGS. 49A and 49B) and is retained thereto via a retainer or plug 1719 (FIG. 51). As shown in FIGS. 49A and 49B, mounting button 1718 includes side walls 1718c, which include a plurality of raised rings or loops 1718b extending upwardly or outwardly therefrom. Each of the tabs 1718b defines an opening 1718a therethrough. Likewise, mounting extension 1716 includes opposite side walls 1716c with a plurality of openings 1716a therethrough (FIG. 50B). Similar to mounting extension 16, mounting extension 1716 also includes a mirror mounting button 1716b for receiving an interior rearview mirror assembly at an outer end of mounting extension 1716 from the windshield of the vehicle (FIGS. 50A and 50B).

Mounting openings 1718a and 1716a are correspondingly spaced so as to align with one another as mounting extension 1716 is positioned at mounting button 1718. When the openings are aligned with one another, retainer 1719 engages the openings to retain the mounting extension 1716 to mounting button 1718. As shown in FIG. 51, retainer 1719 includes a pair of opposite engaging portions or locking portions 1719a and a pair of springs or biasing members 1719b between the locking portions 1719a. Each of the locking portions 1719a includes a pair of locking extensions 1719c for inserting through the openings 1718a, 1716a to secure the mounting extension 1716 to the mounting button 1718. Retainer 1719 may further include a center extension 1719d which may be pushed inward to retract the locking extensions 1719c, in order to allow the locking extensions to be aligned with the openings 1718a of button 1718. The center extension 1719d may be pressed inwardly partially through a center hole or opening 1716d in side walls 1716c of mounting extension 1716, and then released when the openings 1716a, 1718a are aligned. Retainer 1719 may be slidably positioned within mounting extensions 1716 and biased in opposite outwardly directions, such that as mounting extension 1716 is placed at mounting button 1718, the locking extensions 1719c will slide outwardly through opening 1718a when the openings 1716a, 1718a are aligned and the center extension 1719d is released.

Referring to FIGS. 52A, 52B and 53, another ring-shaped mounting button 1818 may be secured to a windshield 12 for mounting a mounting extension 1816 of an accessory module 1810 thereto. Mounting button 1818 includes a raised lip or hook or projection 1818a extending from one wall 1818c of button 1818. A second button or fastening member or portion 1817 may be positioned on the windshield 12 and spaced from button 1818. Mounting extension 1816 includes a lip or extension 1816a extending therefrom for engagement with and within the raised lip or hook 1818a of mounting button 1818. The accessory module 1810 further includes a fastener portion 1819 having an opening or passageway 1819a therethrough, which is spaced from mounting extension 1816 but is fixedly secured or mechanically fastened to mounting extension 1816. For example, fastener portion 1819 may be part of a housing or casing (a portion of which is shown at 1828 in FIG. 53) of the accessory module 1810 which is mechanically fastened to the mounting extension, or may otherwise be generally rigidly connected to mounting extension 1816. As can be seen with reference to FIGS. 52B and 53, lip 1816a of mounting extension 1816 is inserted into the raised projection 1818a of mounting button 1818, such that fastener portion 1819 is generally aligned with second button 1817 at the windshield. A fastener (not shown) may then be driven through passageway 1819a and into second button 1817, which may have a threaded opening 1817a or the like.

Similarly, as shown in FIGS. 54A, 54B and 55, a second button or fastening portion 1817' may include a hook or lip 1817a' extending from the windshield 12. A fastener portion 1819' of an accessory module 1810' may then include a correspondingly formed lip or snap 1819a' which engages lip 1817a' as the accessory module and/or the mounting extension is pressed toward the windshield. As discussed above, fastener portion 1819' may be connected to or mechanically fastened to mount extension 1816, such as via a housing or casing 1828' of accessory module 1810'. The corresponding lip portions function to retain the mounting extension and the accessory module to the mounting button at the windshield.

Also, as shown in FIGS. 56A and 56B, mounting button 1818 may be mounted to the windshield 12 near a headliner 13 of a vehicle. As shown in FIG. 57, the vehicle may include a tab or mounting portion 1817", such as a tab protruding from the sheet metal 15 of the vehicle. An accessory module 1810" includes the mounting extension (not shown in FIGS. 56A, 56B and 57) and further includes a snap or tab 1819" extending therefrom for engagement with the tab 1817". As discussed above, the snap 1819" is mechanically fastened to the mounting extension. As the lip 1816a of mount extension 1816 is inserted into lip 1818a of button 1818, the tab 1819" may be inserted into the headliner 13 and into engagement with tab 1817" to secure the accessory module 1810" to the vehicle. The accessory module may thus hook onto the windshield button and then snap into the headliner of the vehicle. The housing or cover 1828" of the accessory module is preferably formed so as to substantially cover tab 1819" to enhance the appearance of the accessory module 1810".

Referring now to FIGS. 58A-D, another embodiment of an accessory module 1910 in accordance with the present invention is mountable at and loadable against an interior surface of a vehicle windshield, such as in a similar manner as discussed above with accessory module 10. Accessory module 1910 is substantially similar to accessory modules 10 and 910 discussed above, such that a detailed discussion of the features and characteristics of the accessory module will not be repeated herein. A housing 1928 of accessory module 1910 may include a recessed area 1928a around a mirror mounting member 1916b of a mount extension, in order to provide clearance for slidable engagement of a mirror mount 1920 onto mounting member or button 1916b of the mount extension. The recessed area 1928a allows the mirror mount 1920 of an interior rearview mirror assembly 1914 to be positioned within the recessed area, while allowing for slidable mounting of the mirror mount 1920 to the button 1916b. The mirror mount 1920 may be secured to button 1916b via a fastener 1920a or other fastening or securing means, without affecting the scope of the present invention.

Referring now to FIGS. 59, 60 and 61A-I, upper portions of various accessory modules or accessory module assemblies are shown. The upper portion or head portion or accessory housing may provide a compass display, a temperature display and/or other information displays or the like for viewing by a driver of the vehicle above the rearview mirror assembly. The upper portion may include user inputs, such as buttons for actuating a telematics system, a communication system and/or the like. The upper portion of the accessory module may further include a microphone at a lower region thereof. The accessory module may be otherwise substantially similar to the various embodiments of accessory modules discussed above, such that a detailed discussion of the accessory module will not be included herein. The accessory modules may receive an electrochromic mirror assembly, as shown in FIG. 59, or a prismatic mirror assembly, as shown in FIG. 60, without affecting the scope of the present invention.

The upper portion or head portion may include all of the electronic components or electronic circuitry necessary to provide the desired function of the upper portion, while the lower portion or base may be a common part to any of the accessory modules, such as those shown in FIGS. 59-61I, irrespective of the accessory or accessories housed in or associated with the respective head portions. The head portions may provide one or more accessories or functions, and may be swapped or switched to provide other accessories or functions to the respective base portion. For example, a head portion may provide a compass and/or temperature function, such as shown in FIGS. 61A-I, and/or may provide a telematics function (and may include a microphone), such as shown in FIGS. 61C-E, 61H and 61I, and/or may provide any other suitable or desirable accessory or function. A particular head portion, which may have the desired accessory or combination of accessories and associated controls or buttons, may thus be selected and mounted to a common base portion for mounting the desired accessory module to a vehicle having the corresponding options or features. As can be seen in FIGS. 59-61I, the head portion extends generally rearwardly from the mounting portion with respect to the vehicle and is viewable and/or user accessible generally above the rearview mirror when the accessory module assembly is mounted in the vehicle, but optionally may be at a side or below the mirror.

It is envisioned that in some vehicle button arrangements, the distance between the mounting button on the windshield and the headliner of the vehicle may not provide sufficient clearance to allow an accessory module of the present invention to align with the attachment member or mounting button during installation of the accessory module onto the button. The extender and/or accessory module must have enough clearance to slide down onto and into engagement with the button on the windshield. In situations where the distance between the button and the headliner is insufficient to provide clearance for the accessory module during installation of the accessory module (i.e., the top of the accessory module may interfere with the headliner as the accessory module is being installed on the mounting button or the windshield form may interfere with the accessory module above the mounting button, such that the accessory module or operator or worker at the vehicle assembly line may mark or damage the headliner or may foul or scratch the windshield as the operator at the assembly line mounts the accessory module to the mounting button), an articulatable accessory module of the present invention may be provided which includes a jointed portion or joint, hinge or pivot to allow for folding or bending of the accessory module.

For example, and with reference to FIGS. 62A, 62B and 63A-D, a foldable or articulatable accessory module or accessory module assembly or windshield electronics module or assembly 2010 (and/or the articulatable accessory module or windshield electronics module 2010' shown in FIG. 65) includes a mounting or base portion or lower extension 2011a and an articulatable or foldable head portion or accessory housing 2011b, which is pivotally or foldably mounted to mounting portion 2011a. Accessory module 2010, 2010' is adapted so head portion 2011b can fold down toward and may be stowed at or near or along mounting portion 2011a, such that the accessory module 2010, 2010' may be assembled on the windshield in the folded orientation and then unfolded to an unfolded orientation at the windshield of the vehicle, as discussed below. Mounting portion 2011a includes a mount (such as mount 2016a of mounting portion 2011a' in FIG. 64A) which is configured to slide over an attachment member, such as a button (also not shown), positioned at and/or affixed to a windshield of a vehicle, in a similar manner as described above. Mounting portion 2011a also provides an attachment member, such as button 2016b (FIGS. 63A-D), for receiving a mounting portion 2014a of an interior rearview mirror assembly 2014. Interior rearview mirror assembly 2014 may comprise any mirror assembly manufactured with a mount, such as, for example, a wedge type mount or any other mirror mount type, which is adapted for mounting to button 2016b of mounting portion 2011a. The mirror assembly 2014 may comprise one of a family of base prismatic mirror assemblies or base electrochromic mirror assemblies, since additional features typically added as part of a mirror assembly may be part of or housed in the accessory module 2010, 2010'.

Head portion or accessory housing 2011b may comprise an upper and lower cover which are sandwiched around a pivot or pivot axle or rods 2011d of a mount extension 2011a' (FIGS. 64A and 64B) which protrudes or extends from base portion 2011a. Also sandwiched inside the head portion are the electronics and circuitry which provide the desired functions and accessories to accessory module 2010, 2010'. Head portion 2011b may include one or more accessories and/or electronic circuitry for one or more accessories and/or a printed circuit board (not shown), such as described above. Head portion 2011*b* also may provide a display element or display 2054, such as a compass display, a temperature display and/or any other information or status display and/or the like, at an end of head portion 2011*b* which extends over and is viewable above the mirror reflective element 2014*b* and casing 2014*c*, as can be seen in FIGS. 62A and 62B. Display 2054 may include a display lens, buttons or other user input devices and/or a combination of a display lens and buttons depending on the particular display function and application of accessory module 2010, 2010'. The head portion 2011*b* may also provide user interface controls or buttons and/or accessories (not shown), such as described above.

The two cover pieces of head portion 2011*b* may be molded out of a polymeric resin, such as an ABS, a glass filled Nylon or some other engineering grade plastic or the like which may be suited to the desired application by providing or achieving the desired rigidity, appearance, moldability, cost and/or the like. The display lens may comprise an acrylic material or a polycarbonate material or other suitable light transmitting polymeric material or the like which provides the desired optical properties and resistance to scratches. The buttons may comprise an engineering grade plastic and/or a resilient/elastomeric plastic, such as silicone or the like, or an elastomeric thermoplastic, such as Santoprene® or the like, depending on the particular application and the desired appearance, wear, backlighting, cost and/or the like.

Lower extension or base portion 2011*a* may comprise an upper and lower cover sandwiched around mount extension 2011*a*' which includes pivot axle 2011*d* that protrudes out of the cover pieces to provide the rotational pivot for the head portion 2011*b*. The mount extension 2011*a*' provides the ability of mounting onto a conventional mirror mounting button or attachment member on the windshield, such as a wedge style button or the like on the windshield, while also providing a secondary mirror mounting button or attachment member that a conventional channel mount of a rearview mirror assembly may mate to. The mount extension 2011*a*' may comprise a die cast piece, such as comprising aluminum or other metallic material or the like, depending on which best meets the desired rigidity and cost criterion of the extension. The two cover pieces may be molded out of a polymeric resin, such as an ABS, a glass filled Nylon or some other engineering grade plastic or the like which may be suitable for the application of accessory module 2010, 2010'.

The lower extension or base portion 2011*a* of accessory module 2010, 2010' may be assembled by locating the mount extension 2011*a*' onto posts or the like molded in the upper cover of the base portion. The upper cover may include snap features along a perimeter of the cover and the lower cover may have mating snap features along a perimeter, such that the upper cover may snap to the lower cover around the mount extension. The base portion may include anti-vibration/anti-rattle elements. For example, either or both covers may have crush ribs molded into them that may allow the covers to hold tightly to the mount extension to substantially preclude a rattle condition and also to take up any tolerance difference from part to part.

The head portion may be assembled by snapping the lower cover onto the mount extension. The printed circuit board (PCB) may be located onto posts or the like that may be molded in the lower cover of the head. The display lens or buttons may be slid into a groove that is molded into the lower cover. The upper cover may snap onto or otherwise secure to the lower cover. The head portion may include anti-vibration/anti-rattle elements. For example, either or both covers may have crush ribs molded into them that may allow the covers to hold tightly to the printed circuit board and display lens to substantially preclude a rattle condition and also to take up any tolerance difference from part to part.

When assembled together, head portion 2011*b* is pivotally mounted to base portion 2011*a*, such as at an upper end of base portion 2011*a*. Pivot axle 2011*d* of mount extension 2011*a*' has two rod shapes that come out of the top of the mount extension and may be snapped into corresponding cylindrical sockets (not shown) in the lower cover of the head portion as the head portion is attached to the base portion. Head portion 2011*b* thus may be pivotably attached to pivot axle or rods 2011*d* of mount extension 2011*a*' of base portion 2011*a*, and may be generally fixedly retained in one or more desired orientations relative to base portion 2011*a*, such as via a knob or bump on one of the components (such as the knob or bump 2011*f* on mount extension 2011*a*' in FIGS. 64A and 64B) sliding in a groove (not shown) until it engages a divot (also not shown) in the other component to lock the head portion in place relative to the base portion. For example, the groove and the divot may be features that are molded into the lower cover of the head portion, and may be located around a pivot point defined at the cylindrical socket or sockets that are also molded into the lower cover of the head portion for receiving the pivot axle or rods 2011*d*. The knob or raised bump 2011*f* or the like may be provided next to each of the rods 2011*d* of mount extension 2011*a*' such that when the lower cover of the head portion is assembled to the mount extension 2011*a*', the knobs 2011*f* may slide in the corresponding grooves as the head portion is rotated about the pivot axle until the knobs lock in place in the divots to secure the head portion in a desired orientation relative to the base portion.

Figure 63B:
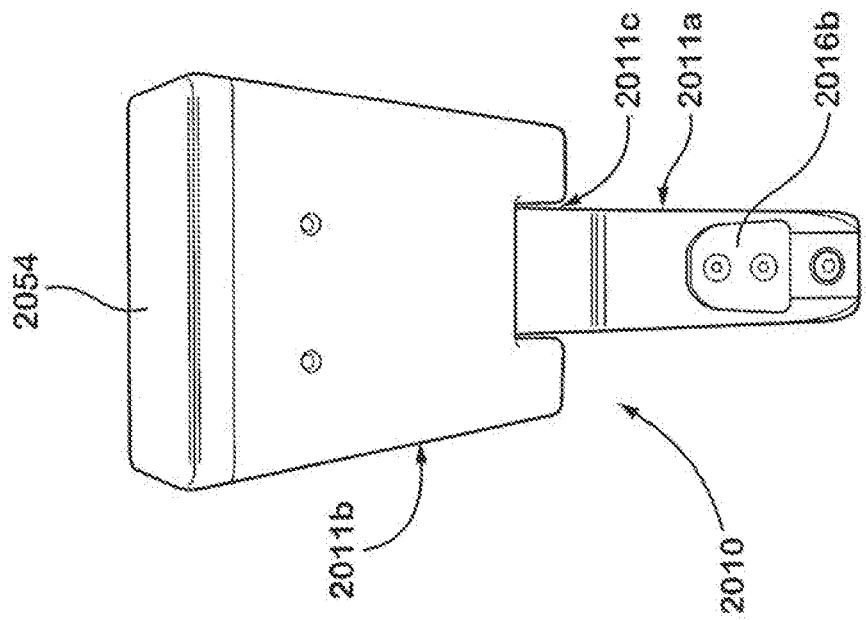
Figure 63A:
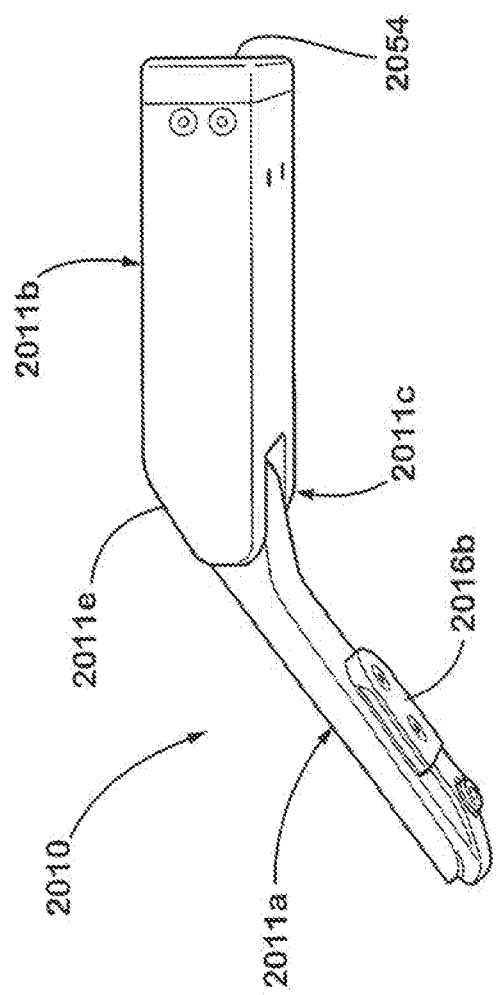
Figure 67A:
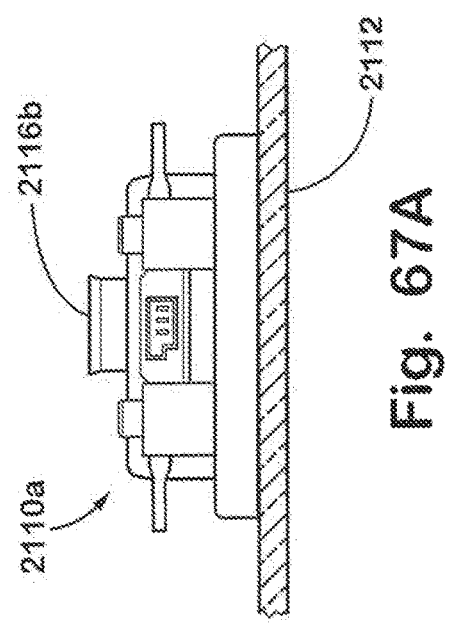

In order to provide clearance to the headliner of the vehicle during the installation of the accessory module 2010, 2010' to the attachment member or mounting button, head portion 2011*b* may fold down toward mounting portion 2011*a* to an installation or mounting or folded position or orientation (FIGS. 63C and 63D), such that head portion 2011*b* will not interfere with the headliner while mounting portion 2011*a* is slid down along and over the mounting button on the vehicle windshield. Head portion 2011*b* is mounted to mounting portion 2011*a* at a pivot joint 2011*c*, such as defined by pivot axle or rods 2011*d* and the corresponding sockets, and is foldable or articulatable between the installation or mounting or folded orientation or position and an installed or in-use or non-folded orientation or position (FIGS. 62A, 62B, 63A, 63B and 65). When in the folded orientation, head portion 2011*b* is positioned generally along the mounting portion, such as shown in FIGS. 63C and 63D. Pivot joint 2011*c* may comprise a spring-loaded pivot joint or the like, which may have a biasing element or biasing member or spring or the like, and which may be biased toward the installed position to substantially secure or retain the head portion 2011*b* in the installed or non-folded position after the accessory module is mounted to the windshield mounting button or the like. Optionally, the pivot joint 2011*c* may provide detents or stops to retain the head portion 2011*b* in one of the positions relative to mounting portion 2011*a*. As shown in FIGS. 64A and 64B, a mounting portion 2011*a*' may provide a pivot axle or bar 2011*d*, which may be pivotally received in a corresponding clasp or groove (not shown) of the head portion. The base and head portions 2011*a*, 2011*b* of accessory module 2010, 2010' may comprise plastic material, such as engineering plastics or the like, or may be die cast components, which may be covered with a cosmetic plastic cover and/or may be decorated, such as by being painted or by use of a decorative film appliqué or tape of the like, without affecting the scope of the present invention.

The articulatable accessory module 2010, 2010' thus may fold or articulate between a mounting or folded orientation or position, which facilitates mounting of the accessory module assembly to the mounting member or button on the windshield by reducing or obviating mechanical interference between the head portion and the roof structure, such as at the joint between the vehicle windshield and the roof area, such as at the headliner area, and an in-use or non-folded orientation or position, where the accessory module is unfolded after mounting to the mounting member or button on the windshield, in order for the accessory to be usable/viewable by the driver or occupant of the vehicle during normal use in the vehicle. Such folding/articulation may include a breakaway capability, whereby should the mirror head be impacted, such as in an accident, the mirror head would move and/or break away to reduce potential injuries.

The windshield manufacturer at the windshield manufacturing site or facility may place or adhere or bond or otherwise secure a mounting member or mounting button on an interior surface of a windshield and toward the upper portion of the windshield in a conventional manner, and may ship the windshield (with the mounting button attached thereto) to a vehicle or automobile assembly plant where the windshield and other components of a vehicle are assembled to a vehicle or automobile as the vehicle moves along the vehicle assembly line. The accessory module may be supplied or provided to the vehicle assembly plant from an accessory module supply or assembly site or facility with a corresponding mirror assembly already attached or mounted thereto, or the mirror assembly may be supplied from a mirror assembly or supply site or facility and may be mounted or attached to the accessory module at the vehicle assembly plant, without affecting the scope of the present invention. As the vehicle proceeds along the assembly line, with the windshield (and button) installed thereon, an operator may mount an appropriate accessory module and rearview mirror assembly to the mounting button.

In some vehicles, there may be insufficient clearance between the mounting button and the headliner or header or roof of the vehicle to facilitate non-interference mounting of an accessory module, whereby a non-folded accessory module may interfere with the headliner or the accessory module. Also, in some vehicles, regardless of whether there is sufficient clearance between the mounting button and the headliner, the curvature or shape of the windshield may hinder or limit attachment of an accessory module onto the mounting button, whereby an accessory module or the operator may foul or scratch or otherwise mark the windshield above the mounting button during the installation process. However, the articulatable accessory module of the present invention avoids such interferences by providing an articulatable head portion which folds down for installation of the accessory module onto the mounting button. The operator thus may mount the articulatable accessory module to the mounting button while the accessory module is in its folded orientation (which reduces the space required to install the accessory module and thus avoids interference with the headliner and/or the windshield during the installation process), and then may unfold the accessory module to its non-folded orientation after the accessory module is mounted to the mounting button on the windshield.

During the installation process of attaching accessory module 2010, 2010' to the windshield of a vehicle, head portion 2011*b* may be articulated or folded down relative to mounting portion 2011*a* to the installation position or orientation, where the head portion may be positioned generally along the mounting portion. The head portion 2011*b* may be held in this position by an operator installing the accessory module 2010, 2010' or may be retained in this position by a detent or other locking device or retainer. Mounting portion 2011*a* is then positioned at the windshield and above the attachment member or mounting button to align the mount of mounting portion 2011*a* with the attachment member or mounting button. Because head portion 2011*b* is folded down toward or generally along or over mounting portion 2011*a* (as shown in FIGS. 63C and 63D), head portion 2011*b* is lowered to provide additional clearance between the accessory module 2010, 2010' and the headliner of the vehicle and/or the windshield itself during the installation process. Mounting portion 2011*a* is then slid down along and onto or over the attachment member or mounting button and secured thereto in a similar manner as discussed above. The folded down position also may allow a vehicle harness to be connected to the accessory module without obstruction or the need for secondary covers or the like.

After mounting portion 2011*a* is secured to the attachment member, such as a mounting button, of the windshield, and after the wire or wire harness (if applicable) is connected to the vehicle wire harness or accessory module, the head portion 2011*b* may be unfolded or moved to its installed or in-use position, as shown in FIGS. 62A, 62B, 63A, 63B and 65. The head portion 2011*b* may be manually moved to its in-use position by the operator (such as by pushing the head portion to overcome the detents or the like or by releasing a locking device or retainer or the like), or may automatically unfold or move to its in-use position upon release of the head portion by the operator (such as by a spring loaded or biased pivot joint or the like). When raised or moved to the in-use or installed position, the operator (i.e., the worker at the vehicle assembly line) or the spring or biasing member may urge the head portion toward the windshield to a preferred position or orientation with respect to the particular vehicle at which the accessory module is mounted, so that, for example, the head portion extends generally rearwardly and is generally horizontal and the buttons or display or the like of the head portion are facing generally rearward with respect to the vehicle. Optionally, a stiffening member 2017 (FIG. 64C) may be provided along base or mounting portion 2011*a* and/or head portion 2011*b* to support and retain or substantially lock the head portion in its installed and in-use position.

For example, during assembly of a vehicle at a vehicle assembly plant, a windshield (with a mounting attachment or button or the like affixed or mounted thereto) may be supplied or provided at the vehicle assembly plant and installed at a vehicle at an assembly line. An operator may install the articulatable accessory module assembly of the present invention by folding the accessory module to its folded orientation and sliding or otherwise moving or positioning or mounting the mounting portion of the accessory module onto the mounting attachment at the windshield. The operator (or a retaining device, such as a detent, band or clip or the like) may retain the accessory module in its folded orientation during the mounting process. The operator (or another operator or a spring or biasing element or the like) may then unfold or pivot or urge the accessory module to its non-folded orientation after the accessory module is mounted to the mounting attachment. The operator may install the accessory module to the mounting attachment with the mirror assembly already mounted to the accessory module (where the accessory module and mirror assembly may be provided as an assembled unit or where the operator first mounts the mirror assembly to the mounting attachment of the accessory module before mounting the accessory module (with the mirror assembly mounted thereto) to the mounting attachment at the windshield), or the accessory module may be mounted to the mounting attachment at the windshield separate from the mirror assembly (where the operator or another operator along the assembly line mounts the mirror assembly to the accessory module after the accessory module has been mounted to the mounting attachment at the windshield and preferably after the accessory module is unfolded to its non-folded orientation). Optionally, and preferably before the accessory module is unfolded to its non-folded orientation, an operator may complete an electrical connection between the accessory module and the vehicle wiring, such as by connecting a wire or wire harness of the accessory module to a corresponding wire or socket or the like of the vehicle, or by connecting a wire or wire harness of the vehicle to the accessory module, or by contacting one or more electrical contacts at the vehicle, such as at the windshield, mounting attachment or headliner of the vehicle, with one or more corresponding electrical contacts of the accessory module.

As best shown in FIG. 65, head portion 2011b may be pivotable or articulatable about a pivot axis which comprises a generally horizontal pivot axis when the base portion 2011a is mounted to the mounting button on the windshield. The base portion 2011a extends generally upward from the mounting button when attached thereto and may extend generally along the windshield. The head portion 2011b extends generally rearwardly with respect to the vehicle and may extend generally horizontally from an upper portion or upper end portion of the base portion when the base portion is mounted to the mounting button on the windshield and the head portion is in the non-folded or in-use orientation or position. The head portion 2011b and/or the display region of the head portion is then viewable and/or user accessible generally above the mirror assembly when the mirror assembly is mounted to the base portion 2011a.

Optionally, it is further envisioned that head portion 2011b may include a camera-based accessory (not shown), such as a rain sensor or the like, at a forward end 2011e of head portion 2011b, such that unfolding of head portion 2011b from mounting portion 2011a moves the accessory toward the windshield. In the movement of the head portion 2011b toward the in-use position, the head portion may urge the accessory or rain sensor into contact with the interior surface of the windshield and preferably into optical contact with the windshield so that the accessory or rain sensor is optically coupled with the windshield.

After the accessory module 2010, 2010' is installed and head portion 2011b is moved to its installed position, the interior rearview mirror assembly 2014 may be mounted and secured to the mirror attachment member or attachment button 2016b in a similar manner as discussed above. As shown in FIGS. 62A and 62B, head portion 2011b extends over the reflective element 2014b and casing 2014c of the interior rearview mirror assembly 2014 so as to be viewable by the driver of the vehicle. The head portion 2011b may be configured to provide optimal viewing of the display 2054 by the driver and/or may be adjustable by the driver to adjust the angle of the display with respect to the driver (such as described above with respect to accessory module 1010) when the head portion is in the installed position.

If an electrochromic (EC) mirror assembly or lighted mirror assembly or other type of prismatic or electrochromic mirror assembly requiring electrical connection is to be assembled to the accessory module, the printed circuit board that is assembled in the head portion may have a harness or wire 2080 (FIG. 65) that is routed between the covers and out of a hole in the accessory module, such as a hole located on the passenger side parting line of the accessory module (not shown in FIG. 65). The harness may have a connector or plug 2080a, which may be connected to or plugged into the mirror assembly, such as into a socket or outlet 2082 provided at a rear portion of the casing 2024 of the mirror assembly 2014, to provide the power and/or controls needed for the mirror assembly and/or accessories or components thereof to function. The harness may be routed along or through a mounting arm 2022 of the mirror assembly 2014 between the accessory module and the rear of the mirror casing 2024 of the rearview mirror assembly. As shown in FIG. 65, accessory module 2010' may include a wire cover 2084 extending upward from head portion 2011b generally along the windshield 12 and toward the headliner of the vehicle for routing a wire or wire harness 2086 along and through the wire cover between the accessory module and the headliner of the vehicle to provide electrical connection between the accessory module and a vehicle wiring harness in or at the headliner or roof portion of the vehicle.

Accordingly, the head portion of the accessory module assembly of the present invention may be foldably mounted to the mounting or base portion to ease installation of the accessory module to an attachment member or mounting button at a windshield of a vehicle. The pivot joint may be positioned generally above the location of the mounting portion of the extender on the module, such that pivoting, folding, articulating or bending of the module at the pivot joint decreases the effective length or height of the accessory module above the mounting portion, in order to provide additional clearance between the uppermost portion of the accessory module and the headliner of the vehicle during installation of the accessory module. The accessory module may be provided to the vehicle assembly plant in a folded over orientation to facilitate assembly or installation of the accessory module onto the mounting button. After the accessory module is mounted to the mounting button, the accessory module may be unfolded or straightened out to its unfolded orientation. The accessory module may be spring loaded to ease the unfolding process after the accessory module is mounted to the button. The accessory module may then be unfolded and may snap or otherwise lock or secure in the unfolded orientation to substantially preclude folding or bending of the accessory module after installation of the accessory module to the mounting button on the windshield of the vehicle. Although shown as being unfolded to be positioned generally above the rearview mirror assembly when the rearview mirror assembly is mounted to the accessory module assembly, it is envisioned that the accessory module or accessory module assembly of the present invention may also or otherwise extend sidewardly or downwardly to be viewable and/or accessible at one or both sides of the rearview mirror assembly or generally below the rearview mirror assembly.

Figure 66B:
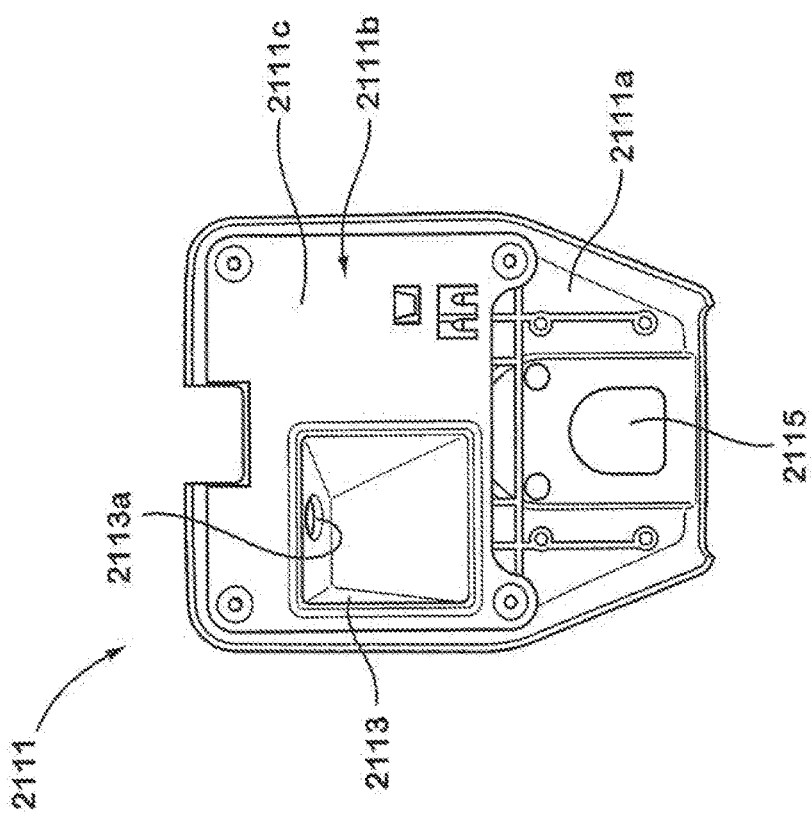
FIGS. 66A-C are plan views of an accessory housing for an accessory module in accordance with the present invention.
Figure 66A:
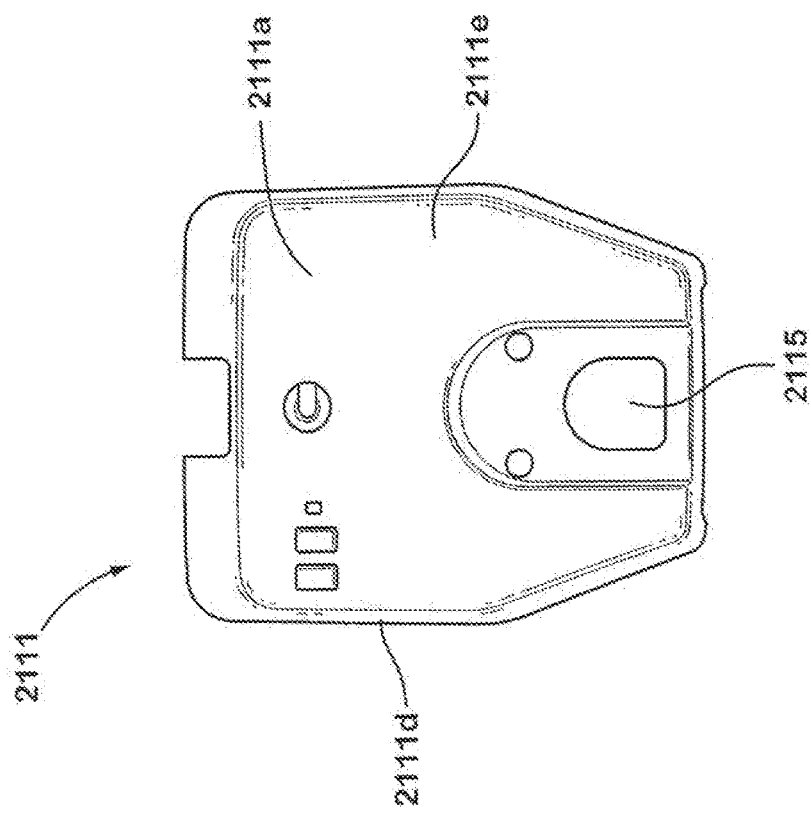
Figure 66C:
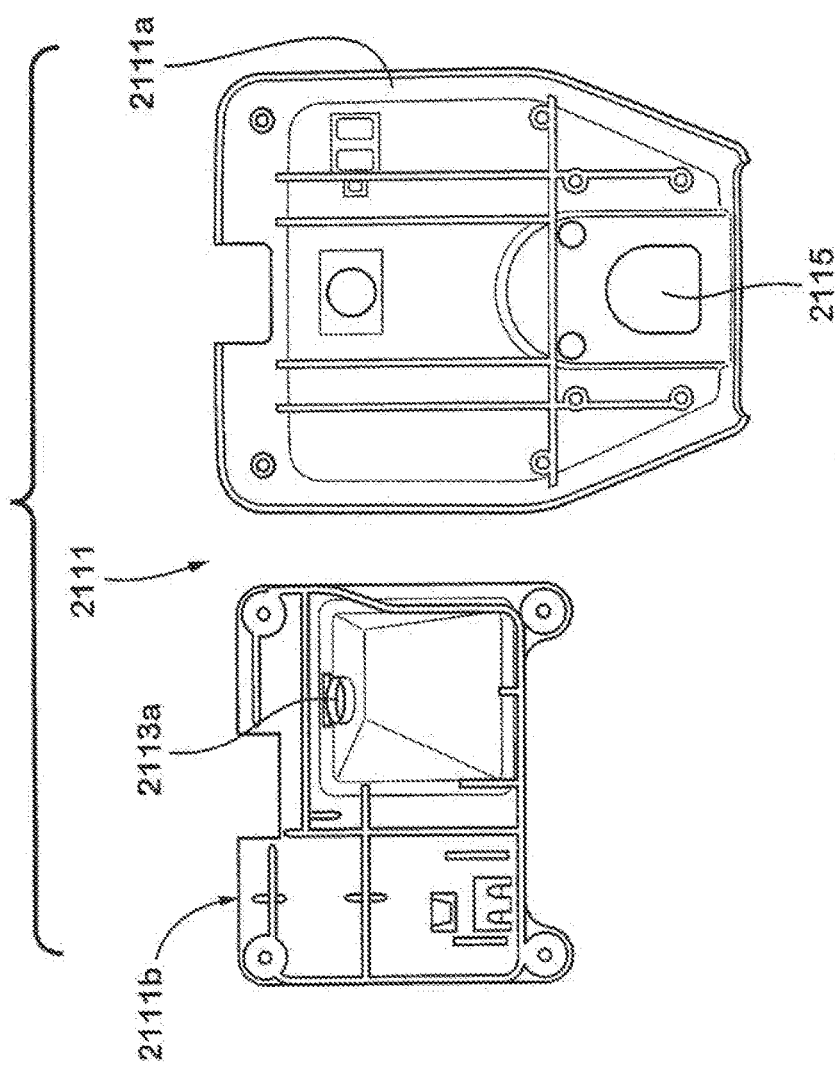
Figure 68F:
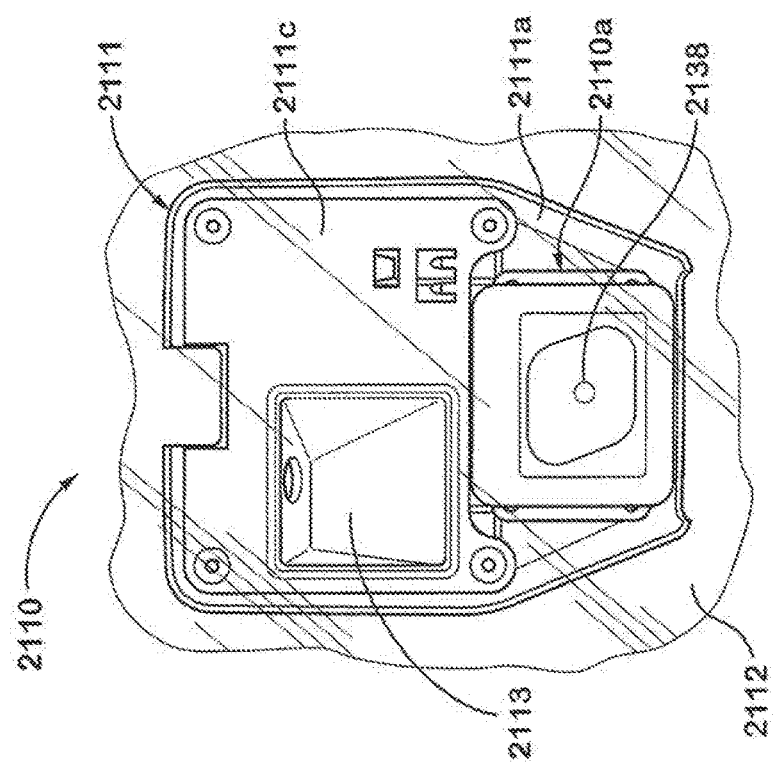
Figure 68E:
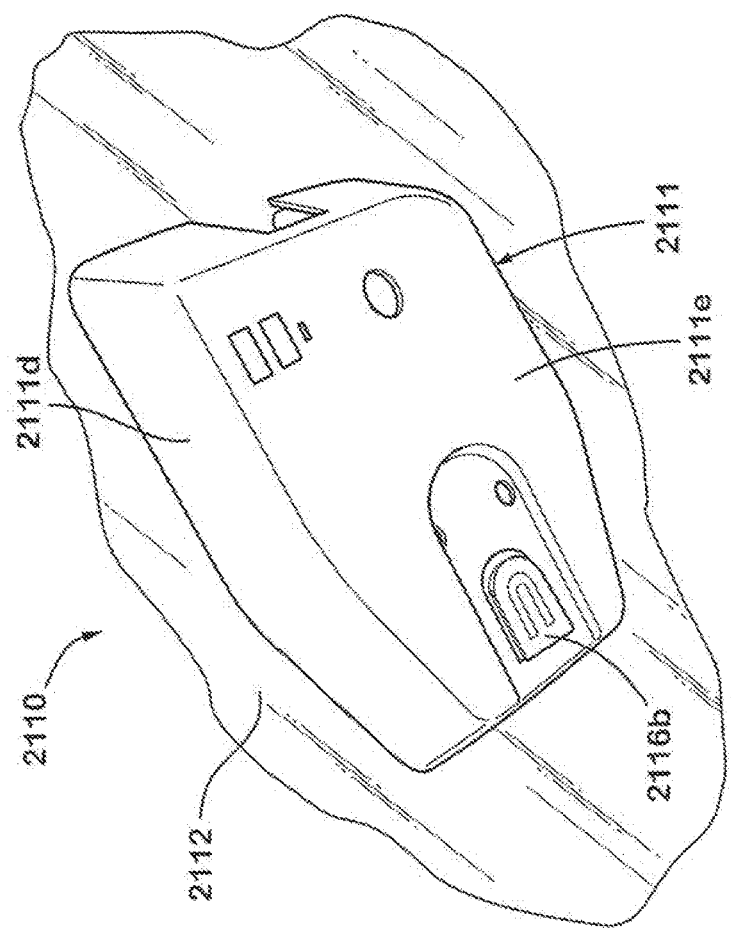

Referring now to FIGS. 66A-C, 67A-D and 68A-F, a windshield mounted electronic accessory module 2110 comprises a mounting module 2110a mounted or secured to an interior surface of a windshield (shown at 2112 as a portion of the windshield) and an accessory housing 2111 mounted to the mounting module 2110*a*. Accessory housing 2111 includes a casing 2111*a* and a cover plate 2111*b* (shown removed from casing 2111*a* in FIG. 66C) mounted to casing 2111*a* and defining a windshield facing side or surface 2111*c* of housing 2111. Housing 2111 may also provide user interface buttons or controls 2111*d* at an interior surface or portion 2111*e* of casing 2111*a* for a user to press or adjust to control the accessory or accessories associated with accessory module 2110 or other accessories or the like associated with the vehicle.

Casing 2111*a* includes an aperture or passageway 2115 therethrough for receiving a mirror mounting extension 2116 and mirror mounting button 2116*b* of accessory mounting module 2110*a*, discussed below. Cover plate 2111*b* defines a cavity 2113 which is recessed within casing 2111*a*. Accessory module housing 2111 includes a camera or image sensor (not shown), which is positioned within housing 2111 and aligned with an aperture or opening 2113*a* at cavity 2113 of cover plate 2111*b*. As can be seen with reference to FIGS. 68B-D, cavity 2113 is angled with respect to the windshield facing side or surface 2111*c* of cover plate 2111*b*, such that the camera is positioned generally horizontally and directed forwardly through the windshield 2112 when accessory module housing 2111 is mounted to mounting module 2110*a*, as discussed below.

Accessory mounting module 2110*a* is substantially similar to accessory module 1310, discussed above, and includes an accessory 2138, such as a rain sensor or the like, which may be loaded against the interior surface of the windshield, such as by using the principles disclosed in U.S. Pat. Nos. 6,341,523 and 6,250,148, and/or in U.S. patent application Ser. No. 10/023,162, filed Dec. 17, 2001, now U.S. Pat. No. 6,516,664; and Ser. No. 10/348,514, filed Jan. 21, 2003, now U.S. Pat. No. 6,968,736, which are all hereby incorporated herein by reference. Accessory mounting module 2110*a* is mounted at the interior surface of the windshield, such as via an attachment member or mounting button at the windshield or via a suitable adhesive or bonding material or the like. As discussed above with respect to accessory module 1310, a central region of accessory mounting module 2110*a* is generally open to receive accessory 2138 therein, such that accessory 2138 may be loaded against the windshield at the center region of the module. Accessory mounting module 2110*a* includes a mounting extension 2116 which further includes a mirror attachment member or mounting button 2116*b* at an end thereof for mounting an interior rearview mirror assembly (not shown) to mounting module 2110*a*. Because mounting module 2110*a* is substantially similar to accessory module 1310 discussed above, a detailed discussion of the module will not be repeated herein.

As can be seen with reference to FIGS. 68A-F, accessory module housing 2111 may be mounted to accessory mounting module 2110*a* by positioning accessory module housing 2111 at mounting module 2110*a* and aligning aperture 2115 of housing 2111 with attachment member 2116*b* of mounting module 2110. Accessory module housing 2111 may then be moved or pressed into place over mounting module 2110*a* while attachment member 2116 protrudes through aperture 2115. As discussed above with respect to accessory module 1310, accessory module housing 2111 may snap or otherwise secure to mounting module 2110*a* to retain accessory module housing 2111 at the windshield. The interior rearview mirror assembly may then mount to mirror attachment member 2116*b*. When assembled and mounted at the windshield, the camera of accessory module housing 2111 is positioned adjacent to the cavity 2113 of cover plate 2111*b* and oriented in a generally horizontal position for viewing through the aperture 2113*a* and capturing an image of a scene occurring exteriorly and generally forwardly of the vehicle.

It is further envisioned that the windshield facing surface 2110*b* of the mounting module 2110*a* and/or the windshield facing surface 2111*c* of housing 2111 may include a black out surface or material or skirt or curtain type of layer or material, preferably a resilient material, such as an elastomeric material, such as a silicone material or the like, or a blackened or darkened or otherwise colored surface or layer, to provide a black out region at the windshield interface of the mounting module 2110*a* and/or housing 2111. The darkened or blackened region may provide a port or aperture aligned with the rain sensor of the mounting module 2110*a* or camera within the housing 2111. Thus, the need for a ceramic frit layer or the like on the windshield at the mounting area of the accessory module may be obviated. This also improves the assembly process of the vehicle, since the operator does not have to align the rain sensor and/or camera with an aperture in a frit layer as the operator mounts the accessory mounting module to the windshield.

The present invention thus facilitates a reduction or deproliferation of part numbers at a vehicle assembly plant. For optional camera based accessories, such as rain sensors or headlamp controls or the like, or other accessories which may be included in a windshield mounted electronic accessory module of the present invention, multiple different interior rearview mirror assemblies and associated part numbers are not required. For example, the accessory module or modules may have one part number or may have a family part number with a particular number or letter assigned to the particular accessory option or combination (such as, for example, an eight digit part number for the accessory module followed by the letter A for a rain sensor only option, B for a rain sensor option and a headlamp control option, and/or the like). The vehicle line may then only have a restricted or reduced number of different interior rearview mirror assemblies and associated part numbers for use with the accessory modules (such as, for example, a base prismatic mirror assembly, a lighted prismatic mirror assembly, a base electrochromic mirror assembly and a lighted electrochromic mirror assembly and/or the like). Thus, multiple mirror assemblies with various options and their associated part numbers may not be required, thereby improving the assembly process of the vehicle.

Therefore, the present invention provides an accessory module which includes a head portion which extends from a mounting portion generally rearwardly with respect to the vehicle and generally above an interior rearview mirror assembly mounted or attached to the mounting portion of the accessory module. The accessory module may also or otherwise include a head portion which extends generally rearwardly with respect to the vehicle and generally to one or both sides or generally below the rearview mirror assembly mounted or attached to the mounting portion of the accessory module. The head portion of the accessory module may be movable or pivotable or articulatable relative to the mounting portion. The head portion may articulate relative to the mounting portion to a folded or mounting orientation to facilitate mounting of the accessory module to the mounting attachment or button at the windshield. The accessory module of the present invention thus enhances the process of installing or mounting or attaching the accessory module to the button at the vehicle windshield.

An accessory module in accordance with the present invention may be movable into engagement with the windshield of a vehicle such that the accessory module may be moved generally perpendicularly toward and loaded against the windshield. The present invention may include a rotating mirror mount/breakaway mount for mounting the accessory module to a mount extension that includes electrical contacts. When the accessory module is connected mechanically to the mount extension, the electrical contacts may be inserted in such a way that the electrical connections are made at the same time. The accessory module mount may comprise a single or dual pivot mount or a breakaway mount. The accessory module mount may make electrical connection or contact with electrical connectors or pins at the mounting button or the like at the windshield or headliner of the vehicle when the mount is mechanically connected or mounted to the mounting button or mounting extension or the like. The accessory module may be of the type disclosed in commonly assigned U.S. patent application Ser. No. 10/054,633, filed Jan. 22, 2002, now U.S. Pat. No. 7,195,381; U.S. provisional applications, Ser. No. 60/420,560, filed Oct. 23, 2002; Ser. No. 60/398,346, filed Jul. 24, 2002; Ser. No. 60/381,314, filed May 17, 2002; Ser. No. 60/374,724, filed Apr. 23, 2002; Ser. No. 60/364,008, filed Mar. 14, 2002; and Ser. No. 60/350,965, filed Jan. 31, 2002; and/or International Publication No. WO 01/64481, published Sep. 7, 2001, which are all hereby incorporated herein by reference.

Optionally, the accessory module mount may comprise a bolt on mirror mount/breakaway mount that includes electrical contacts, such that as the bolt on mirror mount is connected to the mount extension, the electrical connections are made. Accordingly, when the accessory module is connected mechanically (and tightened down), the electrical connections are made to provide electrical power and signals to the accessory module. Optionally, the accessory module may include a rechargeable battery pack, such that no power connection to the vehicle power source or battery is required. The rechargeable battery pack may be detachable from the accessory module and may be plugged into a vehicle power outlet for recharging, or a portion of the accessory module housing the battery pack may be detachable for recharging of the battery pack.

The accessory module may be mounted at the windshield in a manner which loads or biases the accessory module toward and against the windshield. This provides, for example, an optical coupling of an accessory of the accessory module with the surface of the window, such as for a rain sensor which is coupled to the surface of the window. Preferably, the accessory module is mounted to the button on the window in a manner which allows perpendicular placement and loading of the module and/or of a rain sensor or camera device to and against the interior surface of the windshield. Optionally, accessory module attachment or mounting member may be movable along the mounting member at the surface of the window, wherein the attachment members are formed to draw the meeting face of the electric module into intimate contact with the surface of the window. The mirror attachment members may comprise a narrowing or widening rail or the like, such that the interference between the attachment members increases to tighten the members together as one is slid or moved along the other.

The accessory module may include an image sensor, such as an imaging array sensor, which is directed forward through the windshield for imaging a forward field of view. The accessory module includes a component that is positionable at the windshield to provide a form of a dust or chemical fogging shroud. The component thus keeps the window clean and unfogged in a portion near or at the image sensor of the accessory module. The component, which may be a sealing member or the like, is preferably loaded against the interior surface of the windshield to define a seal around the image sensor so as to substantially seal the image sensor within a chamber defined by the module and the interior surface of the windshield. The component may be adjustable to adjust an angle of the image sensor relative to horizontal or relative to the windshield of the vehicle.

The accessory module may include a microphone and a shroud or cover extending at least partially around or over the microphone to protect the microphone from wind noise or blower noise or the like. For example, a clamshell or half-cup type cover may extend over the microphone with the microphone being placed partially therein or just above the shroud. The shroud then functions to direct blown air around and/or away from the microphone to prevent or limit the microphone from receiving or detecting the blown air.

The accessory module may also include a forward looking image sensor which is operable as an ambient light sensor, and which may replace an EC forward ambient light sensor of the interior rearview mirror. Optionally or additionally, a rear facing image sensor may replace an EC rearward ambient light sensor.

The accessory module may include a smart headlamp control, such as disclosed in U.S. Pat. Nos. 6,097,023 and 5,796,094, which are hereby incorporated herein by reference. The headlamp control may be operable to detect and recognize various street and/or traffic signs via an image sensor. The image sensor and headlamp control may further be operable to recognize the speed limit numbers on a speed limit sign and to warn the driver if the vehicle exceeds the speed limit by a predetermined amount. The accessory module may have an interface (such as voice, touch screen, etc.) that would set a personal threshold for over-speed warning.

Such a system could be implemented for warning signs (turns, hills, etc.) or the like. For example, the image sensor and headlamp control may be operable to detect and recognize a railroad crossing sign and further recognize that the railroad crossing sign is activated (such as by distinguishing the flashing lights characteristic of a railroad crossing signal) due to an approaching train. The accessory module could then warn the driver that the vehicle is approaching a dangerous condition. Additionally, the image sensor and headlamp control may be operable to detect other signals, such as a school bus stopping signal or a pedestrian road crossing signal or the like.

The accessory module of the present invention may include, such as on the printed circuit board (such as on a generally flat circuit board of the type discussed above with respect to accessory modules 1010, 1110), a photo sensor, preferably a photo transistor or photo diode, which is responsive to ambient light levels. The printed circuit board may be operable to dim the display intensity of a display of the accessory module during night time driving conditions or other darkened conditions where excessive brightness or glare of the display may be distracting or annoying to the driver of the vehicle. Alternately, the circuitry could be connected to the instrument panel wiring and may be operable to dim the instrument panel lights to provide instrument panel dimming during darkened conditions.

The accessory module of the present invention may include electrochromic control circuitry for controlling the reflectivity of an electrochromic mirror. The circuitry may include a rearward viewing glare detector or sensor and a forward viewing and/or sideward viewing ambient light detector or sensor, such as described in U.S. Pat. No.

4,793,690, which is hereby incorporated herein by reference, or may include a single sensor, such as described in U.S. Pat. No. 5,193,029, which is hereby incorporated herein by reference. The output of the circuitry may control an outside electrochromic mirror as well as the interior rearview electrochromic mirror. It is further envisioned that the circuitry may control an outside electrochromic mirror, while the interior rearview mirror assembly mounted at the accessory module may be a prismatic mirror, without affecting the scope of the present invention. Further, automatic dimming circuitry used in the electrochromic mirror assembly may utilize one or more (typically two) photo sensors to detect glaring and/or ambient lighting. For example, a silicon photo sensor, such as a TSL235R Light-to-Frequency converter (available from Texas Advanced Optoelectronic Solutions Inc. of Plano, Tex.), can be used as such photo sensors. Such light-to-frequency converters comprise the combination of a silicon photodiode and a current-to-frequency converter on a single monolithic CMOS integrated circuit.

Optionally, the accessory module may include a microphone or a plurality of microphones or a sound acquisition system, such as described in commonly assigned, U.S. Pat. Nos. 6,243,003 and 6,278,377, and/or U.S. patent application Ser. No. 09/466,010, filed Dec. 17, 1999, now U.S. Pat. No. 6,420,975, which are hereby incorporated herein by reference, which may detect audible signals from a remote source, such as a railroad crossing signal or train whistle. The system may then be operable to further determine whether the railroad crossing signal is activated, by visually and/or audibly recognizing the condition, and to provide a warning to the driver of the subject vehicle that the vehicle is approaching a railroad track with an oncoming train.

In many new vehicles, the headlamps are high intensity discharge headlamps, which require that the headlamps be directed generally parallel to the road, in order to prevent the headlamps from being directed toward the eyes of drivers in oncoming traffic. The headlamp control of the present invention may be operable to detect whether the headlamps are directed more toward the sky or toward the road and then automatically adjust them to make them generally parallel to the road. Additionally, the headlamp control may be operable to control the attitude of the vehicle and/or the pitch of the vehicle in response to a detection of the direction in which the headlamps are directed.

The present invention further includes an interior rearview mirror assembly which is mounted to an interior surface of the windshield or at the headliner of the vehicle. The interior rearview mirror assembly may comprise a prismatic mirror or an electrochromic mirror, such as an electrochromic mirror assembly and electrochromic element utilizing principles disclosed in commonly assigned U.S. Pat. Nos. 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 or 4,712,879, which are hereby incorporated herein by reference, or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein, and in U.S. patent application Ser. No. 09/792,002, filed Feb. 26, 2001, now U.S. Pat. No. 6,690,268, which is hereby incorporated herein by reference. Optionally, a pod attachment, such as the type disclosed in U.S. Pat. Nos. 5,576,687 and 5,708,410, which are hereby incorporated herein by reference, may attach to the rearview mirror assembly.

The electrochromic mirror element may comprise a pair of substrates, and with the rear surface of the rear substrate (commonly referred to as the "fourth surface" of the reflective element) having a silver reflective coating (that itself may have a copper coating and paint coating applied thereto for corrosion protection) deposited thereon, most commonly using wet chemical silvering, as known in the mirror making art. Optionally, the mirror element may comprise a polymeric reflective film that may be applied to the rear surface of the rear substrate of the electrochromic element after the pair of substrates have been joined to form the electrochromic cell of the electrochromic mirror element. Such a reflective film may comprise a polymeric reflective film, such as an all polymer-thin-film multilayer, high reflective mirror film, such as a multilayer, non-metallic reflective film which may comprise multiple coextrusion of many plastic layers to form a highly reflective mirror film. Such a reflective film thus may comprise multilayers of polymer materials to form a highly reflective mirror film, such as a Radiant Light Film, a Radiant Mirror Film or a Radiant Color Film, such as commercially available from 3M of St. Paul, Minn., such as a Radiant Color Film CM590 or CM500.

The reflective polymeric film may be provided in a reel or roll form or strip and may be attached or applied to the rear surface of the rear substrate, such as via laminating or adhering the film to the substrate material using optical adhesive and/or via rolling or ironing the film or sheet (preferably at an elevated temperature and with vacuum assist) onto the substrate surface, to secure the reflective film to the substrate. It is envisioned that the reflective polymeric film may be unwound or unrolled and applied along an extruded substrate material as the substrate material is generally continuously extruded or cast during a generally continuous extrusion or casting process. The substrate material may then be cut, such as via laser cutting, after the reflective polymeric film is applied thereto to form the rear substrate.

Optionally, the cutting process may occur after an anti-abrasion film or the like is applied to the opposite surface of the substrate material, such as an anti-abrasion film applied to the opposite surface via unrolling and applying the film to the extruded substrate material as the substrate material is generally continuously extruded. The anti-abrasion coated film may thus be laminated to or adhered to or otherwise secured to the front surface of the rear substrate, while the reflective film is applied to the rear surface of the rear substrate. Optionally, a hydrophobic or hydrophilic film may also or otherwise be applied to the substrate. The reflective polymeric film, the anti-abrasion film and the substrate material may all be formed of the same resin to match coefficients of thermal expansion and thus reduce thermal expansion/contraction mismatches between the materials. Of course, it is envisioned that such reflective films or reflective systems may be used for prismatic mirrors as well. In such applications, a glass prism may be formed and the reflective film or reflective polymeric film may be applied to a second or rear surface thereof.

Optionally, the interior rearview mirror assembly may comprise a transflective one way mirror, such as disclosed in commonly assigned U.S. patent application Ser. No. 10/054, 633, filed Jan. 22, 2002, now U.S. Pat. No. 7,195,381, which is hereby incorporated herein by reference. Preferably, the mirror reflective element (behind which the video display screen is disposed so that the image displayed is visible by viewing through the mirror reflective element) of the interior mirror assembly comprises a transflective mirror reflector such that the mirror reflective element is significantly transmitting to visible light incident from its rear (i.e. the portion furthest from the driver in the vehicle), with at least about 15% transmission preferred, at least about 20% transmission more preferred and at least about 25% transmission most preferred, while simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred and at least about 75% reflectance most preferred. Preferably, a transflective electrochromic reflective mirror element is used (such as is disclosed in U.S. patent application Ser. No. 09/793,002, filed Feb. 26, 2001, now U.S. Pat. No. 6,690,268 and in U.S. Pat. Nos. 5,668,663 and 5,724,187, the entire disclosures of which are hereby incorporated by reference herein) that comprises an electrochromic medium sandwiched between two substrates.

The interior rearview mirror assembly may include a display on demand (DOD) display (such as disclosed in commonly assigned, U.S. patent application Ser. No. 10/054,633, filed Jan. 22, 2002, now U.S. Pat. No. 7,195,381, U.S. patent application Ser. No. 09/793,002, filed Feb. 26, 2001, now U.S. Pat. No. 6,690,268, and in U.S. Pat. Nos. 5,668,663 and 5,724,187, the entire disclosures of which are hereby incorporated by reference herein) which comprises two displays located in the mirror assembly. When the left turn signal is turned on, a blind spot/lane change aid camera view or hazard indication may be displayed in the mirror (preferably via a display on demand indicia or display) on the right hand side. This is because the view in the mirror on the left hand side is more critical to the driver of the vehicle when making a left hand turn. The opposite would be true with right turn signal. However, the signals may be displayed on the other sides as well, without affecting the scope of the present invention. For example, when the left turn signal is activated, the blind spot camera view or hazard indication may be displayed in the mirror (preferably via a display on demand indicia or display) on the left hand side. Optionally, the mirror may include a display portion at the right hand side of the mirror which is angled or canted relative to the main reflective surface of the mirror, such that the angled display portion is canted toward the driver of the vehicle to enhance viewing of the angled display portion by the driver, such as the display type disclosed in commonly assigned, U.S. patent application Ser. No. 09/793,002, filed Feb. 26, 2001, now U.S. Pat. No. 6,690,268, which is hereby incorporated by reference herein.

The display can also be accomplished when a single large display is used in interior rearview mirror (such as via a DOD indicia or display) where only a portion of the display is activated to show the image. This can also be accomplished with displays located on the ends of the mirror surface (such as non-DOD displays). In this case the blind spot image would be displayed on the same side as the turn indicated.

The interior rearview mirror assembly may include a single large display, which provides a display surface behind the whole mirror surface that allows images, icons, text, etc. to be placed anywhere on the viewable mirror surface.

Also, any of the vehicular accessories disclosed above, such as interior rearview mirror assemblies and accessory modules, such as windshield electronic modules, and having at least a portion with a view through the front windshield of the vehicle, can include ultra-small information displays, such as are disclosed in U.S. provisional application, Ser. No. 60/314,457, filed Aug. 23, 2001; and in U.S. patent application Ser. No. 10/225,851, filed Aug. 22, 2002, now U.S. Pat. No. 6,847,487, the entire disclosures of which are hereby incorporated by reference herein. Such ultra-small displays may be of a transmissive-type or a reflective type. For example, the ultra-small liquid crystal display (LCD) available from Kopin Corporation of Taunton, Mass. is a transmissive type. Kopin Corporation utilizes silicon-on-insulator SOI wafers to build transmissive displays. Kopin Corporation's product utilizes thin monocrystal silicon thin film transistors Si-TFT of several microns peeled off from the circuit board to filter out light, and employs a field sequential method, which shows images in accordance with sequentially changing red, green, and blue. The display has a high degree of transmissivity because it does not need color filters. Image quality depends on color purity of the light emitting diode used as the illumination source.

The micro-display may be used as a gauge (replace TFT because do not have to cut TFT glass to fit, just the screen glass).

The present invention may further include an electronic field sensor (EFS) which is operable to: sense motion; detect when motion stops, in order to prevent SID/Sleep Apnea; and/or sense intrusion.

The EFS may be combined with Thermile Pile (FOV or multiple sensors); with image sensor (all types) (FOV or multiple sensors); with a microphone; and/or with Smart Release (FOV or multiple sensors).

The sensor design (size, shape, type, material, # of sensors, sensitivity, etc.) may be adjusted or adapted depending on the particular vehicle or application of the EFS.

Examples of electronic field sensors are disclosed in commonly assigned U.S. patent application Ser. No. 09/992,119, filed Nov. 14, 2001, now U.S. Pat. No. 6,768,420, which is hereby incorporated herein by reference.

The present invention further provides for a combination of multiple features (i.e. rain, headlamp, etc.) in a single chip/sensor of the accessory module or interior rearview mirror assembly.

Changes and modifications in the specifically described embodiments can be carried out without departing from the principles of the present invention, which is intended to be limited only by the scope of the appended claims, as interpreted according to the principles of patent law.

The embodiments of the invention in which an exclusive property or privilege is claimed are defined as follows:

1. A vehicular camera system suitable for use in a vehicle, said vehicular camera system comprising:
 a vehicle windshield that, as installed in a vehicle equipped with said vehicular camera system, is sloped at an acute angle relative to horizontal;
 a black-out layer disposed at an upper central region of the vehicle windshield as installed in the equipped vehicle;
 an attachment member configured for attachment at the upper central region of the vehicle windshield where the black-out layer is disposed;
 an accessory module comprising a camera;
 wherein said camera comprises a CMOS imaging array sensor and a lens;
 wherein said accessory module is configured to detachably mount at said attachment member;

wherein the black-out layer comprises a light-transmitting aperture aligned with said camera when said accessory module is detachably mounted at said attachment member attached at the upper central region of the vehicle windshield;

wherein, with said attachment member attached at the upper central region of the vehicle windshield where the black-out layer is disposed and with said accessory module mounted at said attachment member with said camera aligned with the light-transmitting aperture of the black-out layer, said lens of said camera is spaced from the vehicle windshield;

wherein, with said attachment member attached at the upper central region of the vehicle windshield where the black-out layer is disposed and with said accessory module mounted at said attachment member, said camera views forward of the equipped vehicle through the light-transmitting aperture in the black-out layer via a tapered structure that is widest at the vehicle windshield and that tapers from the vehicle windshield towards where said lens of said camera is located;

wherein, with said attachment member attached at the upper central region of the vehicle windshield where the black-out layer is disposed and with said accessory module mounted at said attachment member, said tapered structure is at an acute angle relative to the vehicle windshield, said angling compensating, at least in part, for slope of the vehicle windshield;

wherein said accessory module comprises a housing having a windshield-facing side that faces towards the vehicle windshield when said attachment member is attached at the upper central region of the vehicle windshield where the black-out layer is disposed and when said accessory module is mounted at said attachment member, and wherein said housing of said accessory module has a cabin-facing side that faces away from the vehicle windshield towards the interior cabin of the equipped vehicle when said attachment member is attached at the upper central region of the vehicle windshield where the black-out layer is disposed and when said accessory module is mounted at said attachment member;

wherein said tapered structure comprises a plurality of planar walls that converge towards one another;

wherein, with said attachment member attached at the upper central region of the vehicle windshield where the black-out layer is disposed and with said accessory module mounted at said attachment member, said lens of said camera at least partially protrudes through said housing into a cavity that is at least partially bounded by said tapered structure;

wherein electrical circuitry is disposed in said housing of said accessory module;

wherein said electrical circuitry disposed in said housing of said accessory module comprises a microprocessor, memory and a power supply;

wherein, with said attachment member attached at the upper central region of the vehicle windshield where the black-out layer is disposed and with said accessory module mounted at said attachment member, said electrical circuitry communicates over a vehicle communication bus with at least one system of the equipped vehicle;

wherein said electrical circuitry receives input over the vehicle communication bus from at least one system of the equipped vehicle;

wherein input received over the vehicle communication bus comprises at least one input selected from the group consisting of (i) intelligent headlamp control enabled status, (ii) intelligent headlamp control disabled status and (iii) steering angle;

wherein said electrical circuitry communicates over the vehicle communication bus to at least one system of the equipped vehicle;

wherein, with said attachment member attached at the upper central region of the vehicle windshield where the black-out layer is disposed and with said accessory module mounted at said attachment member, said camera captures image data for a driver assistance system of the equipped vehicle; and wherein said driver assistance system comprises an adaptive cruise control system of the equipped vehicle.

2. The vehicular camera system of claim 1, wherein said accessory module accommodates a rain sensor, and wherein, with said attachment member attached at the upper central region of the vehicle windshield where the black-out layer is disposed and with said accessory module mounted at said attachment member, said rain sensor optically couples with the vehicle windshield.

3. The vehicular camera system of claim 1, wherein, with said attachment member attached at the upper central region of the vehicle windshield where the black-out layer is disposed and with said accessory module mounted at said attachment member, a detachable cover is provided.

4. The vehicular camera system of claim 1, wherein said accessory module comprises a first portion and a second portion, said first portion extending upward when said attachment member is attached at the upper central region of the vehicle windshield where the black-out layer is disposed and when said accessory module is mounted at said attachment member, said first portion having a mirror mounting button, said second portion extending horizontally and rearwardly from said first portion with respect to the vehicle windshield when said attachment member is attached at the upper central region of the vehicle windshield where the black-out layer is disposed and when said accessory module is mounted at said attachment member, said second portion comprising electronic circuitry, and wherein an interior rearview mirror assembly comprising a mirror casing and a reflective element is mountable to said mirror mounting button, said second portion extending from said first portion above the mirror casing and being at least one of viewable and user accessible above the mirror casing when the interior rearview mirror assembly is mounted to said mirror mounting button, and wherein said second portion is movably attached to said first portion and is movable relative to said first portion, and wherein said second portion is pivotable relative to said first portion about a vertical pivot axis to adjust the angle of said second portion, and wherein said second portion comprises at least one selected from the group consisting of (a) a display element and (b) a user input device associated with at least one selected from the group consisting of (i) a compass system of the equipped vehicle, (ii) a microphone system of the equipped vehicle and (iii) a garage door opener system of the equipped vehicle.

5. The vehicular camera system of claim 1, wherein said electrical circuitry communicates over the vehicle communication bus to provide output to the at least one system of the equipped vehicle.

6. The vehicular camera system of claim 5, wherein output communicated over the vehicle communication bus comprises at least one selected from the group consisting of (i) intelligent headlamp control status and (ii) an ambient light level status.

7. The vehicular camera system of claim 5, wherein output communicated over the vehicle communication bus comprises beam activation for a headlight of the equipped vehicle.

8. The vehicular camera system of claim 1, wherein said accessory module comprises a multi-pin connector for connecting to the vehicle communication bus, and wherein the vehicle communication bus comprises a CAN communication bus.

9. The vehicular camera system of claim 1, wherein said attachment member comprises an attachment portion at a first side of said attachment member for attachment of said attachment member at the upper central region of the vehicle windshield where the black-out layer is disposed, and wherein said attachment member comprises a second side of that opposes said first side, and wherein said attachment portion at the first side of said attachment member is configured for bonding using an adhesive at the vehicle windshield of the equipped vehicle, and wherein the first side of said attachment member is configured with structure that cooperates with corresponding structure of said accessory module when, with said attachment member bonded at the upper central region of the vehicle windshield where the black-out layer is disposed, said accessory module attaches at said attachment member.

10. The vehicular camera system of claim 1, wherein said attachment member comprises a mirror mounting button configured for attachment of an interior rearview mirror assembly thereto.

11. The vehicular camera system of claim 1, wherein, with said attachment member attached at the upper central region of the vehicle windshield where the black-out layer is disposed and with said accessory module mounted at said attachment member, structure of said accessory module angles the field of view of said camera with respect to the vehicle windshield to at least partially compensate for the windshield angle of the vehicle windshield in the equipped vehicle.

12. The vehicular camera system of claim 1, wherein said camera captures image data for at least two systems selected from the group consisting of (i) a sign recognition system of the equipped vehicle, (ii) a pedestrian detection system of the equipped vehicle and (iii) a vehicle detection system of the equipped vehicle.

13. The vehicular camera system of claim 1, wherein said camera captures image data for a headlamp control system of the equipped vehicle.

14. The vehicular camera system of claim 1, wherein said accessory module mounts at said attachment member via snap attachment.

15. The vehicular camera system of claim 1, wherein said electrical circuitry of said accessory module is disposed on a printed circuit board.

16. The vehicular camera system of claim 15, wherein a mirror mounting button is adhered to the vehicle windshield at the upper central region of the vehicle windshield where the black-out layer is disposed at a location at the vehicle windshield that is spaced and separate from where said attachment member attaches at the vehicle windshield.

17. A vehicular camera system suitable for use in a vehicle, said vehicular camera system comprising:

a vehicle windshield that, as installed in a vehicle equipped with said vehicular camera system, is sloped at an acute angle relative to horizontal;

a black-out layer disposed at an upper central region of the vehicle windshield as installed in the equipped vehicle;

an attachment member configured for attachment at the upper central region of the vehicle windshield where the black-out layer is disposed;

an accessory module comprising a camera;

wherein said camera comprises a CMOS imaging array sensor and a lens;

wherein said accessory module is configured to detachably mount at said attachment member;

wherein the black-out layer comprises a light-transmitting aperture aligned with said camera when said accessory module is detachably mounted at said attachment member attached at the upper central region of the vehicle windshield;

wherein, with said attachment member attached at the upper central region of the vehicle windshield where the black-out layer is disposed and with said accessory module mounted at said attachment member with said camera aligned with the light-transmitting aperture of the black-out layer, said lens of said camera is spaced from the vehicle windshield;

wherein, with said attachment member attached at the upper central region of the vehicle windshield where the black-out layer is disposed and with said accessory module mounted at said attachment member, said camera views forward of the equipped vehicle through the light-transmitting aperture in the black-out layer via a tapered structure that is widest at the vehicle windshield and that tapers from the vehicle windshield towards where said lens of said camera is located;

wherein, with said attachment member attached at the upper central region of the vehicle windshield where the black-out layer is disposed and with said accessory module mounted at said attachment member, said tapered structure is at an acute angle relative to the vehicle windshield, said angling compensating, at least in part, for slope of the vehicle windshield;

wherein said accessory module comprises a housing having a windshield-facing side that faces towards the vehicle windshield when said attachment member is attached at the upper central region of the vehicle windshield where the black-out layer is disposed and when said accessory module is mounted at said attachment member, and wherein said housing of said accessory module has a cabin-facing side that faces away from the vehicle windshield towards the interior cabin of the equipped vehicle when said attachment member is attached at the upper central region of the vehicle windshield where the black-out layer is disposed and when said accessory module is mounted at said attachment member;

wherein said tapered structure comprises a plurality of planar walls that converge towards one another;

wherein, with said attachment member attached at the upper central region of the vehicle windshield where the black-out layer is disposed and with said accessory module mounted at said attachment member, said lens of said camera at least partially protrudes through said housing into a cavity that is at least partially bounded by said tapered structure;

wherein electrical circuitry is disposed in said housing of said accessory module;

wherein said electrical circuitry disposed in said housing of said accessory module is disposed on a printed circuit board, and wherein said electrical circuitry comprises a microprocessor, memory and a power supply;

wherein, with said attachment member attached at the upper central region of the vehicle windshield where the black-out layer is disposed and with said accessory module mounted at said attachment member, said electrical circuitry communicates over a vehicle communication bus with at least one system of the equipped vehicle;

wherein said accessory module comprises a connector for connecting to the vehicle communication bus;

wherein said electrical circuitry receives input over the vehicle communication bus from at least one system of the equipped vehicle;

wherein input received over the vehicle communication bus comprises steering angle;

wherein said electrical circuitry communicates over the vehicle communication bus to provide output to at least one system of the equipped vehicle; and wherein, with said attachment member attached at the upper central region of the vehicle windshield where the black-out layer is disposed and with said accessory module mounted at said attachment member, said camera captures image data for at least two systems selected from the group consisting of (i) a sign recognition system of the equipped vehicle, (ii) a pedestrian detection system of the equipped vehicle, (iii) a headlamp control system of the equipped vehicle, (iv) a lane departure warning system of the equipped vehicle and (v) an adaptive control system of the equipped vehicle.

18. The vehicular camera system of claim 17, wherein said connector of said accessory module for connecting to the vehicle communication bus comprises a multi-pin connector.

19. The vehicular camera system of claim 18, wherein said camera captures image data for a headlamp control system of the equipped vehicle, and wherein output communicated over the vehicle communication bus comprises beam activation for a headlight of the equipped vehicle.

20. The vehicular camera system of claim 18, wherein said camera captures image data a pedestrian detection system of the equipped vehicle.

21. The vehicular camera system of claim 18, wherein said camera captures image data for a headlamp control system of the equipped vehicle, and wherein said camera captures image data for at least two other systems selected from the group consisting of (i) a sign recognition system of the equipped vehicle, (ii) a pedestrian detection system of the equipped vehicle, (iii) a lane departure warning system of the equipped vehicle and (iv) an adaptive control system of the equipped vehicle.

22. The vehicular camera system of claim 18, wherein said camera captures image data for a lane departure warning system of the equipped vehicle, and wherein said camera captures image data for at least two other systems selected from the group consisting of (i) a sign recognition system of the equipped vehicle, (ii) a pedestrian detection system of the equipped vehicle, (iii) a headlamp control system of the equipped vehicle and (iv) an adaptive control system of the equipped vehicle.

23. The vehicular camera system of claim 22, wherein input received over the vehicle communication bus comprises turn signal status.

24. The vehicular camera system of claim 17, wherein the vehicle communication bus comprises a CAN communication bus.

25. The vehicular camera system of claim 17, wherein said accessory module comprises a multi-pin connector for connecting to the vehicle communication bus, and wherein the vehicle communication bus comprises a CAN communication bus.

26. A vehicular camera system suitable for use in a vehicle, said vehicular camera system comprising:

a vehicle windshield that, as installed in a vehicle equipped with said vehicular camera system, is sloped at an acute angle relative to horizontal;

a black-out layer disposed at an upper central region of the vehicle windshield as installed in the equipped vehicle;

an attachment member configured for attachment at the upper central region of the vehicle windshield where the black-out layer is disposed;

an accessory module comprising a camera;

wherein said camera comprises a CMOS imaging array sensor and a lens;

wherein said accessory module is configured to detachably mount at said attachment member;

wherein the black-out layer comprises a light-transmitting aperture aligned with said camera when said accessory module is detachably mounted at said attachment member attached at the upper central region of the vehicle windshield;

wherein, with said attachment member attached at the upper central region of the vehicle windshield where the black-out layer is disposed and with said accessory module mounted at said attachment member with said camera aligned with the light-transmitting aperture of the black-out layer, said lens of said camera is spaced from the vehicle windshield;

wherein, with said attachment member attached at the upper central region of the vehicle windshield where the black-out layer is disposed and with said accessory module mounted at said attachment member, said camera views forward of the equipped vehicle through the light-transmitting aperture in the black-out layer via a tapered structure that is widest at the vehicle windshield and that tapers from the vehicle windshield towards where said lens of said camera is located;

wherein, with said attachment member attached at the upper central region of the vehicle windshield where the black-out layer is disposed and with said accessory module mounted at said attachment member, said tapered structure is at an acute angle relative to the vehicle windshield, said angling compensating, at least in part, for slope of the vehicle windshield;

wherein said accessory module comprises a housing having a windshield-facing side that faces towards the vehicle windshield when said attachment member is attached at the upper central region of the vehicle windshield where the black-out layer is disposed and when said accessory module is mounted at said attachment member, and wherein said housing of said accessory module has a cabin-facing side that faces away from the vehicle windshield towards the interior cabin of the equipped vehicle when said attachment member is attached at the upper central region of the vehicle windshield where the black-out layer is disposed and when said accessory module is mounted at said attachment member;

wherein the tapered structure comprises a plurality of planar walls that converge towards one another;

wherein, with said attachment member attached at the upper central region of the vehicle windshield where the black-out layer is disposed and with said accessory module mounted at said attachment member, said lens of said camera at least partially protrudes through said housing into a cavity that is at least partially bounded by said tapered structure;

wherein electrical circuitry is disposed in said housing of said accessory module;

wherein said electrical circuitry disposed in said housing of said accessory module is disposed on a printed circuit board, and wherein said electrical circuitry comprises a microprocessor, memory and a power supply;

wherein, with said attachment member attached at the upper central region of the vehicle windshield where the black-out layer is disposed and with said accessory module mounted at said attachment member, said electrical circuitry communicates over a vehicle communication bus with at least one system of the equipped vehicle;

wherein said accessory module comprises a connector for connecting to the vehicle communication bus;

wherein said electrical circuitry receives input over the vehicle communication bus from at least one system of the equipped vehicle;

wherein input received over the vehicle communication bus comprises turn signal status;

wherein said electrical circuitry communicates over the vehicle communication bus to provide output to at least one system of the equipped vehicle; and wherein, with said attachment member attached at the upper central region of the vehicle windshield where the black-out layer is disposed and with said accessory module mounted at said attachment member, said camera captures image data for at least two systems selected from the group consisting of (i) a sign recognition system of the equipped vehicle, (ii) a pedestrian detection system of the equipped vehicle and (iii) a vehicle detection system of the equipped vehicle.

27. The vehicular camera system of claim 26, wherein said connector of said accessory module for connecting to the vehicle communication bus comprises a multi-pin connector, and wherein the vehicle communication bus comprises a CAN communication bus.

28. The vehicular camera system of claim 27, wherein said camera captures image data for a headlamp control system of the equipped vehicle, and wherein output communicated over the vehicle communication bus comprises beam activation for a headlight of the equipped vehicle.

29. The vehicular camera system of claim 27, wherein said camera captures image data for a headlamp control system of the equipped vehicle, and wherein said camera captures image data for a lane departure warning system of the equipped vehicle.

30. The vehicular camera system of claim 29, wherein said camera captures image data for an adaptive control system of the equipped vehicle.

31. The vehicular camera system of claim 27, wherein said camera captures image data for a sign recognition system of the equipped vehicle.

32. The vehicular camera system of claim 27, wherein said camera captures image data for a pedestrian detection system of the equipped vehicle.

33. The vehicular camera system of claim 27, wherein said camera captures image data for a vehicle detection system of the equipped vehicle.

34. The vehicular camera system of claim 27, wherein a mirror mounting button is adhered to the vehicle windshield at the upper central region of the vehicle windshield where the black-out layer is disposed at a location at the vehicle windshield that is spaced and separate from where said attachment member attaches at the vehicle windshield.

35. The vehicular camera system of claim 26, wherein input received over the vehicle communication bus comprises vehicle speed and steering angle.

36. The vehicular camera system of claim 35, wherein said attachment member comprises an attachment portion at a first side of said attachment member for attachment of said attachment member at the upper central region of the vehicle windshield where the black-out layer is disposed, and wherein said attachment member comprises a second side of that opposes said first side, and wherein said attachment portion at the first side of said attachment member is configured for attaching at the upper central region of the vehicle windshield of the equipped vehicle, and wherein the first side of said attachment member is configured with structure that cooperates with corresponding structure of said accessory module when, with said attachment member attached at the upper central region of the vehicle windshield where the black-out layer is disposed, said accessory module attaches at said attachment member.

37. The vehicular camera system of claim 36, wherein, with said attachment member attached at the upper central region of the vehicle windshield where the black-out layer is disposed and with said accessory module mounted at said attachment member, structure of said accessory module angles the field of view of said camera with respect to the vehicle windshield to at least partially compensate for the windshield angle of the vehicle windshield in the equipped vehicle.

* * * * *